US008725646B2

(12) United States Patent
Alkove et al.

(10) Patent No.: US 8,725,646 B2
(45) Date of Patent: May 13, 2014

(54) OUTPUT PROTECTION LEVELS

(75) Inventors: James M. Alkove, Woodinville, WA (US); Clifford P. Strom, Sammamish, WA (US); Benjamin B. Cutter, Jr., Kirkland, WA (US); Brian P. Evans, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 634 days.

(21) Appl. No.: 11/107,014

(22) Filed: Apr. 15, 2005

(65) Prior Publication Data
US 2006/0235798 A1 Oct. 19, 2006

(51) Int. Cl.
*G06F 21/00* (2013.01)

(52) U.S. Cl.
USPC .............................. 705/57; 705/58; 380/201

(58) Field of Classification Search
USPC .................. 380/201; 713/164; 705/57, 58
See application file for complete search history.

(56) References Cited

U.S. PATENT DOCUMENTS

| | | |
|---|---|---|
| 3,718,906 A | 2/1973 | Lightner |
| 4,183,085 A | 1/1980 | Roberts |
| 4,202,051 A | 5/1980 | Davida et al. |
| 4,323,921 A | 4/1982 | Guillou |
| 4,405,829 A | 9/1983 | Rivest |
| 4,528,643 A | 7/1985 | Freeny, Jr. |
| 4,529,870 A | 7/1985 | Chaum |
| 4,558,176 A | 12/1985 | Arnold |
| 4,620,150 A | 10/1986 | Germer |
| 4,658,093 A | 4/1987 | Hellman |
| 4,683,553 A | 7/1987 | Mollier |
| 4,747,139 A | 5/1988 | Taaffe |
| 4,750,034 A | 6/1988 | Lem |
| 4,799,259 A | 1/1989 | Ogrodski |
| 4,817,094 A | 3/1989 | Lebizay |
| 4,827,508 A | 5/1989 | Shear |
| 4,855,730 A | 8/1989 | Venners |
| 4,855,922 A | 8/1989 | Huddleston |
| 4,857,999 A | 8/1989 | Welsh |
| 4,910,692 A | 3/1990 | Outram |
| 4,916,738 A | 4/1990 | Chandra et al. |
| 4,926,479 A | 5/1990 | Goldwasser et al. |
| 4,953,209 A | 8/1990 | Ryder, Sr. et al. |
| 4,959,774 A | 9/1990 | Davis |
| 4,967,273 A | 10/1990 | Greenberg |

(Continued)

FOREIGN PATENT DOCUMENTS

| | | |
|---|---|---|
| AU | 9741703 | 3/1998 |
| CA | 2373542 | 11/2002 |

(Continued)

OTHER PUBLICATIONS

Protecting Content with Digital Rights management; www.intelligraphics.com/articles/WDMaudiodesign_article.html.

(Continued)

*Primary Examiner* — Evens J Augustin
(74) *Attorney, Agent, or Firm* — Carole Boelitz; Micky Minhas

(57) ABSTRACT

A system of controlling playback of digital media. A system of controlling playback of digital media comprising a CE device having an output path and a license having a specified output protection level disposed upon the CE device in which the specified output protection level controls playback of the digital media over the output path.

16 Claims, 8 Drawing Sheets

(56) References Cited

U.S. PATENT DOCUMENTS

| | | | |
|---|---|---|---|
| 4,977,594 | A | 12/1990 | Shear |
| 5,001,752 | A | 3/1991 | Fischer |
| 5,008,935 | A | 4/1991 | Roberts |
| 5,012,514 | A | 4/1991 | Renton |
| 5,029,206 | A | 7/1991 | Mario et al. |
| 5,047,928 | A | 9/1991 | Wiedemer |
| 5,048,086 | A | 9/1991 | Bianco et al. |
| 5,050,213 | A | 9/1991 | Shear |
| 5,103,392 | A | 4/1992 | Mori |
| 5,103,476 | A | 4/1992 | Waite et al. |
| 5,109,413 | A | 4/1992 | Comerford et al. |
| 5,117,457 | A | 5/1992 | Comerford et al. |
| 5,124,117 | A | 6/1992 | Tatebayashi et al. |
| 5,142,578 | A | 8/1992 | Matyas et al. |
| 5,159,633 | A | 10/1992 | Nakamura |
| 5,163,092 | A | 11/1992 | McNesby et al. |
| 5,177,790 | A | 1/1993 | Hazard |
| 5,193,573 | A | 3/1993 | Chronister |
| 5,204,897 | A | 4/1993 | Wyman |
| 5,222,134 | A | 6/1993 | Waite et al. |
| 5,241,602 | A | 8/1993 | Lee et al. |
| 5,249,184 | A | 9/1993 | Woest |
| 5,257,282 | A | 10/1993 | Adkisson et al. |
| 5,260,999 | A | 11/1993 | Wyman |
| 5,261,002 | A | 11/1993 | Perlman et al. |
| 5,267,316 | A | 11/1993 | Merino Gonzalez et al. |
| 5,269,019 | A | 12/1993 | Peterson |
| 5,274,368 | A | 12/1993 | Breeden |
| 5,287,537 | A | 2/1994 | Newmark et al. |
| 5,301,268 | A | 4/1994 | Takeda |
| 5,303,370 | A | 4/1994 | Brosh |
| 5,319,705 | A | 6/1994 | Halter et al. |
| 5,327,365 | A | 7/1994 | Fujisaki et al. |
| 5,335,346 | A | 8/1994 | Fabbio |
| 5,355,161 | A | 10/1994 | Bird |
| 5,369,262 | A | 11/1994 | Dvorkis |
| 5,406,630 | A | 4/1995 | Piosenka |
| 5,410,598 | A | 4/1995 | Shear |
| 5,414,861 | A | 5/1995 | Horning |
| 5,437,040 | A | 7/1995 | Campbell |
| 5,438,508 | A | 8/1995 | Wyman |
| 5,440,640 | A | 8/1995 | Anshel et al. |
| 5,442,704 | A | 8/1995 | Holtey |
| 5,444,780 | A | 8/1995 | Hartman, Jr. |
| 5,444,782 | A | 8/1995 | Adams et al. |
| 5,448,045 | A | 9/1995 | Clark |
| 5,457,699 | A | 10/1995 | Bode |
| 5,459,867 | A | 10/1995 | Adams |
| 5,469,506 | A | 11/1995 | Berson et al. |
| 5,473,692 | A | 12/1995 | Davis |
| 5,479,514 | A | 12/1995 | Klonowski |
| 5,485,577 | A | 1/1996 | Eyer et al. |
| 5,490,216 | A | 2/1996 | Richardson, III |
| 5,500,897 | A | 3/1996 | Hartman, Jr. |
| 5,502,766 | A | 3/1996 | Boebert et al. |
| 5,509,070 | A | 4/1996 | Schull |
| 5,513,319 | A | 4/1996 | Finch |
| 5,522,040 | A | 5/1996 | Hofsäss |
| 5,530,846 | A | 6/1996 | Strong |
| 5,535,276 | A | 7/1996 | Ganesan |
| 5,552,776 | A | 9/1996 | Wade |
| 5,553,139 | A | 9/1996 | Ross et al. |
| 5,553,143 | A | 9/1996 | Ross et al. |
| 5,557,765 | A | 9/1996 | Lipner et al. |
| 5,563,799 | A | 10/1996 | Brehmer |
| 5,568,552 | A | 10/1996 | Davis |
| 5,570,465 | A | 10/1996 | Tsakanikas |
| 5,586,291 | A | 12/1996 | Lasker |
| 5,588,060 | A | 12/1996 | Aziz |
| 5,604,755 | A | 2/1997 | Bertin et al. |
| 5,629,980 | A | 5/1997 | Stefik et al. |
| 5,634,012 | A | 5/1997 | Stefik et al. |
| 5,636,292 | A | 6/1997 | Rhoads |
| 5,638,443 | A | 6/1997 | Stefik et al. |
| 5,638,513 | A | 6/1997 | Ananda |
| 5,666,416 | A | 9/1997 | Micali |
| 5,668,877 | A | 9/1997 | Aziz |
| 5,671,412 | A | 9/1997 | Christiano |
| 5,673,316 | A | 9/1997 | Auerbach et al. |
| 5,708,709 | A | 1/1998 | Rose |
| 5,710,706 | A | 1/1998 | Märkl |
| 5,710,887 | A | 1/1998 | Chelliah et al. |
| 5,715,403 | A | 2/1998 | Stefik |
| 5,717,757 | A | 2/1998 | Micali |
| 5,721,788 | A | 2/1998 | Powell |
| 5,724,425 | A | 3/1998 | Chang et al. |
| 5,726,898 | A | 3/1998 | Jacobs |
| 5,740,246 | A | 4/1998 | Saito |
| 5,745,573 | A | 4/1998 | Lipner et al. |
| 5,745,879 | A | 4/1998 | Wyman |
| 5,754,657 | A | 5/1998 | Schipper et al. |
| 5,754,763 | A | 5/1998 | Bereiter |
| 5,757,908 | A | 5/1998 | Cooper et al. |
| 5,758,068 | A | 5/1998 | Brandt et al. |
| 5,758,069 | A | 5/1998 | Olsen |
| 5,761,669 | A | 6/1998 | Montague et al. |
| 5,763,832 | A | 6/1998 | Anselm |
| 5,764,275 | A | 6/1998 | Lappington |
| 5,765,152 | A | 6/1998 | Erickson |
| 5,768,382 | A | 6/1998 | Schneier |
| 5,771,354 | A | 6/1998 | Crawford |
| 5,774,870 | A | 6/1998 | Storey |
| 5,787,179 | A | 7/1998 | Ogawa et al. |
| 5,790,664 | A | 8/1998 | Coley et al. |
| 5,793,839 | A | 8/1998 | Farris |
| 5,793,868 | A | 8/1998 | Micali |
| 5,796,967 | A | 8/1998 | Filepp et al. |
| 5,799,088 | A | 8/1998 | Raike |
| 5,799,090 | A | 8/1998 | Angert |
| 5,802,592 | A | 9/1998 | Chess |
| 5,809,144 | A | 9/1998 | Sirbu et al. |
| 5,809,145 | A | 9/1998 | Byrne et al. |
| 5,812,857 | A | 9/1998 | Nelson et al. |
| 5,825,876 | A | 10/1998 | Peterson, Jr. et al. |
| 5,825,877 | A | 10/1998 | Dan |
| 5,825,879 | A | 10/1998 | Davis |
| 5,825,883 | A | 10/1998 | Achibald |
| 5,841,865 | A | 11/1998 | Sudia |
| 5,844,986 | A | 12/1998 | Davis |
| 5,845,065 | A | 12/1998 | Conte |
| 5,845,281 | A | 12/1998 | Benson et al. |
| 5,852,665 | A | 12/1998 | Gressel et al. |
| 5,864,620 | A | 1/1999 | Pettitt et al. |
| 5,872,846 | A | 2/1999 | Ichikawa |
| 5,875,236 | A | 2/1999 | Jankowitz |
| 5,883,670 | A | 3/1999 | Sporer |
| 5,883,955 | A | 3/1999 | Ronning |
| 5,883,958 | A | 3/1999 | Ishiguro et al. |
| 5,892,900 | A | 4/1999 | Ginter et al. |
| 5,892,906 | A | 4/1999 | Chou |
| 5,893,086 | A | 4/1999 | Schmuck |
| 5,905,799 | A | 5/1999 | Ganesan |
| 5,910,987 | A | 6/1999 | Ginter et al. |
| 5,915,025 | A | 6/1999 | Saito et al. |
| 5,917,912 | A | 6/1999 | Ginter et al. |
| 5,925,127 | A | 7/1999 | Ahmad |
| 5,926,624 | A | 7/1999 | Katz et al. |
| 5,933,498 | A | 8/1999 | Schneck et al. |
| 5,934,422 | A | 8/1999 | Steed |
| 5,935,248 | A | 8/1999 | Kuroda |
| 5,943,248 | A | 8/1999 | Clapp |
| 5,943,422 | A | 8/1999 | Van Wie et al. |
| 5,948,061 | A | 9/1999 | Merriman |
| 5,949,877 | A | 9/1999 | Traw |
| 5,949,879 | A | 9/1999 | Benson et al. |
| 5,951,642 | A | 9/1999 | Onoe et al. |
| 5,953,420 | A | 9/1999 | Matyas, Jr. et al. |
| 5,953,502 | A | 9/1999 | Helbig, Sr. |
| 5,956,408 | A | 9/1999 | Arnold |
| 5,958,050 | A | 9/1999 | Griffin et al. |
| 5,982,891 | A | 11/1999 | Ginter et al. |
| 5,982,898 | A | 11/1999 | Hsu et al. |
| 5,983,238 | A | 11/1999 | Becker et al. |
| 5,983,350 | A | 11/1999 | Minear et al. |

(56) References Cited

U.S. PATENT DOCUMENTS

| | | |
|---|---|---|
| 5,991,399 A | 11/1999 | Graunke et al. |
| 5,991,406 A | 11/1999 | Lipner et al. |
| 5,994,710 A | 11/1999 | Knee |
| 5,995,625 A | 11/1999 | Sudia et al. |
| 5,999,629 A | 12/1999 | Maher et al. |
| 5,999,921 A | 12/1999 | Arsenault |
| 6,002,772 A | 12/1999 | Saito |
| 6,005,945 A | 12/1999 | Whitehouse |
| 6,006,332 A | 12/1999 | Rabne et al. |
| 6,009,177 A | 12/1999 | Sudia |
| 6,021,438 A | 2/2000 | Duvvoori |
| 6,023,510 A | 2/2000 | Epstein |
| 6,023,766 A | 2/2000 | Yamamura |
| 6,026,293 A | 2/2000 | Osborn |
| 6,028,596 A | 2/2000 | Oka |
| 6,047,242 A | 4/2000 | Benson |
| 6,049,789 A | 4/2000 | Frison |
| 6,049,878 A | 4/2000 | Caronni et al. |
| 6,058,188 A | 5/2000 | Chandersekaran et al. |
| 6,058,476 A | 5/2000 | Matsuzaki |
| 6,061,451 A | 5/2000 | Muratani et al. |
| 6,061,794 A | 5/2000 | Angelo |
| 6,069,647 A | 5/2000 | Sullivan et al. |
| 6,072,874 A | 6/2000 | Shin et al. |
| 6,073,124 A | 6/2000 | Krishnan et al. |
| 6,078,667 A | 6/2000 | Johnson |
| 6,078,909 A | 6/2000 | Knutson |
| 6,085,976 A | 7/2000 | Sehr |
| 6,094,486 A | 7/2000 | Marchant |
| 6,094,487 A | 7/2000 | Butler et al. |
| 6,101,606 A | 8/2000 | Diersch et al. |
| 6,105,069 A | 8/2000 | Franklin |
| 6,112,181 A | 8/2000 | Shear et al. |
| 6,119,229 A | 9/2000 | Martinez |
| 6,122,741 A | 9/2000 | Patterson et al. |
| 6,131,162 A | 10/2000 | Yoshiura et al. |
| 6,138,236 A | 10/2000 | Mirov et al. |
| 6,141,754 A | 10/2000 | Choy |
| 6,147,773 A | 11/2000 | Taylor |
| 6,148,417 A | 11/2000 | da Silva |
| 6,151,676 A | 11/2000 | Cuccia et al. |
| 6,157,721 A | 12/2000 | Shear et al. |
| 6,158,011 A | 12/2000 | Chen et al. |
| 6,158,657 A | 12/2000 | Hall, III et al. |
| 6,163,512 A | 12/2000 | Jeun |
| 6,167,358 A | 12/2000 | Othmer et al. |
| 6,170,060 B1 | 1/2001 | Mott et al. |
| 6,175,825 B1 | 1/2001 | Fruechtel |
| 6,182,219 B1 | 1/2001 | Feldbau |
| 6,185,678 B1 | 2/2001 | Arbaugh |
| 6,188,995 B1 | 2/2001 | Garst et al. |
| 6,189,146 B1 | 2/2001 | Misra et al. |
| 6,192,392 B1 | 2/2001 | Ginter |
| 6,199,068 B1 | 3/2001 | Carpenter |
| 6,199,169 B1 | 3/2001 | Voth |
| 6,202,151 B1 | 3/2001 | Musgrave et al. |
| 6,212,634 B1 | 4/2001 | Geer et al. |
| 6,219,652 B1 | 4/2001 | Carter et al. |
| 6,219,788 B1 | 4/2001 | Flavin et al. |
| 6,223,291 B1 | 4/2001 | Phul |
| 6,226,618 B1 | 5/2001 | Downs et al. |
| 6,226,747 B1 | 5/2001 | Larsson et al. |
| 6,230,185 B1 | 5/2001 | Salas et al. |
| 6,230,272 B1 | 5/2001 | Lockhart et al. |
| 6,233,567 B1 | 5/2001 | Cohen |
| 6,233,600 B1 | 5/2001 | Salas et al. |
| 6,233,684 B1 | 5/2001 | Stefik et al. |
| 6,233,685 B1 | 5/2001 | Smith |
| 6,236,728 B1 | 5/2001 | Marchant |
| 6,237,098 B1 | 5/2001 | Libicki |
| 6,240,183 B1 | 5/2001 | Marchant |
| 6,243,439 B1 | 6/2001 | Arai |
| 6,243,470 B1 | 6/2001 | Coppersmith |
| 6,243,692 B1 | 6/2001 | Floyd et al. |
| 6,253,193 B1 | 6/2001 | Ginter et al. |
| 6,253,224 B1 | 6/2001 | Brice, Jr. |
| 6,256,774 B1 | 7/2001 | O'Leary et al. |
| 6,260,141 B1 | 7/2001 | Park |
| 6,263,313 B1 | 7/2001 | Milsted et al. |
| 6,263,431 B1 | 7/2001 | Lovelace |
| 6,266,420 B1 | 7/2001 | Langford et al. |
| 6,272,469 B1 | 8/2001 | Koritzinsky et al. |
| 6,275,586 B1 | 8/2001 | Kelly |
| 6,279,111 B1 | 8/2001 | Jensenworth |
| 6,279,156 B1 | 8/2001 | Amberg et al. |
| 6,286,051 B1 | 9/2001 | Becker et al. |
| 6,289,319 B1 | 9/2001 | Lockwood |
| 6,289,452 B1 | 9/2001 | Arnold et al. |
| 6,295,577 B1 | 9/2001 | Anderson |
| 6,298,446 B1 | 10/2001 | Schreiber |
| 6,301,361 B1 | 10/2001 | Mischenko et al. |
| 6,301,660 B1 | 10/2001 | Benson |
| 6,303,924 B1 | 10/2001 | Adan |
| 6,304,915 B1 | 10/2001 | Nguyen et al. |
| 6,304,973 B1 | 10/2001 | Williams |
| 6,314,408 B1 | 11/2001 | Salas et al. |
| 6,314,409 B2 | 11/2001 | Schneck |
| 6,321,314 B1 | 11/2001 | Van Dyke |
| 6,321,335 B1 | 11/2001 | Chu |
| 6,324,287 B1 | 11/2001 | Angert |
| 6,324,683 B1 | 11/2001 | Fuh et al. |
| 6,327,652 B1 | 12/2001 | England |
| 6,330,670 B1 | 12/2001 | England et al. |
| 6,332,025 B2 | 12/2001 | Takahashi et al. |
| 6,334,189 B1 | 12/2001 | Granger |
| 6,335,972 B1 | 1/2002 | Chandersekaran et al. |
| 6,343,280 B2 | 1/2002 | Clark |
| 6,345,256 B1 | 2/2002 | Milsted et al. |
| 6,345,294 B1 | 2/2002 | O'Toole |
| 6,353,888 B1 | 3/2002 | Kakehi et al. |
| 6,360,320 B1 | 3/2002 | Ishiguro et al. |
| 6,363,488 B1 | 3/2002 | Ginter |
| 6,367,017 B1 | 4/2002 | Gray |
| 6,373,047 B1 | 4/2002 | Adan |
| 6,374,354 B1 | 4/2002 | Walmsley et al. |
| 6,374,355 B1 | 4/2002 | Patel |
| 6,374,357 B1 | 4/2002 | Mohammed et al. |
| 6,385,596 B1 | 5/2002 | Wiser et al. |
| 6,385,727 B1 | 5/2002 | Cassagnol |
| 6,389,535 B1 | 5/2002 | Thomlinson et al. |
| 6,389,537 B1 | 5/2002 | Davis |
| 6,389,538 B1 | 5/2002 | Gruse et al. |
| 6,389,541 B1 | 5/2002 | Patterson |
| 6,393,125 B1 | 5/2002 | Barbir |
| 6,393,427 B1 | 5/2002 | Vu |
| 6,397,259 B1 | 5/2002 | Lincke et al. |
| 6,398,245 B1 | 6/2002 | Gruse et al. |
| 6,404,888 B1 | 6/2002 | Barbir |
| 6,405,923 B1 | 6/2002 | Seysen |
| 6,408,170 B1 | 6/2002 | Schmidt |
| 6,409,089 B1 | 6/2002 | Eskicioglu |
| 6,411,941 B1 | 6/2002 | Mullor et al. |
| 6,418,421 B1 | 7/2002 | Hurtado et al. |
| 6,424,714 B1 | 7/2002 | Wasilewski |
| 6,424,715 B1 | 7/2002 | Saito |
| 6,425,081 B1 | 7/2002 | Iwamura |
| 6,438,690 B1 | 8/2002 | Patel et al. |
| 6,441,813 B1 | 8/2002 | Ishibashi |
| 6,442,529 B1 | 8/2002 | Krishan |
| 6,442,690 B1 | 8/2002 | Howard et al. |
| 6,446,207 B1 | 9/2002 | Vanstone et al. |
| 6,449,719 B1 | 9/2002 | Baker |
| 6,460,140 B1 | 10/2002 | Schoch |
| 6,463,534 B1 | 10/2002 | Geiger |
| 6,475,180 B2 | 11/2002 | Peterson et al. |
| 6,477,649 B2 | 11/2002 | Kambayashi |
| 6,490,680 B1 | 12/2002 | Scheidt |
| 6,496,858 B1 | 12/2002 | Frailong |
| 6,502,079 B1 | 12/2002 | Ball et al. |
| 6,505,300 B2 | 1/2003 | Chan et al. |
| 6,507,909 B1 | 1/2003 | Zurko et al. |
| 6,523,119 B2 | 2/2003 | Pavlin et al. |
| 6,527,638 B1 | 3/2003 | Walker et al. |
| 6,530,023 B1 | 3/2003 | Nissl |

(56) References Cited

U.S. PATENT DOCUMENTS

| | | |
|---|---|---|
| 6,532,451 B1 | 3/2003 | Schell et al. |
| 6,539,364 B2 | 3/2003 | Moribatake et al. |
| 6,549,626 B1 | 4/2003 | Al-Salqan |
| 6,550,011 B1 | 4/2003 | Sims, II |
| 6,557,104 B2 | 4/2003 | Vu et al. |
| 6,557,105 B1 | 4/2003 | Tardo et al. |
| 6,560,581 B1 | 5/2003 | Fox et al. |
| 6,560,651 B2 | 5/2003 | Katz et al. |
| 6,564,995 B1 | 5/2003 | Montgomery |
| 6,567,793 B1 | 5/2003 | Hicks |
| 6,571,216 B1 | 5/2003 | Gard et al. |
| 6,574,609 B1 | 6/2003 | Downs et al. |
| 6,574,611 B1 | 6/2003 | Matsuyama et al. |
| 6,574,612 B1 | 6/2003 | Baratti et al. |
| 6,581,162 B1 | 6/2003 | Angelo et al. |
| 6,581,331 B1 | 6/2003 | Kral |
| 6,585,158 B2 | 7/2003 | Norskog |
| 6,587,684 B1 | 7/2003 | Hsu et al. |
| 6,587,837 B1 | 7/2003 | Spagna et al. |
| 6,609,201 B1 | 8/2003 | Folmsbee |
| 6,615,349 B1 | 9/2003 | Hair |
| 6,615,350 B1 | 9/2003 | Schell et al. |
| 6,625,729 B1 | 9/2003 | Angelo |
| 6,631,478 B1 | 10/2003 | Wang |
| 6,640,304 B2 | 10/2003 | Ginter et al. |
| 6,646,244 B2 | 11/2003 | Aas |
| 6,654,389 B1 | 11/2003 | Brunheroto et al. |
| 6,664,948 B2 | 12/2003 | Crane |
| 6,665,303 B1 | 12/2003 | Saito et al. |
| 6,665,409 B1 * | 12/2003 | Rao ................................ 381/63 |
| 6,668,246 B1 | 12/2003 | Yeung et al. |
| 6,671,737 B1 | 12/2003 | Snowdon et al. |
| 6,671,803 B1 | 12/2003 | Pasieka |
| 6,671,813 B2 | 12/2003 | Ananda |
| 6,678,828 B1 | 1/2004 | Pham |
| 6,681,017 B1 | 1/2004 | Matias et al. |
| 6,684,198 B1 | 1/2004 | Shimizu et al. |
| 6,684,332 B1 | 1/2004 | Douglas |
| 6,690,556 B2 | 2/2004 | Smola |
| 6,694,000 B2 | 2/2004 | Ung |
| 6,697,945 B2 | 2/2004 | Ishiguro et al. |
| 6,701,433 B1 | 3/2004 | Schell et al. |
| 6,704,873 B1 | 3/2004 | Underwood |
| 6,708,176 B2 | 3/2004 | Strunk |
| 6,711,263 B1 | 3/2004 | Nordenstam et al. |
| 6,714,921 B2 | 3/2004 | Pirolli et al. |
| 6,715,049 B1 | 3/2004 | Hayakashi |
| 6,716,652 B1 | 4/2004 | Ortlieb |
| 6,728,880 B1 | 4/2004 | Sites |
| 6,738,810 B1 | 5/2004 | Kramer |
| 6,741,851 B1 | 5/2004 | Lee et al. |
| 6,763,458 B1 | 7/2004 | Watanabe |
| 6,765,470 B2 | 7/2004 | Shinzaki |
| 6,772,340 B1 | 8/2004 | Peinado et al. |
| 6,775,655 B1 | 8/2004 | Peinado et al. |
| 6,781,956 B1 | 8/2004 | Cheung |
| 6,791,157 B1 | 9/2004 | Casto |
| 6,792,531 B2 | 9/2004 | Heiden |
| 6,792,537 B1 | 9/2004 | Liu et al. |
| 6,799,270 B1 | 9/2004 | Bull et al. |
| 6,801,998 B1 | 10/2004 | Hanna et al. |
| 6,807,542 B2 | 10/2004 | Bantz et al. |
| 6,816,596 B1 | 11/2004 | Peinado et al. |
| 6,816,809 B2 | 11/2004 | Circenis |
| 6,816,900 B1 | 11/2004 | Vogel |
| 6,820,063 B1 | 11/2004 | England et al. |
| 6,826,606 B2 | 11/2004 | Freeman |
| 6,826,690 B1 | 11/2004 | Hind |
| 6,829,708 B1 | 12/2004 | Peinado et al. |
| 6,832,319 B1 | 12/2004 | Bell et al. |
| 6,834,352 B2 | 12/2004 | Shin |
| 6,839,841 B1 | 1/2005 | Medvinsky |
| 6,844,871 B1 | 1/2005 | Hinckley |
| 6,847,942 B1 | 1/2005 | Land |
| 6,850,252 B1 | 2/2005 | Hofberg |
| 6,851,051 B1 | 2/2005 | Bolle |
| 6,856,997 B2 | 2/2005 | Lee et al. |
| 6,859,790 B1 | 2/2005 | Nonaka et al. |
| 6,868,433 B1 | 3/2005 | Philyaw |
| 6,871,283 B1 | 3/2005 | Zurko |
| 6,873,975 B1 | 3/2005 | Hatakeyama et al. |
| 6,889,246 B1 | 5/2005 | Kawamoto et al. |
| 6,895,504 B1 | 5/2005 | Zhang |
| 6,898,286 B2 | 5/2005 | Murray |
| 6,918,034 B1 | 7/2005 | Sengodan et al. |
| 6,920,567 B1 | 7/2005 | Doherty et al. |
| 6,922,724 B1 | 7/2005 | Freeman |
| 6,934,840 B2 | 8/2005 | Rich et al. |
| 6,934,942 B1 | 8/2005 | Chilimbi |
| 6,948,073 B2 | 9/2005 | England et al. |
| 6,954,728 B1 | 10/2005 | Kusumoto |
| 6,957,186 B1 | 10/2005 | Guheen |
| 6,959,288 B1 | 10/2005 | Medina et al. |
| 6,959,290 B2 | 10/2005 | Stefik et al. |
| 6,959,291 B1 | 10/2005 | Armstrong |
| 6,961,426 B2 | 11/2005 | Vesely |
| 6,961,858 B2 | 11/2005 | Fransdonk |
| 6,973,444 B1 | 12/2005 | Blinn et al. |
| 6,976,162 B1 | 12/2005 | Ellison |
| 6,976,163 B1 | 12/2005 | Hind |
| 6,978,367 B1 | 12/2005 | Hind et al. |
| 6,983,049 B2 | 1/2006 | Wee et al. |
| 6,983,050 B1 | 1/2006 | Yacobi |
| 6,986,042 B2 | 1/2006 | Griffin |
| 6,990,174 B2 | 1/2006 | Eskelinen |
| 6,993,137 B2 | 1/2006 | Fransdonk |
| 6,993,648 B2 | 1/2006 | Goodman |
| 7,000,100 B2 | 2/2006 | Lacombe |
| 7,000,829 B2 | 2/2006 | Harris |
| 7,006,633 B1 | 2/2006 | Reece |
| 7,010,032 B1 | 3/2006 | Kikuchi et al. |
| 7,010,808 B1 | 3/2006 | Leung et al. |
| 7,013,384 B2 | 3/2006 | Challener |
| 7,016,498 B2 | 3/2006 | Peinado et al. |
| 7,017,188 B1 | 3/2006 | Schmeidler et al. |
| 7,020,704 B1 | 3/2006 | Lipscomb et al. |
| 7,020,781 B1 | 3/2006 | Saw et al. |
| 7,024,393 B1 | 4/2006 | Peinado et al. |
| 7,028,149 B2 | 4/2006 | Grawrock |
| 7,028,180 B1 | 4/2006 | Aull |
| 7,036,011 B2 | 4/2006 | Grimes et al. |
| 7,043,633 B1 | 5/2006 | Fink |
| 7,047,222 B1 | 5/2006 | Bush |
| 7,047,404 B1 | 5/2006 | Doonan et al. |
| 7,051,005 B1 | 5/2006 | Peinado |
| 7,052,530 B2 | 5/2006 | Edlund |
| 7,054,468 B2 | 5/2006 | Yang |
| 7,055,169 B2 | 5/2006 | Delpuch |
| 7,058,819 B2 | 6/2006 | Okaue |
| 7,069,442 B2 | 6/2006 | Sutton, II |
| 7,069,595 B2 | 6/2006 | Cognigni |
| 7,073,056 B2 | 7/2006 | Kocher |
| 7,073,063 B2 | 7/2006 | Peinado |
| 7,076,652 B2 | 7/2006 | Ginter |
| 7,080,039 B1 | 7/2006 | Marsh |
| 7,080,043 B2 | 7/2006 | Chase, Jr. et al. |
| 7,089,594 B2 | 8/2006 | Lal et al. |
| 7,095,852 B2 | 8/2006 | Wack |
| 7,096,469 B1 | 8/2006 | Kubala |
| 7,097,357 B2 | 8/2006 | Johnson |
| 7,103,574 B1 | 9/2006 | Peinado et al. |
| 7,107,462 B2 | 9/2006 | Fransdonk |
| 7,113,912 B2 | 9/2006 | Stefik |
| 7,116,969 B2 | 10/2006 | Park |
| 7,117,183 B2 | 10/2006 | Blair |
| 7,120,250 B2 | 10/2006 | Candelore |
| 7,121,460 B1 | 10/2006 | Parsons |
| 7,123,608 B1 | 10/2006 | Scott |
| 7,124,938 B1 | 10/2006 | Marsh |
| 7,127,513 B2 | 10/2006 | Karger et al. |
| 7,127,579 B2 | 10/2006 | Zimmer |
| 7,130,951 B1 | 10/2006 | Christie |
| 7,133,846 B1 | 11/2006 | Ginter et al. |
| 7,136,838 B1 | 11/2006 | Peinado et al. |

(56) References Cited

U.S. PATENT DOCUMENTS

| | | |
|---|---|---|
| 7,136,945 B2 | 11/2006 | Gibbs et al. |
| 7,143,066 B2 | 11/2006 | Shear et al. |
| 7,143,297 B2 | 11/2006 | Buchheit et al. |
| 7,145,919 B2 | 12/2006 | Krishnarajah et al. |
| 7,146,504 B2 | 12/2006 | Parks et al. |
| 7,162,645 B2 | 1/2007 | Iguchi |
| 7,171,539 B2 | 1/2007 | Mansell |
| 7,171,662 B1 | 1/2007 | Misra et al. |
| 7,174,320 B2 * | 2/2007 | Rothrock .................. 705/58 |
| 7,174,452 B2 | 2/2007 | Carr |
| 7,174,457 B1 | 2/2007 | England |
| 7,200,760 B2 | 4/2007 | Riebe |
| 7,203,966 B2 | 4/2007 | Abburi et al. |
| 7,207,039 B2 | 4/2007 | Komarla |
| 7,213,005 B2 | 5/2007 | Mourad et al. |
| 7,213,266 B1 | 5/2007 | Maher |
| 7,216,363 B2 | 5/2007 | Serkowski et al. |
| 7,216,368 B2 | 5/2007 | Ishiguro |
| 7,219,842 B2 | 5/2007 | Wang et al. |
| 7,222,062 B2 | 5/2007 | Goud |
| 7,224,805 B2 | 5/2007 | Hurst |
| 7,228,437 B2 | 6/2007 | Spagna et al. |
| 7,233,948 B1 | 6/2007 | Shamoon |
| 7,234,144 B2 | 6/2007 | Wilt |
| 7,236,455 B1 | 6/2007 | Proudler |
| 7,243,366 B2 | 7/2007 | Medvinsky et al. |
| 7,254,836 B2 | 8/2007 | Alkove |
| 7,260,721 B2 | 8/2007 | Tanaka |
| 7,266,569 B2 | 9/2007 | Cutter et al. |
| 7,266,714 B2 | 9/2007 | Davies et al. |
| 7,275,159 B2 | 9/2007 | Hull et al. |
| 7,278,165 B2 | 10/2007 | Molaro |
| 7,278,168 B1 | 10/2007 | Chaudhury et al. |
| 7,287,280 B2 | 10/2007 | Young |
| 7,296,154 B2 | 11/2007 | Evans |
| 7,296,296 B2 | 11/2007 | Dunbar |
| 7,299,292 B2 | 11/2007 | Morten et al. |
| 7,299,358 B2 | 11/2007 | Chateau |
| 7,308,573 B2 | 12/2007 | Kostal et al. |
| 7,310,732 B2 | 12/2007 | Matsuyama |
| 7,315,941 B2 | 1/2008 | Ramzan |
| 7,319,759 B1 | 1/2008 | Peinado et al. |
| 7,325,139 B2 | 1/2008 | Ishiguro et al. |
| 7,336,791 B2 | 2/2008 | Ishiguro |
| 7,343,496 B1 | 3/2008 | Hsiang |
| 7,353,209 B1 | 4/2008 | Peinado |
| 7,353,402 B2 | 4/2008 | Bourne et al. |
| 7,356,709 B2 | 4/2008 | Gunyakti |
| 7,359,807 B2 | 4/2008 | Frank |
| 7,360,253 B2 | 4/2008 | Frank |
| 7,370,212 B2 | 5/2008 | Bourne et al. |
| 7,376,976 B2 | 5/2008 | Fierstein |
| 7,382,883 B2 | 6/2008 | Cross |
| 7,383,205 B1 | 6/2008 | Peinado |
| 7,392,429 B2 | 6/2008 | Frank |
| 7,395,245 B2 | 7/2008 | Okamoto et al. |
| 7,395,452 B2 | 7/2008 | Nicholson et al. |
| 7,406,446 B2 | 7/2008 | Frank |
| 7,421,413 B2 | 9/2008 | Frank |
| 7,426,752 B2 | 9/2008 | Agrawal |
| 7,441,121 B2 | 10/2008 | Cutter et al. |
| 7,441,246 B2 | 10/2008 | Auerbach |
| 7,451,202 B2 | 11/2008 | Nakahara |
| 7,461,249 B1 | 12/2008 | Pearson |
| 7,464,103 B2 | 12/2008 | Siu |
| 7,475,137 B2 | 1/2009 | Holden et al. |
| 7,484,103 B2 | 1/2009 | Woo et al. |
| 7,490,356 B2 | 2/2009 | Lieblich |
| 7,493,487 B2 | 2/2009 | Phillips |
| 7,494,277 B2 | 2/2009 | Setala |
| 7,500,267 B2 | 3/2009 | McKune |
| 7,502,945 B2 | 3/2009 | Bourne et al. |
| 7,519,816 B2 | 4/2009 | Phillips |
| 7,526,649 B2 | 4/2009 | Wiseman |
| 7,529,927 B2 | 5/2009 | Peinado et al. |
| 7,539,863 B2 | 5/2009 | Phillips et al. |
| 7,540,024 B2 | 5/2009 | Phillips et al. |
| 7,549,060 B2 | 6/2009 | Bourne et al. |
| 7,552,331 B2 | 6/2009 | Evans |
| 7,558,463 B2 | 7/2009 | Jain |
| 7,562,220 B2 | 7/2009 | Frank |
| 7,565,325 B2 | 7/2009 | Lenard |
| 7,568,096 B2 | 7/2009 | Evans |
| 7,584,502 B2 | 9/2009 | Alkove |
| 7,590,841 B2 | 9/2009 | Sherwani |
| 7,596,784 B2 | 9/2009 | Abrams |
| 7,610,631 B2 | 10/2009 | Frank |
| 7,617,401 B2 | 11/2009 | Marsh |
| 7,644,239 B2 | 1/2010 | Ergan |
| 7,653,943 B2 | 1/2010 | Evans |
| 7,665,143 B2 | 2/2010 | Havens |
| 7,669,056 B2 | 2/2010 | Frank |
| 7,676,846 B2 | 3/2010 | Robert et al. |
| 7,680,744 B2 | 3/2010 | Blinn |
| 7,694,153 B2 | 4/2010 | Ahdout |
| 7,703,141 B2 | 4/2010 | Alkove |
| 7,739,505 B2 | 6/2010 | Reneris |
| 7,752,674 B2 | 7/2010 | Evans |
| 7,770,205 B2 | 8/2010 | Frank |
| 7,809,646 B2 | 10/2010 | Rose |
| 7,810,163 B2 | 10/2010 | Evans |
| 7,814,532 B2 | 10/2010 | Cromer |
| 7,856,404 B2 | 12/2010 | Evans |
| 7,877,607 B2 | 1/2011 | Circenis |
| 7,891,007 B2 | 2/2011 | Waxman |
| 7,900,140 B2 | 3/2011 | Mohammed |
| 7,903,117 B2 | 3/2011 | Howell |
| 7,958,029 B1 | 6/2011 | Bobich |
| 7,979,721 B2 | 7/2011 | Westerinen |
| 8,060,923 B2 | 11/2011 | Cutter |
| 8,074,287 B2 | 12/2011 | Barde |
| 2001/0005201 A1 | 6/2001 | Digiorgio et al. |
| 2001/0010076 A1 | 7/2001 | Wray |
| 2001/0011253 A1 | 8/2001 | Coley et al. |
| 2001/0021252 A1 | 9/2001 | Carter |
| 2001/0034711 A1 | 10/2001 | Tashenberg |
| 2001/0044782 A1 | 11/2001 | Hughes |
| 2001/0049667 A1 | 12/2001 | Moribatake et al. |
| 2001/0051996 A1 | 12/2001 | Cooper et al. |
| 2001/0052077 A1 | 12/2001 | Fung et al. |
| 2001/0053223 A1 | 12/2001 | Ishibashi et al. |
| 2001/0056413 A1 | 12/2001 | Suzuki et al. |
| 2001/0056539 A1 | 12/2001 | Pavlin et al. |
| 2002/0002597 A1 | 1/2002 | Morrell, Jr. |
| 2002/0002674 A1 | 1/2002 | Grimes et al. |
| 2002/0004773 A1 | 1/2002 | Xu et al. |
| 2002/0006204 A1 | 1/2002 | England et al. |
| 2002/0007310 A1 | 1/2002 | Long |
| 2002/0007454 A1 | 1/2002 | Tarpenning et al. |
| 2002/0007456 A1 | 1/2002 | Peinado et al. |
| 2002/0013772 A1 | 1/2002 | Peinado |
| 2002/0018566 A1 | 2/2002 | Kawatsura et al. |
| 2002/0019814 A1 | 2/2002 | Ganesan |
| 2002/0023212 A1 | 2/2002 | Proudler |
| 2002/0026574 A1 | 2/2002 | Watanabe et al. |
| 2002/0038231 A1 | 3/2002 | Hasebe |
| 2002/0044654 A1 | 4/2002 | Maeda et al. |
| 2002/0046098 A1 | 4/2002 | Maggio |
| 2002/0048369 A1 | 4/2002 | Ginter et al. |
| 2002/0049679 A1 | 4/2002 | Russell et al. |
| 2002/0055906 A1 | 5/2002 | Katz |
| 2002/0056042 A1 | 5/2002 | van der Kaay |
| 2002/0056747 A1 | 5/2002 | Matsuyama et al. |
| 2002/0063933 A1 | 5/2002 | Maeda et al. |
| 2002/0065781 A1 | 5/2002 | Hillegass et al. |
| 2002/0067767 A1 | 6/2002 | Sugahara |
| 2002/0073068 A1 | 6/2002 | Guha |
| 2002/0083319 A1 | 6/2002 | Ishiguro et al. |
| 2002/0091569 A1 | 7/2002 | Kitaura |
| 2002/0095603 A1 | 7/2002 | Godwin |
| 2002/0107701 A1 | 8/2002 | Batty |
| 2002/0107806 A1 | 8/2002 | Higashi et al. |
| 2002/0108050 A1 | 8/2002 | Raley et al. |
| 2002/0111916 A1 | 8/2002 | Coronna |

(56) References Cited

U.S. PATENT DOCUMENTS

| | | |
|---|---|---|
| 2002/0112171 A1 | 8/2002 | Ginter et al. |
| 2002/0118835 A1 | 8/2002 | Uemura |
| 2002/0123964 A1 | 9/2002 | Kramer |
| 2002/0123968 A1 | 9/2002 | Okayama et al. |
| 2002/0124212 A1 | 9/2002 | Nitschke |
| 2002/0129359 A1 | 9/2002 | Lichner |
| 2002/0138549 A1 | 9/2002 | Urien |
| 2002/0141451 A1 | 10/2002 | Gates |
| 2002/0144131 A1 | 10/2002 | Spacey |
| 2002/0147601 A1 | 10/2002 | Fagan |
| 2002/0147782 A1 | 10/2002 | Dimitrova |
| 2002/0147912 A1 | 10/2002 | Shmueli |
| 2002/0152393 A1 | 10/2002 | Thoma et al. |
| 2002/0156743 A1 | 10/2002 | DeTreville |
| 2002/0157002 A1 | 10/2002 | Messerges et al. |
| 2002/0166056 A1 | 11/2002 | Johnson et al. |
| 2002/0169954 A1 | 11/2002 | Bandini et al. |
| 2002/0169974 A1 | 11/2002 | McKune |
| 2002/0178071 A1 | 11/2002 | Walker |
| 2002/0184482 A1 | 12/2002 | Lacombe |
| 2002/0184508 A1 | 12/2002 | Bialick |
| 2002/0184515 A1 | 12/2002 | Oho et al. |
| 2002/0186843 A1 | 12/2002 | Weinstein et al. |
| 2002/0190876 A1 | 12/2002 | Lai et al. |
| 2002/0193101 A1 | 12/2002 | McAlinden |
| 2002/0194132 A1 | 12/2002 | Pearson |
| 2002/0194474 A1 | 12/2002 | Natsuno et al. |
| 2002/0198845 A1 | 12/2002 | Lao et al. |
| 2002/0198846 A1 | 12/2002 | Lao |
| 2003/0005135 A1 | 1/2003 | Inoue |
| 2003/0005335 A1 | 1/2003 | Watanabe |
| 2003/0014323 A1 | 1/2003 | Scheer |
| 2003/0014496 A1 | 1/2003 | Spencer et al. |
| 2003/0018491 A1 | 1/2003 | Nakahara et al. |
| 2003/0021416 A1 | 1/2003 | Brown |
| 2003/0023564 A1 | 1/2003 | Padhye et al. |
| 2003/0027549 A1 | 2/2003 | Kiel |
| 2003/0028454 A1 | 2/2003 | Oho et al. |
| 2003/0028490 A1 | 2/2003 | Miura et al. |
| 2003/0035409 A1 | 2/2003 | Wang |
| 2003/0037246 A1 | 2/2003 | Goodman |
| 2003/0037261 A1 | 2/2003 | Meffert et al. |
| 2003/0040960 A1 | 2/2003 | Eckmann |
| 2003/0041008 A1 | 2/2003 | Grey et al. |
| 2003/0041257 A1 | 2/2003 | Wee et al. |
| 2003/0046026 A1 | 3/2003 | Levy |
| 2003/0046238 A1 | 3/2003 | Nonaka et al. |
| 2003/0048473 A1 | 3/2003 | Rosen |
| 2003/0053630 A1 | 3/2003 | Elliot et al. |
| 2003/0056107 A1 | 3/2003 | Cammack |
| 2003/0056118 A1 | 3/2003 | Troyansky et al. |
| 2003/0063750 A1 | 4/2003 | Medvinsky |
| 2003/0065918 A1 | 4/2003 | Willey |
| 2003/0069854 A1 | 4/2003 | Hsu et al. |
| 2003/0069981 A1 | 4/2003 | Trovato |
| 2003/0078853 A1 | 4/2003 | Peinado et al. |
| 2003/0079038 A1 | 4/2003 | Robbin et al. |
| 2003/0081592 A1 | 5/2003 | Krishnarajah et al. |
| 2003/0084104 A1 | 5/2003 | Salem et al. |
| 2003/0084278 A1 | 5/2003 | Cromer |
| 2003/0084285 A1 | 5/2003 | Cromer |
| 2003/0084306 A1 | 5/2003 | Abburi et al. |
| 2003/0084337 A1 | 5/2003 | Simionescu |
| 2003/0084352 A1 | 5/2003 | Schwartz |
| 2003/0088500 A1 | 5/2003 | Shinohara |
| 2003/0093694 A1 | 5/2003 | Medvinsky |
| 2003/0097596 A1 | 5/2003 | Muratov |
| 2003/0108164 A1 | 6/2003 | Laurin et al. |
| 2003/0110388 A1 | 6/2003 | Pavlin |
| 2003/0115457 A1 | 6/2003 | Wildish et al. |
| 2003/0115458 A1 | 6/2003 | Song |
| 2003/0120935 A1 | 6/2003 | Teal |
| 2003/0126519 A1 | 7/2003 | Odorcic |
| 2003/0131252 A1 | 7/2003 | Barton |
| 2003/0131353 A1 | 7/2003 | Blom et al. |
| 2003/0133576 A1 | 7/2003 | Grumiaux |
| 2003/0135380 A1 | 7/2003 | Lehr |
| 2003/0149670 A1 | 8/2003 | Cronce |
| 2003/0149671 A1 | 8/2003 | Yamamoto |
| 2003/0154393 A1 | 8/2003 | Young |
| 2003/0156572 A1 | 8/2003 | Hui |
| 2003/0156719 A1 | 8/2003 | Cronce |
| 2003/0161473 A1 | 8/2003 | Fransdonk |
| 2003/0163383 A1 | 8/2003 | Engelhart |
| 2003/0163712 A1 | 8/2003 | LaMothe |
| 2003/0167392 A1 | 9/2003 | Fransdonk |
| 2003/0172345 A1 | 9/2003 | Engelsberg et al. |
| 2003/0172376 A1 | 9/2003 | Coffin, III et al. |
| 2003/0185395 A1 | 10/2003 | Lee |
| 2003/0185399 A1 | 10/2003 | Ishiguro |
| 2003/0187801 A1 | 10/2003 | Chase et al. |
| 2003/0188117 A1 | 10/2003 | Yoshino et al. |
| 2003/0188165 A1 | 10/2003 | Sutton, II |
| 2003/0188179 A1 | 10/2003 | Challener |
| 2003/0194092 A1 | 10/2003 | Parks et al. |
| 2003/0194094 A1 | 10/2003 | Lampson et al. |
| 2003/0196102 A1 | 10/2003 | McCarroll |
| 2003/0196106 A1 | 10/2003 | Erfani |
| 2003/0198350 A1 | 10/2003 | Foster et al. |
| 2003/0200336 A1 | 10/2003 | Pal |
| 2003/0204738 A1 | 10/2003 | Morgan |
| 2003/0208338 A1 | 11/2003 | Challener |
| 2003/0208573 A1 | 11/2003 | Harrison |
| 2003/0229702 A1 | 12/2003 | Hensbergen |
| 2003/0233553 A1 | 12/2003 | Parks et al. |
| 2003/0236820 A1 | 12/2003 | Tierney et al. |
| 2003/0236978 A1 * | 12/2003 | Evans et al. .................. 713/164 |
| 2004/0001088 A1 | 1/2004 | Stancil |
| 2004/0001594 A1 | 1/2004 | Krishnaswamy et al. |
| 2004/0003139 A1 | 1/2004 | Cottrille et al. |
| 2004/0003190 A1 | 1/2004 | Childs |
| 2004/0003268 A1 | 1/2004 | Bourne et al. |
| 2004/0003269 A1 * | 1/2004 | Waxman et al. .............. 713/193 |
| 2004/0003270 A1 | 1/2004 | Bourne et al. |
| 2004/0003288 A1 | 1/2004 | Wiseman |
| 2004/0010440 A1 | 1/2004 | Lenard |
| 2004/0010602 A1 | 1/2004 | Van Vleck et al. |
| 2004/0010684 A1 | 1/2004 | Douglas |
| 2004/0019456 A1 | 1/2004 | Circenis |
| 2004/0023636 A1 | 2/2004 | Gurel |
| 2004/0030898 A1 | 2/2004 | Tsuria et al. |
| 2004/0030912 A1 | 2/2004 | Merkel, Jr. |
| 2004/0034816 A1 | 2/2004 | Richard |
| 2004/0039916 A1 | 2/2004 | Aldis et al. |
| 2004/0039924 A1 | 2/2004 | Baldwin |
| 2004/0039932 A1 | 2/2004 | Elazar et al. |
| 2004/0039960 A1 | 2/2004 | Kassayan |
| 2004/0042451 A1 | 3/2004 | Takaku |
| 2004/0044629 A1 | 3/2004 | Rhodes |
| 2004/0045027 A1 | 3/2004 | Takamura et al. |
| 2004/0054630 A1 | 3/2004 | Ginter |
| 2004/0054678 A1 | 3/2004 | Okamoto et al. |
| 2004/0054907 A1 | 3/2004 | Chateau |
| 2004/0054908 A1 | 3/2004 | Circenis |
| 2004/0054909 A1 | 3/2004 | Serkowski |
| 2004/0054912 A1 | 3/2004 | Adent et al. |
| 2004/0059937 A1 | 3/2004 | Nakano |
| 2004/0064351 A1 | 4/2004 | Mikurak |
| 2004/0064707 A1 | 4/2004 | McCann |
| 2004/0067746 A1 | 4/2004 | Johnson |
| 2004/0073670 A1 | 4/2004 | Chack |
| 2004/0080541 A1 | 4/2004 | Saiga et al. |
| 2004/0083289 A1 | 4/2004 | Karger et al. |
| 2004/0088541 A1 | 5/2004 | Messerges et al. |
| 2004/0088548 A1 | 5/2004 | Smetters |
| 2004/0093371 A1 | 5/2004 | Burrows |
| 2004/0093508 A1 | 5/2004 | Foerstner |
| 2004/0103305 A1 | 5/2004 | Ginter |
| 2004/0107125 A1 | 6/2004 | Guheen |
| 2004/0107356 A1 | 6/2004 | Shamoon |
| 2004/0107359 A1 | 6/2004 | Kawano |
| 2004/0107368 A1 | 6/2004 | Colvin |
| 2004/0111615 A1 | 6/2004 | Nyang |
| 2004/0123127 A1 | 6/2004 | Teicher |

(56) References Cited

U.S. PATENT DOCUMENTS

| | | |
|---|---|---|
| 2004/0125755 A1 | 7/2004 | Roberts |
| 2004/0125757 A1 | 7/2004 | Mela et al. |
| 2004/0125791 A1 | 7/2004 | Hoffmann |
| 2004/0127196 A1 | 7/2004 | Dabbish et al. |
| 2004/0128251 A1 | 7/2004 | Adam |
| 2004/0133794 A1* | 7/2004 | Kocher et al. ............... 713/193 |
| 2004/0139027 A1 | 7/2004 | Molaro |
| 2004/0139312 A1 | 7/2004 | Medvisky |
| 2004/0143736 A1 | 7/2004 | Cross et al. |
| 2004/0143760 A1 | 7/2004 | Alkove et al. |
| 2004/0146015 A1 | 7/2004 | Cross |
| 2004/0158709 A1 | 8/2004 | Narin et al. |
| 2004/0158731 A1 | 8/2004 | Narin et al. |
| 2004/0158742 A1 | 8/2004 | Srinivasan |
| 2004/0168073 A1 | 8/2004 | Bourne et al. |
| 2004/0168077 A1 | 8/2004 | Waxman et al. |
| 2004/0184605 A1 | 9/2004 | Soliman |
| 2004/0193919 A1 | 9/2004 | Dabbish |
| 2004/0199769 A1 | 10/2004 | Proudler |
| 2004/0205028 A1 | 10/2004 | Verosub et al. |
| 2004/0205357 A1 | 10/2004 | Kuo et al. |
| 2004/0205510 A1 | 10/2004 | Rising |
| 2004/0210535 A1 | 10/2004 | Erickson |
| 2004/0220858 A1 | 11/2004 | Maggio |
| 2004/0225519 A1 | 11/2004 | Martin |
| 2004/0225894 A1 | 11/2004 | Colvin |
| 2004/0236717 A1 | 11/2004 | Demartini et al. |
| 2004/0243819 A1* | 12/2004 | Bourne et al. ............... 713/193 |
| 2004/0249759 A1 | 12/2004 | Higashi et al. |
| 2004/0255000 A1 | 12/2004 | Simionescu |
| 2004/0261093 A1 | 12/2004 | Rebaud et al. |
| 2004/0268120 A1 | 12/2004 | Mirtal |
| 2005/0002525 A1 | 1/2005 | Alkove et al. |
| 2005/0005114 A1 | 1/2005 | Medvinsky |
| 2005/0008240 A1 | 1/2005 | Banerji et al. |
| 2005/0010531 A1 | 1/2005 | Kushalnagar et al. |
| 2005/0010536 A1 | 1/2005 | Cochran et al. |
| 2005/0010766 A1 | 1/2005 | Holden et al. |
| 2005/0015343 A1 | 1/2005 | Nagai |
| 2005/0021944 A1 | 1/2005 | Craft |
| 2005/0021989 A1 | 1/2005 | Johnson et al. |
| 2005/0021992 A1 | 1/2005 | Aida |
| 2005/0028000 A1 | 2/2005 | Bulusu |
| 2005/0028151 A1 | 2/2005 | Roth et al. |
| 2005/0033747 A1 | 2/2005 | Wittkotter |
| 2005/0039013 A1 | 2/2005 | Bajikar |
| 2005/0044197 A1 | 2/2005 | Lai |
| 2005/0044397 A1 | 2/2005 | Bjorkengren |
| 2005/0050329 A1 | 3/2005 | Wilding et al. |
| 2005/0050344 A1 | 3/2005 | Hull et al. |
| 2005/0050355 A1 | 3/2005 | Graunke |
| 2005/0060388 A1 | 3/2005 | Tatsumi |
| 2005/0065880 A1 | 3/2005 | Amato |
| 2005/0069039 A1 | 3/2005 | Crinon |
| 2005/0080701 A1 | 4/2005 | Tunney |
| 2005/0081042 A1 | 4/2005 | Venkatesan et al. |
| 2005/0086174 A1 | 4/2005 | Eng |
| 2005/0091104 A1 | 4/2005 | Abraham |
| 2005/0091169 A1 | 4/2005 | Peinado et al. |
| 2005/0097204 A1 | 5/2005 | Horowitz |
| 2005/0102181 A1 | 5/2005 | Scroggie |
| 2005/0108547 A1 | 5/2005 | Sakai |
| 2005/0108564 A1 | 5/2005 | Freeman |
| 2005/0114896 A1 | 5/2005 | Hug et al. |
| 2005/0120125 A1 | 6/2005 | Morten et al. |
| 2005/0120251 A1 | 6/2005 | Fukumori |
| 2005/0125673 A1 | 6/2005 | Cheng |
| 2005/0129296 A1 | 6/2005 | Setala |
| 2005/0132150 A1 | 6/2005 | Jewell |
| 2005/0135613 A1 | 6/2005 | Brandenburg et al. |
| 2005/0138357 A1 | 6/2005 | Swenson et al. |
| 2005/0138362 A1 | 6/2005 | Savage et al. |
| 2005/0138370 A1 | 6/2005 | Goud |
| 2005/0138388 A1 | 6/2005 | Paganetti et al. |
| 2005/0138389 A1 | 6/2005 | Catherman |
| 2005/0138406 A1 | 6/2005 | Cox |
| 2005/0138423 A1 | 6/2005 | Ranganathan |
| 2005/0141717 A1 | 6/2005 | Cromer |
| 2005/0144099 A1 | 6/2005 | Deb |
| 2005/0149722 A1 | 7/2005 | Wiseman |
| 2005/0149729 A1 | 7/2005 | Zimmer |
| 2005/0163052 A1 | 7/2005 | Savage et al. |
| 2005/0166051 A1 | 7/2005 | Buer |
| 2005/0169444 A1 | 8/2005 | Inon |
| 2005/0169467 A1* | 8/2005 | Risan et al. ............... 380/201 |
| 2005/0172121 A1 | 8/2005 | Risan |
| 2005/0177875 A1 | 8/2005 | Kamperman et al. |
| 2005/0182921 A1 | 8/2005 | Duncan |
| 2005/0182931 A1 | 8/2005 | Robert et al. |
| 2005/0182940 A1 | 8/2005 | Sutton, II |
| 2005/0188843 A1 | 9/2005 | Edlund |
| 2005/0192099 A1 | 9/2005 | Nguyen et al. |
| 2005/0192907 A1 | 9/2005 | Blinn et al. |
| 2005/0198510 A1 | 9/2005 | Robert et al. |
| 2005/0203601 A1 | 9/2005 | Morgenstern |
| 2005/0204391 A1* | 9/2005 | Hunleth et al. ............... 725/78 |
| 2005/0210252 A1 | 9/2005 | Freeman |
| 2005/0213761 A1 | 9/2005 | Walmsley |
| 2005/0216413 A1 | 9/2005 | Murakami |
| 2005/0216577 A1 | 9/2005 | Durham et al. |
| 2005/0221766 A1 | 10/2005 | Briek et al. |
| 2005/0223415 A1 | 10/2005 | Oho et al. |
| 2005/0226170 A1 | 10/2005 | Relan et al. |
| 2005/0235141 A1 | 10/2005 | Ibrahim |
| 2005/0240533 A1 | 10/2005 | Cutter et al. |
| 2005/0246521 A1 | 11/2005 | Bade |
| 2005/0246525 A1 | 11/2005 | Bade |
| 2005/0246552 A1 | 11/2005 | Bade |
| 2005/0254526 A1 | 11/2005 | Wang et al. |
| 2005/0257073 A1 | 11/2005 | Bade |
| 2005/0265548 A1 | 12/2005 | Tsuchimura |
| 2005/0265555 A1 | 12/2005 | Pippuri |
| 2005/0268115 A1 | 12/2005 | Barde |
| 2005/0268174 A1 | 12/2005 | Kumagai |
| 2005/0275866 A1 | 12/2005 | Corlett |
| 2005/0278519 A1 | 12/2005 | Luebke |
| 2005/0279371 A1 | 12/2005 | Billard |
| 2005/0279827 A1 | 12/2005 | Mascavage |
| 2005/0283601 A1 | 12/2005 | Tahan |
| 2005/0286476 A1 | 12/2005 | Crosswy |
| 2005/0289076 A1 | 12/2005 | Lambert |
| 2005/0289177 A1 | 12/2005 | Hohmann, II |
| 2005/0289343 A1 | 12/2005 | Tahan |
| 2006/0010076 A1 | 1/2006 | Cutter |
| 2006/0010326 A1 | 1/2006 | Bade |
| 2006/0014521 A1* | 1/2006 | Chen et al. ............... 455/410 |
| 2006/0015717 A1 | 1/2006 | Liu |
| 2006/0015718 A1 | 1/2006 | Liu |
| 2006/0015732 A1 | 1/2006 | Liu |
| 2006/0020554 A1 | 1/2006 | Septon |
| 2006/0020784 A1 | 1/2006 | Jonker |
| 2006/0020821 A1 | 1/2006 | Waltermann |
| 2006/0020860 A1 | 1/2006 | Tardif |
| 2006/0026418 A1 | 2/2006 | Bade |
| 2006/0026419 A1 | 2/2006 | Arndt |
| 2006/0026422 A1 | 2/2006 | Bade |
| 2006/0045267 A1 | 3/2006 | Moore |
| 2006/0047957 A1 | 3/2006 | Helms et al. |
| 2006/0053112 A1 | 3/2006 | Chitkara |
| 2006/0055506 A1 | 3/2006 | Nicolas |
| 2006/0072748 A1 | 4/2006 | Buer |
| 2006/0072762 A1 | 4/2006 | Buer |
| 2006/0074600 A1 | 4/2006 | Sastry |
| 2006/0075014 A1 | 4/2006 | Tharappel |
| 2006/0075223 A1 | 4/2006 | Bade |
| 2006/0085634 A1 | 4/2006 | Jain et al. |
| 2006/0085637 A1 | 4/2006 | Pinkas |
| 2006/0085844 A1 | 4/2006 | Buer |
| 2006/0089917 A1 | 4/2006 | Strom |
| 2006/0090084 A1 | 4/2006 | Buer |
| 2006/0100010 A1 | 5/2006 | Gatto |
| 2006/0104356 A1 | 5/2006 | Crinon |
| 2006/0106845 A1 | 5/2006 | Frank et al. |
| 2006/0106920 A1 | 5/2006 | Steeb |

(56) References Cited

U.S. PATENT DOCUMENTS

| | | |
|---|---|---|
| 2006/0107306 A1 | 5/2006 | Thirumalai |
| 2006/0107328 A1 | 5/2006 | Frank |
| 2006/0107335 A1 | 5/2006 | Frank |
| 2006/0112267 A1 | 5/2006 | Zimmer |
| 2006/0117177 A1 | 6/2006 | Buer |
| 2006/0129496 A1 | 6/2006 | Chow |
| 2006/0129824 A1 | 6/2006 | Hoff |
| 2006/0130130 A1 | 6/2006 | Kablotsky |
| 2006/0143431 A1 | 6/2006 | Rothman |
| 2006/0149966 A1 | 7/2006 | Buskey |
| 2006/0156416 A1 | 7/2006 | Huotari |
| 2006/0161635 A1 | 7/2006 | Lamkin et al. |
| 2006/0165005 A1 | 7/2006 | Frank |
| 2006/0167814 A1 | 7/2006 | Peinado et al. |
| 2006/0167815 A1 | 7/2006 | Peinado et al. |
| 2006/0167985 A1 | 7/2006 | Albanese et al. |
| 2006/0168451 A1 | 7/2006 | Ishibashi et al. |
| 2006/0168664 A1 | 7/2006 | Frank |
| 2006/0173787 A1 | 8/2006 | Weber |
| 2006/0174110 A1 | 8/2006 | Debique et al. |
| 2006/0184790 A1 | 8/2006 | Oliveira et al. |
| 2006/0193474 A1 | 8/2006 | Fransdonk |
| 2006/0206618 A1 | 9/2006 | Zimmer |
| 2006/0212363 A1 | 9/2006 | Peinado et al. |
| 2006/0212945 A1 | 9/2006 | Donlin |
| 2006/0213997 A1 | 9/2006 | Frank |
| 2006/0229990 A1 | 10/2006 | Shimoji et al. |
| 2006/0235798 A1 | 10/2006 | Alkove et al. |
| 2006/0235799 A1 | 10/2006 | Evans et al. |
| 2006/0235801 A1* | 10/2006 | Strom et al. ............... 705/59 |
| 2006/0242406 A1 | 10/2006 | Barde |
| 2006/0248594 A1 | 11/2006 | Grigorovich et al. |
| 2006/0248596 A1 | 11/2006 | Jain |
| 2006/0265758 A1 | 11/2006 | Khandelwal et al. |
| 2006/0268099 A1 | 11/2006 | Potrebic et al. |
| 2006/0272026 A1 | 11/2006 | Niwano et al. |
| 2006/0282319 A1 | 12/2006 | Maggio |
| 2006/0282899 A1 | 12/2006 | Raciborski |
| 2007/0003064 A1 | 1/2007 | Wiseman et al. |
| 2007/0016594 A1 | 1/2007 | Visharam et al. |
| 2007/0016784 A1 | 1/2007 | Vauclair |
| 2007/0033102 A1 | 2/2007 | Frank |
| 2007/0033419 A1* | 2/2007 | Kocher et al. ............ 713/193 |
| 2007/0058807 A1 | 3/2007 | Marsh |
| 2007/0078777 A1 | 4/2007 | Demartini et al. |
| 2007/0112681 A1* | 5/2007 | Niwano et al. ............. 705/59 |
| 2007/0157322 A1 | 7/2007 | Onno |
| 2007/0171903 A1 | 7/2007 | Zeng et al. |
| 2007/0269044 A1 | 11/2007 | Bruestle |
| 2007/0274393 A1 | 11/2007 | Toma et al. |
| 2007/0280422 A1 | 12/2007 | Setala |
| 2007/0288391 A1 | 12/2007 | Nakamura et al. |
| 2008/0075168 A1 | 3/2008 | Toma et al. |
| 2008/0141339 A1 | 6/2008 | Gomez et al. |
| 2008/0187284 A1 | 8/2008 | Ikeda et al. |
| 2008/0298581 A1 | 12/2008 | Murase et al. |
| 2008/0301440 A1 | 12/2008 | Plouffe et al. |
| 2008/0301468 A1 | 12/2008 | Murase et al. |
| 2009/0070454 A1 | 3/2009 | McKinnon, II et al. |
| 2009/0132815 A1 | 5/2009 | Ginter |
| 2009/0158036 A1 | 6/2009 | Barde |
| 2010/0177891 A1 | 7/2010 | Keidar |
| 2010/0280954 A1 | 11/2010 | Khandelwal |
| 2011/0128290 A1 | 6/2011 | Howell |
| 2012/0036562 A1 | 2/2012 | Cutter et al. |
| 2012/0137127 A1 | 5/2012 | Jain |

FOREIGN PATENT DOCUMENTS

| | | |
|---|---|---|
| CN | 1531673 | 9/2004 |
| EP | 0085480 | 8/1983 |
| EP | 0409397 | 1/1991 |
| EP | 0613073 | 8/1994 |
| EP | 0635790 | 1/1995 |
| EP | 0665486 | 8/1995 |
| EP | 0387599 | 9/1995 |
| EP | 0679978 | 11/1995 |
| EP | 0709760 | 5/1996 |
| EP | 0715245 | 6/1996 |
| EP | 0715246 | 6/1996 |
| EP | 0715247 | 6/1996 |
| EP | 0752663 | 1/1997 |
| EP | 0768774 | 4/1997 |
| EP | 0798892 | 10/1997 |
| EP | 0843249 | 5/1998 |
| EP | 0843449 | 6/1998 |
| EP | 0849658 | 6/1998 |
| EP | 0874300 | 10/1998 |
| EP | 0887723 | 12/1998 |
| EP | 0907120 | 4/1999 |
| EP | 1061465 | 12/2000 |
| EP | 1085396 | 3/2001 |
| EP | 1120967 | 8/2001 |
| EP | 01041823 | 10/2002 |
| EP | 01287636 | 3/2003 |
| EP | 0679980 | 6/2003 |
| EP | 0735719 | 6/2003 |
| EP | 1 346 755 | 9/2003 |
| EP | 0725512 | 9/2003 |
| EP | 1363424 | 11/2003 |
| EP | 0137881 | 1/2004 |
| EP | 01376307 | 1/2004 |
| EP | 1387237 | 2/2004 |
| EP | 1429224 | 6/2004 |
| EP | 1223722 | 8/2004 |
| EP | 1460514 | 9/2004 |
| EP | 1376307 | 11/2004 |
| EP | 01477879 | 11/2004 |
| EP | 01494425 | 1/2005 |
| EP | 1233337 | 8/2005 |
| EP | 01292065 | 12/2008 |
| EP | 01378812 | 3/2010 |
| EP | 1594034 | 4/2010 |
| EP | 1259863 | 5/2013 |
| EP | 1166562 | 6/2013 |
| GB | 2359969 | 9/2001 |
| GB | 2378780 | 2/2003 |
| GB | 2381898 | 5/2003 |
| JP | 2060859 | 3/1990 |
| JP | 02291043 | 11/1990 |
| JP | 2291043 | 11/1990 |
| JP | 3241950 | 10/1991 |
| JP | 05-35461 | 2/1993 |
| JP | 5073580 | 3/1993 |
| JP | 06-035718 | 2/1994 |
| JP | 07-036559 | 2/1995 |
| JP | 07-141153 | 6/1995 |
| JP | 09-069044 | 8/1995 |
| JP | 08-006729 | 1/1996 |
| JP | 09-006880 | 1/1997 |
| JP | 01-526550 | 5/1997 |
| JP | 09-185504 | 7/1997 |
| JP | 09-251494 | 9/1997 |
| JP | 11-110294 | 4/1999 |
| JP | 11-187013 | 7/1999 |
| JP | 11-219329 | 8/1999 |
| JP | 2000-113066 | 4/2000 |
| JP | 2000-215165 | 8/2000 |
| JP | 00-293369 | 10/2000 |
| JP | 2000-293439 | 10/2000 |
| JP | 2000-347566 | 12/2000 |
| JP | 2000-516743 | 12/2000 |
| JP | 01-051742 | 2/2001 |
| JP | 03-510684 | 3/2001 |
| JP | 2001-067408 | 3/2001 |
| JP | 01-101033 | 4/2001 |
| JP | 03-510713 | 4/2001 |
| JP | 11-175605 | 6/2001 |
| JP | 2001-175605 | 6/2001 |
| JP | 01-184472 | 7/2001 |
| JP | 01-290780 | 10/2001 |
| JP | 01-312325 | 11/2001 |
| JP | 01-325387 | 11/2001 |

(56) References Cited

FOREIGN PATENT DOCUMENTS

| | | |
|---|---|---|
| JP | 01-331229 | 11/2001 |
| JP | 01-338233 | 12/2001 |
| JP | 2001-344437 | 12/2001 |
| JP | 2002-072876 | 3/2002 |
| JP | 2002-077149 | 3/2002 |
| JP | 02-108478 | 4/2002 |
| JP | 02-108870 | 4/2002 |
| JP | 02-164880 | 6/2002 |
| JP | 2002-169719 | 6/2002 |
| JP | 2002-169726 | 6/2002 |
| JP | 2002-183352 | 6/2002 |
| JP | 2002-207426 | 7/2002 |
| JP | 02-215465 | 8/2002 |
| JP | 02-297816 | 10/2002 |
| JP | 2002-324170 | 11/2002 |
| JP | 02-359616 | 12/2002 |
| JP | 02-374327 | 12/2002 |
| JP | 2003-030150 | 1/2003 |
| JP | 03-507785 | 2/2003 |
| JP | 2003-101526 | 4/2003 |
| JP | 03-140762 | 5/2003 |
| JP | 03-157335 | 5/2003 |
| JP | 3 421 950 | 6/2003 |
| JP | 03-140761 | 6/2003 |
| JP | 2003-173381 | 6/2003 |
| JP | 03-208314 | 7/2003 |
| JP | 03-248522 | 9/2003 |
| JP | 03-296487 | 10/2003 |
| JP | 2003-309545 | 10/2003 |
| JP | 2003-323224 | 11/2003 |
| JP | 02-182562 | 1/2004 |
| JP | 04-038974 | 2/2004 |
| JP | 04-062561 | 2/2004 |
| JP | 2004-054937 | 2/2004 |
| JP | 2004-056794 | 2/2004 |
| JP | 2004-062890 | 2/2004 |
| JP | 04-118327 | 4/2004 |
| JP | 04-507124 | 4/2004 |
| JP | 2004-102789 | 4/2004 |
| JP | 04-164491 | 6/2004 |
| JP | 04-295846 | 10/2004 |
| JP | 04-304755 | 10/2004 |
| JP | 2004-534291 | 11/2004 |
| JP | 07-525774 | 9/2007 |
| JP | 08-054952 | 2/2011 |
| KR | 239865 | 1/2000 |
| KR | 2001/0000805 | 1/2001 |
| KR | 239 865 | 10/2001 |
| KR | 2002/0037453 | 5/2002 |
| KR | 2005/0008439 | 1/2005 |
| KR | 2005/0021782 | 3/2005 |
| NZ | 286 668 | 10/1996 |
| RU | 2147790 | 4/2000 |
| WO | 93/01550 | 1/1993 |
| WO | 96/13013 | 5/1996 |
| WO | 96/23013 | 5/1996 |
| WO | 96/24092 | 8/1996 |
| WO | 96/27155 | 9/1996 |
| WO | 97/21162 | 6/1997 |
| WO | 97/25798 | 7/1997 |
| WO | 97/43761 | 11/1997 |
| WO | 98/02793 | 1/1998 |
| WO | 98/09209 | 3/1998 |
| WO | 98/10381 | 3/1998 |
| WO | 98/11478 | 3/1998 |
| WO | 98/21679 | 5/1998 |
| WO | 98/21683 | 5/1998 |
| WO | 98/24037 | 6/1998 |
| WO | 98/33106 | 7/1998 |
| WO | 98/37481 | 8/1998 |
| WO | 98/58306 | 8/1998 |
| WO | 98/42098 | 9/1998 |
| WO | 98/47259 | 10/1998 |
| WO | 9858306 | 12/1998 |
| WO | 99/04328 | 1/1999 |
| WO | 99/15970 | 4/1999 |
| WO | 99/53689 | 10/1999 |
| WO | 00/08909 | 2/2000 |
| WO | 00/15221 | 3/2000 |
| WO | 00/21239 | 4/2000 |
| WO | 00/42492 | 7/2000 |
| WO | 00/54126 | 9/2000 |
| WO | 00/57637 | 9/2000 |
| WO | 00/57684 | 10/2000 |
| WO | 00/58810 | 10/2000 |
| WO | 00/58811 | 10/2000 |
| WO | 00/58859 | 10/2000 |
| WO | 00/59150 | 10/2000 |
| WO | 00/59152 | 10/2000 |
| WO | 00/68763 | 11/2000 |
| WO | 01/22268 | 3/2001 |
| WO | 01/22651 | 3/2001 |
| WO | 01/33867 | 5/2001 |
| WO | 01/35293 | 5/2001 |
| WO | 01/43342 | 6/2001 |
| WO | 01/44908 | 6/2001 |
| WO | 01/45012 | 6/2001 |
| WO | WO 01/46783 A2 | 6/2001 |
| WO | 01/52018 | 7/2001 |
| WO | 01/52020 | 7/2001 |
| WO | 01/52021 | 7/2001 |
| WO | 01/63512 | 8/2001 |
| WO | 01/77795 | 10/2001 |
| WO | 01/78303 | 10/2001 |
| WO | 01/93461 | 12/2001 |
| WO | 02/01335 | 1/2002 |
| WO | 02/08969 | 1/2002 |
| WO | 02/19598 | 3/2002 |
| WO | 02/23314 | 3/2002 |
| WO | 02/23315 | 3/2002 |
| WO | 02/37371 | 5/2002 |
| WO | 02/056155 | 7/2002 |
| WO | 02/073378 | 9/2002 |
| WO | 02/080442 | 10/2002 |
| WO | 02/86684 | 10/2002 |
| WO | 02/097693 | 12/2002 |
| WO | 02/103495 | 12/2002 |
| WO | 03/009115 | 1/2003 |
| WO | 03/030434 | 4/2003 |
| WO | 03/073688 | 9/2003 |
| WO | 03/079269 | 9/2003 |
| WO | 03/090101 | 10/2003 |
| WO | 03/107585 | 12/2003 |
| WO | 03/107588 | 12/2003 |
| WO | 2004/023717 | 3/2004 |
| WO | 2004/030364 | 4/2004 |
| WO | 2004/092886 | 10/2004 |
| WO | 2005/109202 | 11/2005 |
| WO | WO2005/122047 | 12/2005 |
| WO | 2006/065012 | 6/2006 |
| WO | 2007032974 | 3/2007 |

OTHER PUBLICATIONS

Features of Windows Media DRM; www.microsoft.com/windows/windowsmedia/drm/features.aspx.
United States Advisory Action mailed Jan. 19, 2007, in U.S. Appl. No. 09/482,843 (4 pages).
United States Advisory Action mailed Feb. 15, 2005, in U.S. Appl. No. 09/482,840 (3 pages).
United States Advisory Action mailed Mar. 21, 2006, in U.S. Appl. No. 11/117,590 (3 pages).
United States Advisory Action mailed Apr. 27, 2005, in U.S. Appl. No. 09/482,932 (2 pages).
United States Advisory Action mailed May 16, 2007, in U.S. Appl. No. 11/117,590 (3 pages).
United States Advisory Action mailed Aug. 1, 2008, in U.S. Appl. No. 10/831,280 (2 pages).
United States Advisory Action mailed Sep. 23, 2011, in U.S. Appl. No. 10/971,346 (4 pages).
United States Advisory Action mailed Nov. 25, 2003, in U.S. Appl. No. 09/482,932 (3 pages).

(56) References Cited

OTHER PUBLICATIONS

United States Amendment filed Jan. 10, 2005, in U.S. Appl. No. 09/482,725 (11 pages).
United States Amendment filed Jan. 11, 2008, in U.S. Appl. No. 11/353,321 (13 pages).
United States Amendment filed Jan. 11, 2011, in U.S. Appl. No. 10/831,280 (18 pages).
United States Amendment filed Jan. 16, 2008, in U.S. Appl. No. 10/831,280 (16 pages).
United States Amendment filed Jan. 18, 2011, in U.S. Appl. No. 11/116,884 (12 pages).
United States Amendment filed Jan. 20, 2004, in U.S. Appl. No. 09/482,928 (20 pages).
United States Amendment filed Jan. 21, 2005, in U.S. Appl. No. 09/482,840 (13 pages).
United States Amendment filed Jan. 21, 2009, in U.S. Appl. No. 11/018,095 (9 pages).
United States Amendment filed Jan. 22, 2008, in U.S. Appl. No. 10/831,281 (15 pages).
United States Amendment filed Jan. 22, 2009, in U.S. Appl. No. 11/116,884 (10 pages).
United States Amendment filed Feb. 1, 2007, in U.S. Appl. No. 10/830,632 (9 pages).
United States Amendment filed Feb. 6, 2009, in U.S. Appl. No. 11/117,590 (10 pages).
United States Amendment filed Feb. 16, 2006, in U.S. Appl. No. 11/117,590 (20 pages).
United States Amendment filed Feb. 17, 2011, in U.S. Appl. No. 10/971,346 (31 pages).
United States Amendment filed Feb. 22, 2005, in U.S. Appl. No. 09/482,843 (14 pages).
United States Amendment filed Feb. 23, 2004, in U.S. Appl. No. 09/290,363 (34 pages).
United States Amendment filed Feb. 23, 2009, in U.S. Appl. No. 11/388,403 (14 pages).
United States Amendment filed Feb. 25, 2010, in U.S. Appl. No. 11/116,884 (13 pages).
United States Amendment filed Mar. 2, 2009, in U.S. Appl. No. 10/831,281 (26 pages).
United States Amendment filed Mar. 11, 2008, in U.S. Appl. No. 10/976,463 (13 pages).
United States Amendment filed Mar. 14, 2005, in U.S. Appl. No. 10/208,139 (9 pages).
United States Amendment filed Mar. 22, 2006, in U.S. Appl. No. 09/290,363 (31 pages).
United States Amendment filed Mar. 24, 2009, in U.S. Appl. No. 11/353,321 (20 pages).
United States Amendment filed Mar. 26, 2012, in U.S. Appl. No. 10/971,346 (18 pages).
United States Amendment filed Mar. 28, 2011, in U.S. Appl. No. 11/018,095 (10 pages).
United States Amendment filed Apr. 9, 2008, in U.S. Appl. No. 11/048,194 (7 pages).
United States Amendment filed Apr. 11, 2005, in U.S. Appl. No. 09/482,932 (19 pages).
United States Amendment filed Apr. 15, 2011, in U.S. Appl. No. 11/116,884 (13 pages).
United States Amendment filed Apr. 21, 2003, in U.S. Appl. No. 09/482,840 (15 pages).
United States Amendment filed Apr. 22, 2003, in U.S. Appl. No. 09/290,363 (46 pages).
United States Amendment filed Apr. 27, 2005, in U.S. Appl. No. 09/482,840 (20 pages).
United States Amendment filed Apr. 27, 2007, in U.S. Appl. No. 11/117,590 (13 pages).
United States Amendment filed Apr. 28, 2008, in U.S. Appl. No. 11/353,321 (14 pages).
United States Amendment filed May 4, 2009, in U.S. Appl. No. 10/831,280 (16 pages).
United States Amendment filed May 5, 2009, in U.S. Appl. No. 11/018,095 (10 pages).
United States Amendment filed May 12, 2005, in U.S. Appl. No. 09/482,932 (19 pages).
United States Amendment filed May 12, 2010, in U.S. Appl. No. 10/971,346 (12 pages).
United States Amendment filed May 15, 2003, in U.S. Appl. No. 09/482,932 (4 pages).
United States Amendment filed May 17, 2010, in U.S. Appl. No. 11/018,095 (10 pages).
United States Amendment filed May 21, 2003, in U.S. Appl. No. 09/482,843 (13 pages).
United States Amendment filed May 27, 2004, in U.S. Appl. No. 09/482,725 (40 pages).
United States Amendment filed Jun. 13, 2007, in U.S. Appl. No. 10/976,463 (17 pages).
United States Amendment filed Jun. 13, 2008, in U.S. Appl. No. 10/968,462 (11 pages).
United States Amendment filed Jun. 15, 2007, in U.S. Appl. No. 11/117,590 (12 pages).
United States Amendment filed Jun. 25, 2008, in U.S. Appl. No. 11/018,095 (10 pages).
United States Amendment filed Jun. 29, 2010, in U.S. Appl. No. 10/831,280 (18 pages).
United States Amendment filed Jul. 8, 2005, in U.S. Appl. No. 09/482,725 (48 pages).
United States Amendment filed Jul. 9, 2008, in U.S. Appl. No. 11/388,365 (18 pages).
United States Amendment filed Jul. 13, 2009, in U.S. Appl. No. 11/116,884 (13 pages).
United States Amendment filed Jul. 16, 2008, in U.S. Appl. No. 10/831,280 (16 pages).
United States Amendment filed Jul. 17, 2006, in U.S. Appl. No. 09/482,843 (17 pages).
United States Amendment filed Jul. 26, 2004, in U.S. Appl. No. 09/482,840 (9 pages).
United States Amendment filed Jul. 28, 2005, in U.S. Appl. No. 09/482,840 (22 pages).
United States Amendment filed Aug. 6, 2008, in U.S. Appl. No. 10/831,281 (20 pages).
United States Amendment filed Aug. 11, 2004, in U.S. Appl. No. 09/482,843 (10 pages).
United States Amendment filed Aug. 11, 2010, in U.S. Appl. No. 11/116,884 (13 pages).
United States Amendment filed Aug. 20, 2009, in U.S. Appl. No. 11/117,590 (2 pages).
United States Amendment filed Aug. 31, 2005, in U.S. Appl. No. 09/482,932 (21 pages).
United States Amendment filed Sep. 6, 2011, in U.S. Appl. No. 10/971,346 (48 pages).
United States Amendment filed Sep. 9, 2008, in U.S. Appl. No. 10/976,463 (14 pages).
United States Amendment filed Sep. 9, 2011, in U.S. Appl. No. 11/018,095 (11 pages).
United States Amendment filed Sep. 15, 2009, in U.S. Appl. No. 10/971,346 (12 pages).
United States Amendment filed Sep. 20, 2010, in U.S. Appl. No. 10/971,346 (39 pages).
United States Amendment filed Sep. 22, 2003, in U.S. Appl. No. 09/482,928 (20 pages).
United States Amendment filed Sep. 24, 2004, in U.S. Appl. No. 09/482,932 (12 pages).
United States Amendment filed Sep. 25, 2006, in U.S. Appl. No. 11/117,590 (14 pages).
United States Amendment filed Sep. 26, 2005, in U.S. Appl. No. 11/117,590 (17 pages).
United States Amendment filed Sep. 26, 2011, in U.S. Appl. No. 10/971,346 (10 pages).
United States Amendment filed Oct. 3, 2001, in U.S. Appl. No. 09/290,363 (26 pages).
United States Amendment filed Oct. 8, 2010, in U.S. Appl. No. 11/018,095 (7 pages).

(56) References Cited

OTHER PUBLICATIONS

United States Amendment filed Oct. 9, 2009, in U.S. Appl. No. 11/353,321 (22 pages).
United States Amendment filed Oct. 14, 2008, in U.S. Appl. No. 10/831,280 (16 pages).
United States Amendment filed Oct. 24, 2007, in U.S. Appl. No. 10/976,463 (13 pages).
United States Amendment filed Oct. 30, 2003, in U.S. Appl. No. 09/482,932 (25 pages).
United States Amendment filed Nov. 6, 2003, in U.S. Appl. No. 09/482,843 (16 pages).
United States Amendment filed Nov. 18, 2005, in U.S. Appl. No. 09/290,363 (31 pages).
United States Amendment filed Nov. 20, 2007, in U.S. Appl. No. 09/482,843 (9 pages).
United States Amendment filed Nov. 23, 2009, in U.S. Appl. No. 10/831,280 (18 pages).
United States Amendment filed Dec. 3, 2008, in U.S. Appl. No. 10/971,346 (12 pages).
United States Amendment filed Dec. 5, 2011, in U.S. Appl. No. 11/018,095 (9 pages).
United States Amendment filed Dec. 6, 2011, in U.S. Appl. No. 11/116,884 (11 pages).
United States Amendment filed Dec. 7, 2007, in U.S. Appl. No. 11/117,590 (16 pages).
United States Amendment filed Dec. 26, 2006, in U.S. Appl. No. 09/482,843 (13 pages).
United States Amendment filed Apr. 26, 2010, in U.S. Appl. No. 11/353,321 (22 pages).
United States Final Office Action mailed Jan. 11, 2005, in U.S. Appl. No. 09/482,932 (21 pages).
United States Final Office Action mailed Jan. 26, 2009, in U.S. Appl. No. 11/353,321 (11 pages).
United States Final Office Action mailed Jan. 26, 2010, in U.S. Appl. No. 11/353,321 (13 pages).
United States Final Office Action mailed Feb. 3, 2009, in U.S. Appl. No. 11/388,365 (13 pages).
United States Final Office Action mailed Feb. 28, 2007, in U.S. Appl. No. 11/117,590 (12 pages).
United States Final Office Action mailed Mar. 15, 2010, in U.S. Appl. No. 11/018,095 (8 pages).
United States Final Office Action mailed Mar. 18, 2009, in U.S. Appl. No. 10/971,346 (14 pages).
United States Final Office Action mailed Apr. 16, 2008, in U.S. Appl. No. 10/831,280 (21 pages).
United States Final Office Action mailed Apr. 22, 2011, in U.S. Appl. No. 10/971,346 (22 pages).
United States Final Office Action mailed May 24, 2005, in U.S. Appl. No. 10/208,139 (7 pages).
United States Final Office Action mailed Jun. 9, 2011, in U.S. Appl. No. 11/018,095 (10 pages).
United States Final Office Action mailed Jun. 10, 2009, in U.S. Appl. No. 11/388,403 (9 pages).
United States Final Office Action mailed Jun. 30, 2008, in U.S. Appl. No. 10/976,463 (20 pages).
United States Final Office Action mailed Jul. 8, 2008, in U.S. Appl. No. 11/048,194 (7 pages).
United States Final Office Action mailed Jul. 8, 2011, in U.S. Appl. No. 11/116,884 (15 pages).
United States Final Office Action mailed Jul. 22, 2010, in U.S. Appl. No. 10/971,346 (16 pages).
United States Final Office Action mailed Jul. 30, 2003, in U.S. Appl. No. 09/482,932 (22 pages).
United States Final Office Action mailed Aug. 7, 2008, in U.S. Appl. No. 11/117,590 (10 pages).
United States Final Office Action mailed Aug. 12, 2003, in U.S. Appl. No. 09/482,843 (26 pages).
United States Final Office Action mailed Sep. 20, 2009, in U.S. Appl. No. 10/831,280 (26 pages).
United States Final Office Action mailed Aug. 24, 2007, in U.S. Appl. No. 10/976,463 (26 pages).
United States Final Office Action mailed Sep. 15, 2010, in U.S. Appl. No. 10/831,280 (19 pages).
United States Final Office Action mailed Oct. 21, 2008, in U.S. Appl. No. 11/018,095 (12 pages).
United States Final Office Action mailed Oct. 24, 2006, in U.S. Appl. No. 09/482,843 (15 pages).
United States Final Office Action mailed Oct. 28, 2004, in U.S. Appl. No. 09/482,840 (19 pages).
United States Final Office Action mailed Oct. 28, 2010, in U.S. Appl. No. 11/116,884 (14 pages).
United States Final Office Action mailed Nov. 7, 2005, in U.S. Appl. No. 09/290,363 (6 pages).
United States Final Office Action mailed Nov. 16, 2004, in U.S. Appl. No. 09/482,843 (4 pages).
United States Final Office Action mailed Nov. 25, 2011, in U.S. Appl. No. 10/971,346 (19 pages).
United States Final Office Action mailed Nov. 27, 2009, in U.S. Appl. No. 11/116,884 (17 pages).
United States Final Office Action mailed Dec. 2, 2008, in U.S. Appl. No. 10/831,281 (11 pages).
United States Final Office Action mailed Dec. 20, 2005, in U.S. Appl. No. 11/117,590 (13 pages).
United States Non-Final Office Action mailed Jun. 13, 2008, in U.S. Appl. No. 10/971,346 (9 pages).
United States Non-Final Office Action mailed Jan. 9, 2008, in U.S. Appl. No. 11/048,194 (7 pages).
United States Non-Final Office Action mailed Jan. 16, 2003, in U.S. Appl. No. 09/482,840 (17 pages).
United States Non-Final Office Action mailed Feb. 3, 2009, in U.S. Appl. No. 10/831,280 (25 pages).
United States Non-Final Office Action mailed Feb. 4, 2011, in U.S. Appl. No. 11/116,884 (13 pages).
United States Non-Final Office Action mailed Feb. 5, 2009, in U.S. Appl. No. 11/018,095 (13 pages).
United States Non-Final Office Action mailed Feb. 13, 2003, in U.S. Appl. No. 09/482,932 (22 pages).
United States Non-Final Office Action mailed Feb. 14, 2008, in U.S. Appl. No. 11/388,365 (14 pages).
United States Non-Final Office Action mailed Feb. 19, 2003, in U.S. Appl. No. 09/482,843 (16 pages).
United States Non-Final Office Action mailed Mar. 13, 2007, in U.S. Appl. No. 10/976,463 (11 pages).
United States Non-Final Office Action mailed Mar. 18, 2008, in U.S. Appl. No. 10/968,462 (10 pages).
United States Non-Final Office Action mailed Mar. 25, 2008, in U.S. Appl. No. 11/018,095 (14 pages).
United States Non-Final Office Action mailed Mar. 29, 2010, in U.S. Appl. No. 10/831,280 (16 pages).
United States Non-Final Office Action mailed Apr. 14, 2005, in U.S. Appl. No. 09/482,725 (9 pages).
United States Non-Final Office Action mailed Apr. 14, 2009, in U.S. Appl. No. 11/116,884 (12 pages).
United States Non-Final Office Action mailed Apr. 19, 2006, in U.S. Appl. No. 09/482,843 (23 pages).
United States Non-Final Office Action mailed May 6, 2008, in U.S. Appl. No. 10/831,281 (11 pages).
United States Non-Final Office Action mailed May 11, 2004, in U.S. Appl. No. 09/482,843 (19 pages).
United States Non-Final Office Action mailed May 12, 2010, in U.S. Appl. No. 11/116,884 (13 pages).
United States Non-Final Office Action mailed May 16, 2012, in U.S. Appl. No. 11/353,321 (15 pages).
United States Non-Final Office Action mailed May 18, 2004, in U.S. Appl. No. 09/482,840 (18 pages).
United States Non-Final Office Action mailed May 27, 2003, in U.S. Appl. No. 09/482,928 (11 pages).
United States Non-Final Office Action mailed May 29, 2012, in U.S. Appl. No. 13/274,217 (11 pages).
United States Non-Final Office Action mailed May 31, 2005, in U.S. Appl. No. 09/482,932 (20 pages).

(56) References Cited

OTHER PUBLICATIONS

United States Non-Final Office Action mailed Jun. 20, 2007, in U.S. Appl. No. 09/482,843 (6 pages).
United States Non-Final Office Action mailed Jun. 21, 2004, in U.S. Appl. No. 09/482,932 (23 pages).
United States Non-Final Office Action mailed Jun. 30, 2006, in U.S. Appl. No. 11/117,590 (13 pages).
United States Non-Final Office Action mailed Jul. 5, 2005, in U.S. Appl. No. 11/117,590 (12 pages).
United States Non-Final Office Action mailed Jul. 8, 2010, in U.S. Appl. No. 11/018,095 (9 pages).
United States Non-Final Office Action mailed Jul. 9, 2009, in U.S. Appl. No. 11/353,321 (12 pages).
United States Non-Final Office Action mailed Aug. 19, 2009, in U.S. Appl. No. 11/018,095 (10 pages).
United States Non-Final Office Action mailed Sep. 7, 2007, in U.S. Appl. No. 11/117,590 (13 pages).
United States Non-Final Office Action mailed Sep. 27, 2011, in U.S. Appl. No. 11/018,095 (5 pages).
United States Non-Final Office Action mailed Oct. 5, 2007, in U.S. Appl. No. 11/353,321 (9 pages).
United States Non-Final Office Action mailed Oct. 13, 2004, in U.S. Appl. No. 09/482,725 (9 pages).
United States Non-Final Office Action mailed Oct. 16, 2007, in U.S. Appl. No. 10/831,280 (19 pages).
United States Non-Final Office Action mailed Oct. 18, 2007, in U.S. Appl. No. 10/831,281 (12 pages).
United States Non-Final Office Action mailed Oct. 21, 2008, in U.S. Appl. No. 11/388,403 (8 pages).
United States Non-Final Office Action mailed Oct. 22, 2008, in U.S. Appl. No. 11/116,884 (10 pages).
United States Non-Final Office Action mailed Nov. 1, 2006, in U.S. Appl. No. 10/830,632 (21 pages).
United States Non-Final Office Action mailed Nov. 12, 2009, in U.S. Appl. No. 10/971,346 (14 pages).
United States Non-Final Office Action mailed Nov. 26, 2010, in U.S. Appl. No. 10/971,346 (14 pages).
United States Non-Final Office Action mailed Dec. 11, 2007, in U.S. Appl. No. 10/976,463 (22 pages).
United States Non-Final Office Action mailed Dec. 14, 2004, in U.S. Appl. No. 10/208,139 (6 pages).
United States Non-Final Office Action mailed Dec. 27, 2010, in U.S. Appl. No. 11/018,095 (8 pages).
United States Non-Final Rejection mailed Jan. 17, 2003, in U.S. Appl. No. 09/290,363 (23 pages).
United States Non-Final Rejection mailed Apr. 24, 2001, in U.S. Appl. No. 09/290,363 (28 pages).
United States Notice of Allowance mailed Feb. 14, 2002, in U.S. Appl. No. 09/290,363 (8 pages).
United States Notice of Allowance mailed Feb. 17, 2010, in U.S. Appl. No. 11/117,590 (15 pages).
United States Notice of Allowance mailed Mar. 7, 2012, in U.S. Appl. No. 11/116,884 (2 pages).
United States Notice of Allowance mailed Mar. 22, 2006, in U.S. Appl. No. 09/290,363 (8 pages).
United States Notice of Allowance mailed Mar. 23, 2009, in U.S. Appl. No. 10/831,281 (8 pages).
United States Notice of Allowance mailed Mar. 31, 2005, in U.S. Appl. No. 09/482,928 (9 pages).
United States Notice of Allowance mailed Apr. 2, 2008, in U.S. Appl. No. 09/482,843 (6 pages).
United States Notice of Allowance mailed Apr. 6, 2006, in U.S. Appl. No. 09/482,725 (7 pages).
United States Notice of Allowance mailed May 3, 2007, in U.S. Appl. No. 10/830,632 (13 pages).
United States Notice of Allowance mailed Jun. 11, 2009, in U.S. Appl. No. 11/117,590 (15 pages).
United States Notice of Allowance mailed Jun. 27, 2011, in U.S. Appl. No. 10/831,280 (7 pages).
United States Notice of Allowance mailed Jun. 27, 2012, in U.S. Appl. No. 11/018,095 (7 pages).
United States Notice of Allowance mailed Jul. 24, 2008, in U.S. Appl. No. 10/968,462 (10 pages).
United States Notice of Allowance mailed Sep. 26, 2008, in U.S. Appl. No. 10/976,463 (8 pages).
United States Notice of Allowance mailed Dec. 2, 2005, in U.S. Appl. No. 09/482,725 (6 pages).
United States Notice of Allowance mailed Dec. 6, 2005, in U.S. Appl. No. 09/482,932 (8 pages).
United States Notice of Allowance mailed Dec. 9, 2005, in U.S. Appl. No. 09/482,840 (11 pages).
United States Notice of Allowance mailed Dec. 14, 2011, in U.S. Appl. No. 11/116,884 (7 pages).
United States Notice of Allowance mailed Dec. 30, 2011, in U.S. Appl. No. 11/018,095 (10 pages).
United States Supplemental Amendment filed Jan. 21, 2005, in U.S. Appl. No. 09/482,725 (5 pages).
United States Supplemental Amendment filed Jan. 31, 2008, in U.S. Appl. No. 11/117,590 (18 pages).
United States Supplemental Amendment filed Jun. 16, 2003, in U.S. Appl. No. 09/482,725 (3 pages).
United States Supplemental Amendment filed Sep. 12, 2005, in U.S. Appl. No. 09/482,843 (5 pages).
United States Supplemental Amendment filed Nov. 16, 2006, in U.S. Appl. No. 11/117,590 (14 pages).
United States Supplemental Amendment filed Dec. 10, 2003, in U.S. Appl. No. 09/482,725 (51 pages).
Adams, C. et al. "Internet X.509 Public Key Infrastructure Certificate Management Protocols". Internet Engineering Task Force, Network Working Group, Mar. 1999, 1-72, XP-002284791. cited by other.
*Aladdin acquires the assets of Micro Macro Technologies.* Business Wire, 1999 http://www.findarticles.com. cited by other.
*Aladdin Knowledge Systems Partners with Rights Exchange, Inc. to Develop a Comprehensive Solution for Electronic Software Distribution.* Aug. 3, 1988, 5 pages. cited by other.
Armati, D., "Tools and standards for protection, control and presentation of data," Apr. 3, 1996, 17 pages. cited by other.
Arsenault, A. et al. "InternetX.509 Public Key Infrastructure: Roadmap". PKIX Working Group Internet Draft, Jul. 2002, 1-55, XP-002284790. cited by other.
Australian Examiner's First Report mailed Jan. 14, 2010, in Australian Patent Application No. 2005201602 (1 pgs).
Australian Examiner's First Report mailed Jan. 15, 2010, in Australian Patent Application No. 2005201572 (2 pgs).
Australian Examiner's First Report mailed Jan. 22, 2010, in Australian Patent Application No. 2004288593 (2 pgs).
Australian Examiner's First Report mailed May 26, 2009, in Application No. 2004200454 (4 pgs).
Australian Examiner's First Report mailed Sep. 2, 2009, in Application No. 2004200468 (2 pgs).
Australian Examiner's Second Report mailed Jun. 7, 2010, in Australian Patent Application No. 2005201572 (2 pgs).
Australian Notice of Acceptance mailed Dec. 16, 2009, in Application No. 2004200468 (3 pgs).
Australian Notice of Acceptance mailed May 7, 2010, in Australian Patent Application No. 2005201602 (3 pgs).
Australian Notice of Acceptance mailed Oct. 14, 2010, in Australian Patent Application No. 2005201572 (3 pgs).
Australian Response to Examiner's First Report mailed Jan. 14, 2010, in Australian Patent Application No. 2005201602, filed Apr. 14, 2010 (5 pgs).
Australian Response to Examiner's First Report mailed Jan. 15, 2010, in Australian Patent Application No. 2005201572, filed May 11, 2010 (24 pgs).
Australian Response to Examiner's First Report mailed May 26, 2009, in Application No. 2004200454, filed Sep. 8, 2009 (36 pgs).
Australian Response to Examiner's First Report mailed Sep. 2, 2009, in Application No. 2004200468, filed Dec. 2, 2009 (40 pgs).
Australian Response to Examiner's SecondReport mailed Jun. 7, 2010, in Australian Patent Application No. 2005201572, filed Sep. 22, 2010 (19 pgs).

(56) References Cited

OTHER PUBLICATIONS

Benjamin, R. et al., "Electronic markets and virtual value chains on the information superhighway," Sloan Management Rev., Winter, 1995, 62-72. cited by other.

*Black box crypton defies the hackers*, Electronic Weekly, 1985, 1257, p. 26 (from DialogClassic Web.TM. file 275, Accession No. 01116377). cited by other.

*BreakerTech joins copyright management market*. From http://www.findarticles.com, Computer International, 1999. cited by other.

Cassidy, "A Web developers guide to content encapsulation technology," Apr. 1997, 5 pages. cited by other.

Chinese First Office Action mailed Jun. 27, 2008, in Chinese Application No. 200510004173.1 (17 pgs).

Chinese First Office Action mailed Mar. 8, 2010, in Chinese Application No. 200680025291.3 (13 pgs).

Chinese Notice on First Office Action mailed Apr. 17, 2009, in Chinese Patent Application No. 200410005381.9 (11 pgs).

Chinese Notice on First Office Action mailed Apr. 6, 2007, in Chinese Patent Application No. 200410033028.1 (6 pgs).

Chinese Notice on First Office Action mailed Jan. 16, 2009, in Chinese Patent Application No. 200480011309.5 (10 pgs).

Chinese Notice on First Office Action mailed Nov. 30, 2007, in Chinese Patent Application No. 200510066707.3 (8 pgs).

Chinese Notice on Grant of Patent Right for Invention mailed Jan. 15, 2010, in Chinese Patent Application No. 200410033028.1 (4 pgs).

Chinese Notice on Grant of Patent Right for Invention mailed Mar. 12, 2010, in Chinese Patent Application No. 200410005381.9 (4 pgs).

Chinese Notice on Grant of Patent Right for Invention mailed Mar. 17, 2011, in Chinese Patent Application No. 200680025291.3 (4 pgs).

Chinese Notice on Grant of Patent Right for Invention mailed Oct. 16, 2009 (4 pgs).

Chinese Notice on Grant of Patent Right for Invention mailed Sep. 27, 2011, in Chinese Patent Application No. 200510004173.1 (4 pgs).

Chinese Notice on Grant of Patent Right to Invention mailed Aug. 8, 2008, in Chinese Patent Application No. 200510066707.3 (4 pgs).

Chinese Notice on Second Office Action mailed Aug. 28, 2009, in Chinese Patent Application No. 200410033028.1 (7 pgs).

Chinese Notice on Second Office Action mailed Sep. 18, 2009, in Chinese Patent Application No. 200410005381.9 (9 pgs).

Chinese Notice on Grant of Patent Right for Invention mailed Sep. 23, 2011, in Chinese Patent Application No. 200480011309.5 (4 pgs).

Chinese Response to Second Office Action mailed Nov. 5, 2010, in Chinese Application No. 200680025291.3, filed Jan. 13, 2011 (7 pgs).

Chinese Response to Telephone Conversation mailed Jan. 30, 2011, in Chinese Application No. 200680025291.3 (6 pgs).

Chinese Response to First Office Action mailed Jun. 27, 2008, in Chinese Application No. 200510004173.1, filed Jan. 12, 2009 (19 pgs).

Chinese Response to First Office Action mailed Mar. 8, 2010, in Chinese Application No. 200680025291.3, filed Jun. 3, 2010 (8 pgs).

Chinese Response to Notice on First Office Action mailed Apr. 17, 2009, in Chinese Patent Application No. 200410005381.9, filed Jul. 30, 2009 (27 pgs).

Chinese Response to Notice on First Office Action mailed Jan. 16, 2009, in Chinese Patent Application No. 200480011309.5, filed Jun. 24, 2010 (12 pgs). [No Translation].

Chinese Response to Notice on First Office Action mailed Nov. 30, 2007, in Chinese Patent Application No. 200510066707.3, filed Apr. 15, 2008 (52 pgs).

Chinese Response to Second Office Action mailed Feb. 12, 2010, in Chinese Application No. 200510004173.1, filed Apr. 15, 2010 (17 pgs).

Chinese Second Office Action mailed Feb. 12, 2010, in Chinese Application No. 200510004173.1 (16 pgs).

Chinese Second Office Action mailed Nov. 5, 2010, in Chinese Application No. 200680025291.3 (9 pgs).

Cox, B., "Superdistribution," Idees Fortes, Sep. 1994, 2 pages. cited by other.

Cox, B., "What if There Is a Silver Bullet," J. Object Oriented Program., Jun. 1992, 8-9 and 76. cited by other.

Curet, et al., "RTP Payload Format for MPEG-4 FlexMultiplexed Streams", Internet.

Engineering Task Force, Internet Draft, XP-001075015, Nov. 8, 2001, 12 pages. cited by other.

European Communication mailed Apr. 14, 2010, in Application No. 04779484 (4 pgs).

European Communication dated Dec. 17, 2004, in European Application No. 04003418.3 (7 pgs).

European Communication dated Dec. 4, 2006, in European Application No. 03013557.8 (5 pgs).

European Communication dated Feb. 15, 2006, in European Application No. 03013557.8 (6 pgs).

European Communication dated Feb. 17, 2005, in European Application No. 03013557.8 (4 pgs).

European Communication dated Mar. 6, 2006, in European Application No. 04003418.3 (5 pgs).

European Communication dated Sep. 19, 2005, in European Application No. 04003418.3 (12 pgs).

European Communication mailed Aug. 25, 2006, in Application No. 04001953 (4 pgs).

European Communication mailed Mar. 2, 2007, in Application No. 05102768 (7 pgs).

European Communication mailed Nov. 19, 2007, in Application No. 05102765 (7 pgs).

European Communication mailed Oct. 14, 2008, in Application No. 00913629 (5 pgs).

European Communication mailed Oct. 15, 2008, in Application No. 00915912 (7 pgs).

European Decision dated Nov. 16, 2009, in European Application No. 03013557.8 (20 pgs).

European Decision to Grant dated Feb. 19, 2009, in Application No. 04001953 (2 ogs).

European Decision to Grant dated Sep. 13, 2007, in European Application No. 04003418.3 (2 pgs).

European Decision to Grant mailed Mar. 11, 2010, in Application No. 05102768 (2 pgs).

European Reply filed Feb. 25, 2009, in Application No. 00915912 (27 pgs).

European Reply to Communication mailed Aug. 25, 2006, in Application No. 04001953, filed Mar. 5, 2007 (33 pgs).

European Reply to Communication mailed Nov. 19, 2007, in Application No. 05102765, filed May 26, 2008 (20 pgs).

European Reply to Communication mailed Oct. 14, 2008, in Application No. 00913629, filed Feb. 24, 2009 (38 pgs).

European Response to Additional Telephone Interview, in Application No. 05102768, filed Nov. 18, 2008 (7 pgs).

European Response to Communication mailed Apr. 14, 2010, in Application No. 04779484, filed Aug. 2, 2010 (15 pgs).

European Response to Communication dated Dec. 17, 2004, in European Application No. 04003418.3, filed May 20, 2005 (12 pgs).

European Response to Communication dated Dec. 4, 2006, in European Application No. 03013557.8, filed Jun. 14, 2007 (15 pgs).

European Response to Communication dated Feb. 15, 2006, in European Application No. 03013557.8, filed Aug. 25, 2006 (16 pgs).

European Response to Communication dated Feb. 17, 2005, in European Application No. 03013557.8, filed Jun. 27, 2005 (23 pgs).

European Response to Communication dated Mar. 6, 2006, in European Application No. 04003418.3, filed Sep. 7, 2006 (12 pgs).

European Response to Communication dated Sep. 19, 2005, in European Application No. 04003418.3, filed Jan. 30, 2006 (13 pgs).

European Response to Communication mailed Mar. 2, 2007, in Application No. 05102768, filed Nov. 12, 2007 (26 pgs).

European Response to Result of Consultation of Nov. 10, 2008, in Application No. 05102768 (22 pgs).

European Response to Summons dated May 13, 2009, in European Application No. 03013557.8, filed Sep. 25, 2009 (18 pgs).

(56) References Cited

OTHER PUBLICATIONS

European Response to Telephone Interview, in Application No. 05102768, filed Nov. 14, 2008 (21 pgs).
European Response to the Invitation dated Nov. 28, 2008, in Application No. 05102768, filed Jan. 29, 2009 (7 pgs).
European Response to the Summons to Attend Oral Proceedings mailed Jul. 17, 2008, in Application No. 05102768, filed Oct. 15, 2008 (17 pgs).
European Search Report and Written Opinion in PCT/US2006/031185, date of mailing Jan. 16, 2007, p. 12. cited by other.
European Search Report dated Aug. 2, 2004, in European Application No. 03013557.8 (4 pgs).
European Search Report dated Jul. 20, 2004, in European Application No. 04003418.3 (5 pgs).
European Search Report filed Aug. 2, 2005, in Application No. 04001953 (4 pgs).
European Search Report mailed Aug. 24, 2006, in Application No. 05102768 (3 pgs).
European Search Report mailed Mar. 23, 2012, in Application No. 05101183 (4 pgs).
European Search Report mailed Nov. 2, 2006, in Application No. 04779484 (3 pgs).
European Search Report mailed Nov. 8, 2007, in Application No. 06774628 (3 pgs).
European Search Report mailed Oct. 13, 2006, in Application No. 05102765 (3 pgs).
European Search Report mailed Sep. 26, 2002, in Application No. 00915912 (3 pgs).
European Summons to Attend Oral Proceedings dated May 13, 2009, in European Application No. 03013557.8 (7 pgs).
European Summons to Attend Oral Proceedings mailed Jul. 17, 2008, in Application No. 05102768 (8 pgs).
European Supplemental Search report filed Feb. 8, 2010, in Application No. 04779484 (3 pgs).
*Free On-Line Dictionary of Computing Concatenate*. Dec. 22, 1995.
Gold, S. "Finland—Data fellows secures ICSA certification", Newsbytes, 1998, (from DialogClassic Web(TM), File 9, Accession No. 01451058, 2 pages). cited by other.
Handley, et al., "SDP: Session Description Protocol," The Internet Society, 1998, pp. 1-42. cited by other.
Hauser, R.C., "Does licensing require new access control techniques?" Aug. 1993, 9 pages. cited by other.
Hong, S. et al., "On the construction of a powerful distributed authentication server without additional key management", Computer Communications, 2000, 23, 1638-1644. cited by other.
Housley, R. et al. "RFC 3280: Internet X.509 Public Key infrastructure Certificate and CRL Profile (w/o Annezes)" RFC 3280, Apr. 2002, XP002279343.
Hudgins-Bonafield, C. "Selling Knowledge on the Net," Network Computing, Jun. 1, 1995, 102-109. cited by other.
*IBM spearheading intellectual property protection technology for information on the Internet*. May 1996, 3 pages. cited by other.
India First Examination Report mailed Jul. 27, 2011, in India Application No. 136/MUM/2004 (4 pgs).
Indonesia Notice of the Results of Substantive Examination mailed Dec. 19, 2007, in Indonesia Patent Application No. P-00 2004 00074 (4 pgs).
International Preliminary Examination Report on Patentability as issued in International Application No. PCT/US2000/04946 completed Oct. 23, 2002 (2 pgs).
International Preliminary Examination Report on Patentability as issued in International Application No. PCT/US2000/04947 completed Aug. 27, 2002 (2 pgs).
International Preliminary Examination Report on Patentability as issued in International Application No. PCT/US2000/04948 completed Oct. 23, 2002 (2 pgs).
International Preliminary Examination Report on Patentability as issued in International Application No. PCT/US2000/04949 Oct. 23, 2002 (2 pgs).
International Preliminary Examination Report on Patentability as issued in International Application No. PCT/US2000/04972 Sep. 4, 2002 (2 pgs).
International Preliminary Examination Report on Patentability as issued in International Application No. PCT/US2000/04983 Oct. 31, 2002 (2 pgs).
International Preliminary Examination Report on Patentability as issued in International Application No. PCT/US2000/05091 Apr. 12, 2002 (2 pgs).
International Preliminary Examination Report on Patentability as issued in International Application No. PCT/US2004/024439 Nov. 1, 2006 (7 pgs).
International Preliminary Examination Report on Patentability as issued in International Application No. PCT/US2006/026913 Jan. 16, 2008 (4 pgs).
International Search Report as mailed Jul. 22, 2002 in International Application No. PCT/US2000/04949 (5 pgs).
International Search Report as mailed Jul. 24, 2002 in International Application No. PCT/US2000/04946 (5 pgs).
International Search Report as mailed Jul. 24, 2002 in International Application No. PCT/US2000/04948 (5 pgs).
International Search Report as mailed Jul. 26, 2002 in International Application No. PCT/US2000/05091 (5 pgs).
International Search Report as mailed Jul. 30, 2002 in International Application No. PCT/US2000/04983 (5 pgs).
International Search Report as mailed Sep. 18, 2007 in International Application No. PCT/US2006/026913 (3 pgs).
International Search Report as mailed Sep. 6, 2006 in International Application No. PCT/US2004/024439 (3 pgs).
Jakobsson, M. et al., "Proprietary Certificates", Topics in Cryptology, 2002, 164-181. cited by other.
Kaplan, M.A., "IBM Cryptolopes.TM., SuperDistribution and Digital Rights Management", http://www.research.ibm.com, 1996, pp. 1-7. cited by other.
Kent, S.T., "Protecting externally supplied software in small computers," Sep. 1980, 1-42 and 250-252. cited by other.
Klemets, "RTP Payload Format for Video Codec 1 (VC-1)," Microsoft, Feb. 2006, pp. 1-36. cited by other.
Kohl, U. et al., "Safeguarding Digital Library Contents and Users; Protecting Documents Rather Than Channels," D-Lib Magazine, Sep. 1997, 9 pages. cited by other.
Kumik, P. "Digital Rights Management", Computers and Law, 2000, 11(4), 14-15. cited by other.
*LicensIt: kinder, gentler copyright? Copyright management system links content, authorship information*. Seybold Report on Desktop Publishing, 1996, 10(11), 2 pages. cited by other.
Linn, R.J., "Copyright and Information Services in the Context of the National Research and Education Network," IMA Intell. Property Project Proceedings, Jan. 1994, 1(1), 1 and 10-20. cited by other.
Managing Digital Rights in Online Publishing, "How two publishing houses maintin control of copyright" Information Management & Technology, 2001, 34(4), 168-169. cited by other.
Maurer, Ueli, "Modeling a Public-Key Infrastructure," XP002212747, Sep. 1999.
McNab, L., "Super-distribution works better in practical applications," Mar. 2, 1998, 2 pages. cited by other.
Menezes et al. Handbook of Applied Cryptography 1997 CRC Press pp. 31-32.
Moeller, M., "IBM takes charge of E-commerce; Plans client, server apps based on SET," Apr. 1996, 4 pages. cited by other.
Moeller, M., "NetTrust lets Cyberspace Merchants Take Account," PC Week, Nov. 20, 1995, 12(48), 1 page. cited by other.
Myers, et al. "Certificate Management Messages over CMS. Internet Engineering Task Force", Network Working Group, Apr. 2000, 1-47, XP-002284794. cited by other.
Myers, M. et al., "Internet X.509 Certificate Request Message Format", Internet X.509, Mar. 1999, http://www.rfc.net/rfc2511.html, 24 pages. cited by other.
Nafaa, A. et al, "RTP4mux: A Novel MPEG-4 RTP Payload for Multicast Video Communications over Wireless IP", Retrieved from the Internet Mar. 22, 2005: URL: http//www.polytech.uiv-nantes. PDF. cited by other.

(56) References Cited

OTHER PUBLICATIONS

Olson, M., et al., "Concurrent access licensing," UNIX Review, 1988, 6(9), 67-72 (from Dialog Accession No. 01254918). cited by other.
*Optimising license checkouts from a floating license server*, ARM the Architecture for the Digital World, http://www.arm.com/support/faqdev/1391.html. cited by other.
PCT/US2005/019935.
Pemberton, J., "An Online Interview with Jeff Crigler at IBM InfoMarket," Jul. 1996, 6 pages. cited by other.
Proposed SMPTE Standard for Television: VC-1 Compressed Video Bitstream "Format and Decoding Process," The Society of Motion Picture and Television Engineers, Aug. 23, 2005, pp. 1-480. cited by other.
Ramanujapuram, A. et al., "Digital Content & Intellectual Property Rights: A specification language and tools for rights management," Dec. 1998, 20-23 and 26. cited by other.
*Rights Management in the Digital Age: Trading in Bits, Not Atoms*. Spring, 1997, 4, 3 pages. cited by other.
Rosoff, "Rights Management Comes to the Enterprise: Rights Management Beyond Digital Media", posted Mar. 17, 2003, http://directionsonmicrosft.com/sample/DOMIS/update/2003/04apr/0403rmctte.htm, 5 pgs.
Rouvroy, G. et al. "Reconfigurable hardware solutions for the digital rights management of digital cinema", Oct. 2004, DRM '04: Proceedings of the 4th ACM workshop on Digital rights management, ACM, pp. 40-53.
*RTP Payload Format for MPEG-4 Streams*. Internet Engineering Task Force, Internet Draft, XP-001033580, Jul. 2001, 41 pages. cited by other.
Schneier, B., "Applied Cryptography Passage", Applied Crytography, Protocols, Algorithms and Source Code in C, 1996, 2.sup.nd edition, 585-587, XP 000863833. cited by other.
Schneier, B., "Applied Cryptography", Applied Crytography, Protocols, Algorithms and Source Code in C, 1996, 183-187 & 574-577, XP-002954321. cited by other.
Schulzrinne, et al., "RTP: A Transport Protocol for Real-Time Applications," The Internet Society, 2003, pp. 1-104. cited by other.
Schulzrinne, H. "RTP Profile for Audio and Video Conferences with Minimal Control". RFC 1890, available at [[http://faqs.org/rfcs/rfc1890.html]], accessed Jan. 7, 2004, 14 pages. cited by other.
Sibert, O. et al., "Securing the Content, Not the Wire, for Information Commerce," Jul. 1995, 1-11. cited by other.
Sibert, O. et al., "The DigiBox: A Self-protecting Container for Information Commerce," First USENIX Workshop on Electronic Commerce, Jul. 11-12, 1995, 171-183. cited by other.
*SMPTE Standard for Television, Audio and Film—Time and Control Code*. The Society of Motion Picture and Television Engineers, Sep. 12, 1995. cited by other.
*Solution for piracy*, Which Computer, 1983, p. 29 (from DialogClassic Web.TM. file 275, Accession No. 01014280). cited by other.
*Sony develops copyright protection solutions for digital music content*. PR Newswire, 1999, http://www.findarticles.com. cited by other.
Stefik, M., "Shifting the Possible: How Trusted Systems and Digital Property Rights Challenge Us to Rethink Digital Publishing," Technical Perspective, 1997, 137-159. cited by other.
Stefik, M., "Trusted Systems," Mar. 1997, 8 pages. cited by other.
*Technological Solutions Rise to Complement Law's Small Stick Guarding Electronic Works*. Information Law Alert, Jun. 16, 1995, 3-4 and 7. cited by other.
*The Directory Public-Key Attribute Certificate Frameworks*. International Telecommunication Union, ITU-T Telecommunication Standardization Sector of ITU. Mar. 2000, XP-002284793. cited by other.
Thompson, C.W., et al., "Digital licensing," IEEE Internet Computing, 2005, 9(4). cited by other.
Torrubia, A. et al., "Cryptography regulations for E-commerce and digital rights management", Computers & Security, 2001, 20(8), 724-738. cited by other.
Weber, R., "Digital Right Management Technologies," Oct. 1995, 35 pages. cited by other.

White, S.R. et al., "Abyss: A trusted architecture for software protection," IEEE Symposium on Security and Privacy, Apr. 27-29, 1987, 38-51. cited by other.
White, S.R. et al., "Abyss: An Architecture for Software Protection," IEEE Trans. on Software Engineering, Jun. 1990, 16(6), 619-629. cited by other.
Windows Media, "A Technical Overview of Windows Media DRM 10 for Devices," Microsoft Corp. Sep. 2004.
Won-Ho Kim, "Design and Implementation of MPEG-2/DVB Scrambler Unit and VLSI Chip" 1997 International Conference on Consumer Electronics vol. 43 No. 3. pp. 320-321 Jun. 1997. cited by other.
Written Opinion of the International Searching Authority as completed Apr. 29, 2006 in International Application No. PCT/US2004/024439 (6 pgs).
Written Opinion of the International Searching Authority as completed Jul. 26, 2007 in International Application No. PCT/US2006/026913 (3 pgs).
Zwollo, K. "Digital document delivery and digital rights management", Information Services & Use, 2001, 9-11. cited by other.
U.S. Appl. No. 09/525,509, filed Mar. 15, 2000, Peinado.
U.S. Appl. No. 60/260,543, filed Jan. 2001, Thomas et al.
*A Unveil security system*, Multichannel News, 1995, 18(3) p. 45 (from DialogClassic Web™, file 9, acc. No. 00864754).
*Achieving Peak Performance: Insights from a Global Survey on Credit Risk and Collections Practices*, GCI Group Pamphlet, (2002, 2004), 12 pages.
Anderson, R et al., "Tamper Resistance—A Cautionary Note," Proc. of the 2nd USENIX Workshop on Electronic Commerce, Oakland, California, Nov. 1996, 1-11.
Arbaugh, "A Secure and Reliable Bootstrap Architecture", IEEE Symposium on Security and Privacy, May 1997, pp. 65-71.
AU Examiner's First Report, Application No. 2006220489, Jan. 25, 2010 (2 pages).
AU Examiner's First Report, Application No. 2006220489, Sep. 15, 2009 (2 pages).
Bajikar, S., "Trusted Platform Module (TPM) based Security on Notebook PCs—White Paper", Mobile Platforms Group Intel Corporation; XP002259678; http://www.intel.com/design/mobile/platform/downloads/Trusted Platform Module White Paper.pdf, (Jun. 20, 2002).
*Bankard set to into virtual shopping in Philippines*, Newsbytes News Network, 1997 (from DialogClassic Web™, file 9, acc. No. 01235815.
Bird, R., et al., "The KryptoKnight family of light-weight protocols for authentification and key distribution," IEEE, 1995, 31-41.
*Black box crypton defies the hackers*, Electronics Weekly, 1985, n1257 p. 26 (from DialogClassic Weekly, 1985, n1257 (from DialogClassic Web™, File 275, Acc. No. 011163377).
Blissmer, "Next Step is Encryption: Data Security May be Bundled with Next's Operating System", Electronic Engineering Times, Feb. 3, 1992.
Boyl, J.P., et al. "The ESPRIT Project Café' High Security digital payment systems," ESORICs, LNCS 875, 1994, 217-230.
*Breaker Tech Joins Copyright Management Market*, Computergram International, Aug. 5, 1999, 2 pages.
Canadian Application 2456400, Office Action mailed Jan. 17, 2013 (2 pages).
Canadian Application 2456400, Office Action mailed Sep. 5, 2012 (2 pages).
Canadian Application 2456592, Office Action mailed Aug. 29, 2012 (5 pages).
Canadian Application 2457291, Office Action mailed Aug. 27, 2013, 2 pages.
Canadian Application 2457291, Office Action mailed Oct. 30, 2012 (6 pages).
Canadian Application 2457938, Notice of Allowance mailed Jul. 23, 2013, 2 pages.
Canadian Application 2457938, Office Action mailed Apr. 24, 2012 (3 pages).
Canadian Application 2504677, Office Action mailed Aug. 13, 2012 (2 pages).

(56) References Cited

OTHER PUBLICATIONS

Canadian Application 2505295, Office Action mailed Mar. 29, 2012 (4 pages).
Cante, T.M., et al., "Challenges to combining general-purpose and multimedia processors," IEEE, Dec. 1997,33-37.
Chabaud, D., "Programmation des cartes VGA," Micro-Systems, 1990, 173-178 (no English abstract available).
Chinese Application 200910139429.8, Decision on Rejection mailed Jul. 31, 2013, 6 pages.
Chinese Notice on the Second Action mailed Aug. 3, 2012, in Chinese Application No. 200910139429.8 (11 pgs).
Chinese Notice on the Third Action mailed Feb. 21, 2013, in Chinese Application No. 200910139429.8 (8 pgs).
Choudhury et al., "Copyright Protection for Electronic Publishing over Computer Networks", IEEE Network Magazine, Jun. 1994, 1-18.
Clark, P. et al., "Bits: A Smartcard Protected Operating System," Comm of the ACM, Nov. 1994, 37(11)m 66-70 and 94.
Clarke, Roger et al. "Technological Protections for Digital Copyright objects," [Online] Jul. 2000, Retrieved from the Internet: http://www.anu.edu.au/people/Roger.Clarke/II/TPDCO.html [retrieved on Jul. 28, 2005].
Comino, N et al., "A Novel Data Distribution Technique for Host-Client Type Parallel Applications", IEEE Transactions on Parallel and Distributed Systems, 2002, 13(2), 97-110.
*Content Protection System Architecture A Comprehensive Framework for Content Protection*, Content Protection Architecture: XP02259679; http://4centity.com/data/tech/cpsa/cpsa081.pdf, (Feb. 17, 2000).
*Cylink: Public-Key Security Technology Granted to the Public*; Cylink Announces the Reowned Diffie-Hellman Public-Key Technology Has Entered the Public Domain:, Business Wire, Sep. 16, 1997.
*CyoLicence*, Version 1.3.0, Released Mar. 5, 2005, cyotec.com, Printed Sep. 7, 2005.
Davida, George I., et al., "UNIX Guardians: Active User Intervention in Data Protection", Aerospace Computer Security Applications Conference, Fourth Dec. 12-16, 1988, 6 pages.
*DMOD WorkSpace OEM Unique Features*, www.dmod.com/oem/features, Retrieved from the Internet on Jan. 12, 2005, 3 pages.
EP Communication for Application No. 05823253.9-2212/1815322 PCT/US2005040942, Reference FBI18697, Aug. 13, 2010.
EP Communication for application No. 05851550.3-1243/ 1825391 PCT/US2005040967, Reference FBI18698, Jul. 5, 2012.
EP Communication for Application No. 05854752.2-1245/ 1829274 PCT/US2005046091, Reference FBI18701,Dec. 21, 2011.
*Equifax Business Solutions—Manage Your Customers*, Retrieved from the Internet from http://www.equifax.com/sitePages/biz/small Biz/?sitePage=manageCustomers on Oct. 14, 2005, 3 pages.
Eren, H. et al., Fringe-Effect Capacitive Proximity Sensors for Tamper Proof Enclosures, Proceedings of 2005 Sensors for Industry Conference (Feb. 2005), pp. 22-25.
European Application 12002880.8, Communication mailed Feb. 18, 2013 (4 pages).
European Application 12002880.8, Search Report mailed Jul. 10, 2012 (5 pages).
Europe Application 03013556.0, Summons to Attend Oral Proceedings mailed Sep. 3, 2013, 8 pages.
European Application 02011478.1, Communication mailed Jan. 18, 2011 (4 pages).
European Application 02011478.1, Search Report mailed Apr. 16, 2010 (7 pages).
European Application 02014340.0, Communication mailed Jul. 9, 2009 (4 pages).
European Application 02014340.0, Communication mailed Dec. 19, 2006 (6 pages).
European Application 02014340.0, Communication mailed Dec. 21, 2007 (5 pages).
European Application 02014340.0, Means of Redress mailed Nov. 9, 2011 (15 pages).
European Application 02014340.0, Results of Consultation mailed Nov. 7, 2011 (8 pages).
European Application 02014340.0, Search Report mailed Aug. 11, 2005 (3 pages).
European Application 02014340.0, Summons to Attend Oral Proceedings mailed Jun. 21, 2011 (9 pages).
European Application 12002881.6, Communication mailed Feb. 18, 2013 (4 pages).
European Application 12002881.6, Search Report mailed Jul. 10, 2012 (5 pages).
European Extended Search Report mailed Oct. 8, 2013, in Application No. 06774628 (7 pgs).
Examiner's First Report on Application mailed Jun. 4, 2010, AU Application No. 2005222507, 2 pages.
*Finland—Data fellows secures ICSA Certification*, Newbytes, 1988 (from DialogClass Web™), File 9, Acc. No. 01451058, 2 pages.
Finnie et al., "*Suppliers cashing in on the internet*", Communications Week International, 1994, N134, p. 36 (from DialogClassic Web, file 9, acc. No. 00564878), Nov. 14, 1994, 2 pages.
*First Special Feature, Security Oriented Web Application Development, Part 3, Method for Realizing Secure Session Management*, N+1 Network Guide (vol. 4, No. 1, Serial No. 32) Softbank Publishing Inc., (Jan. 2004), pp. 47-59.
*Flonix: USB Desktop OS Solutions Provider*, http://www.flonix.com, Retrieved from the Internet Jun. 1, 2005, (Copyright 2004), 2 pages.
*Forward Solutions Unveils Industry's Most Advanced Portable Personal Computing system on USB Flash Memory Device:*, Proquest, PR Newswire, http://proquest.umi.com/pqdweb?index=20 &did=408811931&SrchMode=1&sid=6&Fmt=3. Retrieved from the Internet Feb. 15, 1908, (Sep. 22, 2003), 3 pages.
Gao, Jerry et al., "Online Advertising—Taxonomy and Engineering Perspectives", http://www.engr.sjsu.edu/gaojerry/report/OnlineAdvertising%20.pdf, (2002), 33 pages.
Gilmont, T. et al., "An Architecture of Security Management Unit for Safe Hosting of Multiple Agents," IS&T/SPIE Conf. on Security and Watermarking of Multimedia Contents, San Jose, California, Jan 1999, SPIE vol. 3657, 472-483.
Goering, Richard "Web Venture Offers Metered Access to EDA Packages—Startup Winds Clocks by the Hour Tools (E CAD Will Launch Web Site That Provides Pay-Per-Use and Pay-Per-Hour Access to Range of Chip Design Software)", Electronic Engineering Times (Nov. 6, 2000), 3 pages.
Hartung F. et al. "Digital Rights Management and Watermarking of Multimedia Content for M-Commerce Applications," IEEE Communications Magazine, IEEE Service Center. Piscatawy, N.J., vol. 38, No. 11, Nov. 2000, pp. 78-84.
Housley, R. et al., "Metering: a Pre-Pay Technique", Proceedings of the SPIE—The International Society for Optical Engineering, 1997, 3022, 527-531.
India Application 135/MUM/2004, First Examination Report mailed Apr. 25, 2012 (2 pages).
India Application 228/DEL/2004, First Examination Report mailed May 29, 2013, 2 pages.
India Application 892/DEL/2005, First Examination Report mailed Sep. 13, 2013, 2 pages.
*Internet Dynamics: Internet Dynamics First to Ship Integrated Security Solution for Enterprise Intranets and Extranets; Conclave Accelerates Enterprise Deployment of Secure, High-Value Intranets and Extranets*, Business Wire, Sep. 15, 1997.
*Is Your Computer Secure?, Which Computer?*—The Business Computer Magazine, Nov. 1983, 3 pages.
Ishii, S., et al., "2,048-bit public-key encryption processor," NTT Human Interface Labs., 998, 259-267 (Abstract on p. 261).
Japanese Application 2002-186967, Decision to Grant a Patent mailed on Oct. 31, 2008 (6 pages).
Japanese Application 2002-186967, Official Notice of Rejection mailed Feb. 29, 2008 (12 pages).
Japanese Application 2002-186968, Notice of Allowance mailed Oct. 9, 2009 (6 pages).
Japanese Application 2002-186968, Notice of Rejection mailed Jun. 12, 2009 (7 pages).
Japanese Application 2002-186968, Official Notice of Rejection mailed Dec. 9, 2008 (33 pages).

(56) References Cited

OTHER PUBLICATIONS

Japanese Application 2004-035810, Decision to Decline the Amendment mailed Apr. 17, 2012 (14 pages).
Japanese Application 2004-035810, Interrogation mailed Sep. 2, 2011 (6 pages).
Japanese Application 2004-035810, Notice of Rejection mailed Apr. 17, 2012 (33 pages).
Japanese Application 2004-035810, Written Appeal mailed Jan. 21, 2011 (9 pages).
JP Final Rejection for Application No. 2000-608539, Dec. 24, 2009.
JP Notice of Rejection for Application No. 2005-301957, Jun. 8, 2012.
Kim, S. et al., "A Secure and Efficient Metering Scheme for Internet Advertising", Journal of Kiss: Computer Systems and Theory, 2002, 29(3-4) 153-160.
KR Preliminary Rejection for Application No. 10-2007-7012294, Reference 310476.07, Jul. 4, 2012.
Kwok, Sai H., "Digital Rights Management for the Online Music Business", ACM SIGecom Exchanges, vol. 3, No. 3, (Aug. 2002), pp. 17-24.
Lampson, Butler et al., "Authentication in Distributed Systems: Theory and Practice", ACM Transactions on Computer Systems, v10, 265 (1992), 18 pages.
Linn, "Privacy Enhancement for Internet Email—Part I: Message Encryption and Authentication Procedures", RFC 1421, pp. 1-37, (Feb. 1993).
Looi, "A Note on Supplying a Trusted Clock via a Secure Device", Computers & Security, Sep. 7, 1994.
Lotspiech, "Broadcast Encryption's Bright Future", IEEE Computer, Aug. 2002.
*Magic Desktop Automation Suite for the Small and Mid-Sized Business*, printed from www.remedy.com/soultions/magic_it_suite.htm on Sep. 7, 2005 (Copyright 2005), 4 pages.
Malamud, "Network-Based Authentification: The Key to Security," Network Computing, Jun. 1991, 98-100.
Memon, "Protecting Digital Media Content", Communications of the ACM Jul. 1998.
*Migo by Power House Technologies Group*, http://www.4migo.com, Retrieved from the Internet Jun. 1, 2005, (Copyright 2003), 3 pages.
Monitor Spearheads Call Logging Entry, Electronics Weekly, Mar. 6, 1985, 1 page.
Morales, Tatiana "Understanding Your Credit Score", http://www.cbsnews.com/stories/2003/04/29/earlyshow/contributors/raymartin/main55152.sht ml retrieved from the Internet on Apr. 23, 2009, (Apr. 30, 2003), 3 pages.
Mufti, Dr. Muid et al., "Design and Implementation of a Secure Mobile IP Protocol", Networking and Communication, INCC 204, International Conference on Jun. 11-13, 2004, 5 pages.
MX Office Action for Application No. MX/a2007005660, Jul. 7, 2009.
Nakajima, S. "Do You Really Know It? Basics of Windows2000/XP Network, 4th Installment, What is Logon Like?", Nikkei Business Publications, Inc., (Jan. 2004), pp. 116-121.
*Next step is Encryption: data security many be bundled with next's operating system*, Electronic Times, 1992, p. 18 (from DialogClassic Web™, file 16, acc. No. 02103190).
Notice of Acceptance mailed Oct. 14, 2010, AU Application No. 2005222507, 3 pages.
Ogata, "Provably Secure Metering Scheme", ASIACRYPT 2000, Dec. 3, 2000.
Olson, M. et al., Concurrent access licensing, pp. 67-72, UNIX Review, vol. 6 No. 9 Sep. 1988 (from Dialog acc. No. 01254918.
*Optimizing license checkouts from a floating license server*, Arm the Architecture for the Digital World, from http://www.arm.com/support/faqdev/1391.html.
PCT Application PCT/US00/22972, Publication and International Search Report mailed Nov. 27, 2000 (128 pages).
PCT Application PCT/US00/23105, Publication and International Search Report mailed Dec. 21, 2000 (134 pages).
PCT Application PCT/US00/23106, Publication and International Search Report mailed Feb. 19, 2001 (130 pages).
PCT Application PCT/US00/23107, Publication and International Search Report mailed Nov. 22, 2000 (133 pages).
PCT Application PCT/US00/23108, Publication and International Search Report mailed Dec. 14, 2000 (131 pages).
PCT International Search Report and Written Opinion for Application No. PCT/US05/40965, reference 311052 02, Apr. 25, 2007.
*Postal service announce plan to put postmarks on electronic mail*, San Jose Mercury Mews. 1995, (from DialogClassic Web, file 9, acc. No. 00618375.
Schneck, P.B., "Persistent Access Control to Prevent Piracy of Digital Information,", Proc. of the IEEE, Jul. 1999, 87(7), 1239-1250.
Schubert, "Radios Controlled Standard Clock Uses Digital Correlation", Elektronik, 1997. (English language abstract provided).
SDMI Portable Device Specification Part 1 Version 1.0, Secure Digital Music Initiate, 1999 (35 pages).
Shen, "A New Digital Watermarking Technique for Video", ACM, Visual '02, Nov. 13, 2002.
Shi, Changgui et al., "A Fast MPEG Video Encryption Algorithm", 1998, Bristol, UK; pp. 81-88.
Slusallek, "Vision—An Architecture for Global Illumination Calculation", IEEE Transactions on Visualization and Computer Graphics, vol. 1, No. 1, Mar. 1995, pp. 77-96.
*Sony Develops Copyright Protection Solutions for Digital Music Content*, PR Newswire, Feb. 25, 1999, 4 pages.
Steinebach, "Digital Watermaking Basics—Applications—Limits", NFD Information—Wissenschaft and Praxis, Jul. 2002.
Takura, "A Secure and Trusted Time Stamping Authority", IWS 1999, IEEE, Feb. 18, 1999.
*TCG Specification Architecture Overview*, Revision 1.2, (Apr. 28, 2004), 55 pages.
*Technological Solutions Rise to Complement Law's Small Stick Guarding Electronic Works*, Information Law Alert, Jun. 16, 1995-, 3-4 and 7.
*The New Network: Planning and Protecting Intranet Electronic Commerce*, Information week, Dec. 2, 1996, 2 pages.
Thompson, C. et al., Digital Licensing, IEEE Internet Computing, Jul./Aug. 2005 (vol. 9 No. 4).
Tyler, L. Chin "Reaching out physicians," Health Data Management, 1998, 6(9), pp. 36,38,40 (from DialogClassic Web™, file 13, acc. No. 00588764).
U.S. Appl. No. 09/449,106, Amendment and Response filed Jan. 29, 2003, pages.
U.S. Appl. 09/449,106, Amendment and Response filed Jul. 23, 2002, pages.
U.S. Appl. No. 09/449,106, Non-Final Office Action mailed Mar. 26, 2002, pages.
U.S. Appl. No. 09/449,106, Non-Final Office Action mailed Apr. 8, 2003, pages. [Unavailable].
U.S. Appl. No. 09/449,106, Non-Final Office Action mailed Oct. 22, 2002, pages.
U.S. Appl. No. 09/449,106, Notice of Allowance mailed Jan. 3, 2004, pages.
U.S. Appl. No. 09/525,509, Advisory Action mailed Aug. 10, 2005 (2 pages).
U.S. Appl. No. 09/525,509, Amendment After Notice of Allowance filed Jun. 12,2007 (3 pages).
U.S. Appl. No. 09/525,509, Amendment and Response filed Jan. 7, 2005 (10 pages).
U.S. Appl. No. 09/525,509, Amendment and Response filed Feb. 27, 2006 (18 pages).
U.S. Appl. No. 09/525,509, Amendment and Response filed Jul. 22, 2005 (22 pages).
U.S. Appl. No. 09/525,509, Final Rejection mailed May 20, 2005 (24 pages).
U.S. Appl. No. 09/525,509, Non-Final Rejection mailed Oct. 6, 2004 (24 pages).
U.S. Appl. No. 09/525,509, Non-Final Rejection mailed Nov. 18, 2005 (22 pages).
U.S. Appl. No. 09/525,509, Notice of Allowance mailed Apr. 4, 2007 (7 pages).

(56) References Cited

OTHER PUBLICATIONS

U.S. Appl. No. 09/525,510, Advisory Action mailed Feb. 20, 2004 (2 pages).
U.S. Appl. No. 09/525,510, Advisory Action mailed Dec. 8, 2006 (2 pages).
U.S. Appl. No. 09/525,510, Amendment After Final filed May 2, 2003 (11 pages).
U.S. Appl. No. 09/525,510, Amendment After Notice of Allowance filed Jun. 12, 2007 (3 pages).
U.S. Appl. No. 09/525,510, Amendment and Response Sep. 22, 2003 (7 pages).
U.S. Appl. No. 09/525,510, Amendment and Response filed Jan. 10, 2005 (9 pages).
U.S. Appl. No. 09/525,510, Amendment and Response filed Jan. 26, 2004 (7 pages).
U.S. Appl. No. 09/525,510, Amendment and Response filed Apr. 25, 2006 (8 pages).
U.S. Appl. No. 09/525,510, Amendment and Response filed Jul. 8, 2005 (16 pages).
U.S. Appl. No. 09/525,510, Amendment and Response filed Nov. 4, 2002 (7 pages).
U.S. Appl. No. 09/525,510, Amendment and Response filed Nov. 13, 2006 (13 pages).
U.S. Appl. No. 09/525,510, Amendment and Response filed Dec. 16, 2005 (17 pages).
U.S. Appl. No. 09/525,510, Appeal Brief filed Jul. 12, 2004 (38 pages).
U.S. Appl. No. 09/525,510, Final Rejection filed Jan. 29, 2003 (12 pages).
U.S. Appl. No. 09/525,510, Final Rejection mailed Jul. 7, 2006 (13 pages).
U.S. Appl. No. 09/525,510, Final Rejection mailed Nov. 13, 2003 (12 pages).
U.S. Appl. No. 09/525,510, Non-Final Rejection mailed Jan. 23, 2006 (12 pages).
U.S. Appl. No. 09/525,510, Non-Final Rejection mailed Apr. 26, 2005 (11 pages).
U.S. Appl. No. 09/525,510, Non-Final Rejection mailed Jun. 5, 2003 (11 pages).
U.S. Appl. No. 09/525,510, Non-Final Rejection mailed Sep. 3, 2002 (12 pages).
U.S. Appl. No. 09/525,510, Non-Final Rejection mailed Sep. 16, 2005 (12 pages).
U.S. Appl. No. 09/525,510, Non-Final Rejection mailed Oct. 12, 2004 (11 pages).
U.S. Appl. No. 09/525,510, Notice of Allowance mailed Apr. 3, 2007 (8 pages).
U.S. Appl. No. 09/526,290, Amendment and Response filed Jan. 29, 2003, 12 pages.
U.S. Appl. No. 09/526,290, Non-Final Office Action mailed Oct. 22, 2002, 10 pages.
U.S. Appl. No. 09/526,290, Notice of Allowance mailed Jan. 30, 2004, 11 pages.
U.S. Appl. No. 09/526,291, Amendment and Response filed Apr. 15, 2004, 24 pages.
U.S. Appl. No. 09/526,291, Non-Final Office Action mailed Nov. 25, 2003, 17 pages.
U.S. Appl. No. 09/526,291, Notice of Allowance mailed Jul. 13, 2004, 4 pages.
U.S. Appl. No. 09/526,292, Amendment and Response filed Jan. 26, 2004, pages.
U.S. Appl. No. 09/526,292, Non-Final Office Action mailed Nov. 17, 2003, pages.
U.S. Appl. No. 09/526,292, Notice of Allowance mailed Jun. 9, 2004, pages.
U.S. Appl. No. 09/645,887, Final Office Action mailed Aug. 10, 2005, 11 pages.
U.S. Appl. No. 09/645,887, Non- Final Office Action filed Feb. 9, 2005, 10 pages.
U.S. Appl. No. 09/645,887, Non-Final Office Action mailed Mar. 25, 2004, 11 pages.
U.S. Appl. No. 09/645,887, Notice of Allowance mailed Nov. 30, 2005, 7 pages.
U.S. Appl. No. 09/892,298, Advisory Action mailed Nov. 2, 2005 (6 pages).
U.S. Appl. No. 09/892,298, Amendment After Final filed Oct. 11, 2005 (14 pages).
U.S. Appl. No. 09/892,298, Amendment and Response filed May 27, 2005 (17 pages).
U.S. Appl. No. 09/892,298, Final Rejection mailed Aug. 11, 2015 (16 pages).
U.S. Appl. No. 09/892,298, Non-Final Rejection mailed Mar. 16, 2005 (17 pages).
U.S. Appl. No. 09/892,298, Pre-Brief Appeal Conference Decision mailed Mar. 10, 2006 (2 pages).
U.S. Appl. No. 09/892,298, Pre-Brief Conference Request mailed Nov. 16, 2005 (6 pages).
U.S. Appl. No. 09/892,329, Advisory Action mailed Oct. 12, 2005 (3 pages).
U.S. Appl. No. 09/892,329, Amendment and Response filed Feb. 2, 2005 (13 pages).
U.S. Appl. No. 09/892,329, Amendment and Response filed Apr. 17, 2006 (23 pages).
U.S. Appl. No. 09/892,329, Amendment and Response filed Jul. 13, 2005 (20 pages).
U.S. Appl. No. 09/892,329, Amendment and Response filed Oct. 3, 2005 (24 pages).
U.S. Appl. No. 09/892,329, Amendment and Response filed Nov. 7, 2006 (19 pages).
U.S. Appl. No. 09/892,329, Final Rejection mailed Jul. 7, 2006 (14 pages).
U.S. Appl. No. 09/892,329, Final Rejection mailed Aug. 10, 2005 (13 pages).
U.S. Appl. No. 09/892,329, Non-Final Rejection mailed Jan. 18, 2006 (12 pages).
U.S. Appl. No. 09/892,329, Non-Final Rejection mailed Apr. 20, 2005 (12 pages).
U.S. Appl. No. 09/892,329, Non-Final Rejection mailed Nov. 2, 2004 (28 pages).
U.S. Appl. No. 09/892,329, Notice of Allowance mailed Jan. 16, 2007 (7 pages).
U.S. Appl. No. 09/892,371, Advisory Action mailed Nov. 3, 2005 (3 pages).
U.S. Appl. No. 09/892,371, Amendment and Response filed May 20, 2005 (20 pages).
U.S. Appl. No. 09/892,371, Amendment and Response filed Oct. 11, 2005 (25 pages).
U.S. Appl. No. 09/892,371, Final Rejection mailed Aug. 23, 2005 (15 pages).
U.S. Appl. No. 09/892,371, Non-Final Rejection mailed Mar. 8, 2005 (14 pages).
U.S. Appl. No. 09/892,371, Notice of Allowance mailed Feb. 10, 2006 (11 pages).
U.S. Appl. No. 10/971,346, Final Rejection mailed Jul. 16, 2013, 17 pages.
U.S. Appl. No. 10/980,743, Amendment and Response filed Jul. 8, 2008 (15 pages).
U.S. Appl. No. 10/980,743, Non-Final Rejection mailed Apr. 11, 2008 (14 pages).
U.S. Appl. No. 10/980,743, Notice of Allowance mailed Mar. 10, 2009 (7 pages).
U.S. Appl. No. 10/980,743, Notice of Allowance mailed Oct. 24, 2008 (7 pages).
U.S. Appl. No. 10/981,846, Amendment and Response filed Apr. 28, 2008 (10 pages).
U.S. Appl. No. 10/981,846, Non-Final Rejection mailed Jan. 28, 2008 (7 pages).
U.S. Appl. No. 10/981,846, Notice of Allowance mailed Jun. 2, 2008 (6 pages).
U.S. Appl. No. 10/982,105, Notice of Allowance mailed Dec. 2, 2005 (7 pages).

(56) References Cited

OTHER PUBLICATIONS

U.S. Appl. No. 10/982,578, Amendment and Response filed Feb. 24, 2010 (15 pages).
U.S. Appl. No. 10/982,578, Amendment and Response filed Feb. 25/09 (13 pages).
U.S. Appl. No. 10/982,578, Amendment and Response filed Jul. 14, 2010 (11 pages).
U.S. Appl. No. 10/982,578, Amendment and Response filed Jul. 23, 2009 (14 pages).
U.S. Appl. No. 10/982,578, Amendment and Response filed Sep. 11, 2008 (14 pages).
U.S. Appl. No. 10/982,578, Amendment and Response filed Dec. 17, 2010 (3 pages).
U.S. Appl. No. 10/982,578, Final Rejection mailed Nov. 24, 2009 (24 pages).
U.S. Appl. No. 10/982,578, Final Rejection mailed Nov. 25, 2008 (17 pages).
U.S. Appl. No. 10/982,578, Non-Final Rejection mailed Apr. 14, 2010 (13 pages).
U.S. Appl. No. 10/982,578, Non-Final Rejection mailed Apr. 23, 2009 (13 pages).
U.S. Appl. No. 10/982,578, Non-Final Rejection mailed May 13, 2008 (16 pages).
U.S. Appl. No. 10/982,578, Notice of Allowance mailed Apr. 18, 2011 (9 pages).
U.S. Appl. No. 10/982,578, Notice of Allowance mailed Oct. 14, 2010 (7 pages).
U.S. Appl. No. 10/983,040, Advisory Action mailed Mar. 11, 2009 (3 pages).
U.S. Appl. No. 10/983,040, Amendment After Final filed Feb. 24, 2009 (12 pages).
U.S. Appl. No. 10/983,040, Amendment and Response filed Jan. 30, 2008 (10 pages).
U.S. Appl. No. 10/983,040, Amendment and Response filed Aug. 18, 2008 (10 pages).
U.S. Appl. No. 10/983,040, Amendment and Response filed Nov. 23, 2009 (10 pages).
U.S. Appl. No. 10/983,040, Final Rejection mailed Nov. 25, 2008 (11 pages).
U.S. Appl. No. 10/983,040, Non-Final Rejection mailed Apr. 17, 2008 (14 pages).
U.S. Appl. No. 10/983,040, Non-Final Rejection mailed May 28, 2009 (13 pages).
U.S. Appl. No. 10/983,040, Non-Final Rejection mailed Oct. 30, 2007 (10 pages).
U.S. Appl. No. 10/983,040, Notice of Allowance mailed Mar. 11, 2010 (6 pages).
U.S. Appl. No. 10/983,040, Notice of Allowance mailed Mar. 30, 2010 (6 pages).
U.S. Appl. No. 11/094,097, Advisory Action mailed Mar. 31, 2008 (3 pages).
U.S. Appl. No. 11/094,097, Amendment and Response filed Mar. 7, 2008 (13 pages).
U.S. Appl. No. 11/094,097, Amendment and Response filed Apr. 21, 2009 (9 pages).
U.S. Appl. No. 11/094,097, Amendment and Response filed Sep. 28, 2007 (13 pages).
U.S. Appl. No. 11/094,097, Amendment and Response filed Oct. 28, 2008 (11 pages).
U.S. Appl. No. 11/094,097, Final Rejection mailed Dec. 13, 2007 (17 pages).
U.S. Appl. No. 11/094,097, Non-Final Rejection mailed Jun. 28, 2007 (17 pages).
U.S. Appl. No. 11/094,097, Non-Final Rejection mailed Jul. 28, 2008 (20 pages).
U.S. Appl. No. 11/094,097, Notice of Allowance mailed Jul. 13, 2009 (12 pages).
U.S. Appl. No. 11/094,097, Supplemental Response filed Dec. 11, 2008 (14 pages).
U.S. Appl. No. 11/107,513, Amendment After Final filed Jun. 23, 2009 (7 pages).
U.S. Appl. No. 11/107,513, Amendment After Notice of Allowance filed Aug. 13, 2009 (6 pages).
U.S. Appl. No. 11/107,513, Amendment and Response filed Dec. 17, 2008 (12 pages).
U.S. Appl. No. 11/107,513, Final Rejection mailed Mar. 23, 2009 (8 pages).
U.S. Appl. No. 11/107,513, Non-Final Rejection mailed Sep. 19, 2008 (8 pages).
U.S. Appl. No. 11/107,513, Notice of Allowance mailed Jul. 9, 2009 (7 pages).
U.S. Appl. No. 11/108,038, Amendment and Response filed Apr. 9, 2012 (11 pages).
U.S. Appl. No. 11/108,038, Amendment and Response filed Sep. 4, 2012 (14 pages).
U.S. Appl. No. 11/108,038, Final Rejection mailed Jun. 4, 2012 (11 pages).
U.S. Appl. No. 11/108,038, Non-Final Rejection mailed Dec. 7, 2011 (9 pages).
U.S. Appl. No. 11/116,884, Notice of Allowance mailed Mar. 6, 2013 (8 pages).
U.S. Appl. No. 11/116,884, Notice of Allowance mailed Dec. 20, 2012 (8 pages).
U.S. Appl. No. 11/132,677, Advisory Action mailed Jan. 9, 2009 (3 pages).
U.S. Appl. No. 11/132,677, Amendment After Final filed Dec. 29, 2008 (17 pages).
U.S. Appl. No. 11/132,677, Amendment and Response filed Mar. 2, 2009 (14 pages).
U.S. Appl. No. 11/132,677, Amendment and Response filed Aug. 8, 2008 (17 pages).
U.S. Appl. No. 11/132,677, Final Rejection mailed Oct. 1, 2008 (10 pages).
U.S. Appl. No. 11/132,677, Non-Final Rejection mailed Apr. 8, 2008 (9 pages).
U.S. Appl. No. 11/132,677, Notice of Allowance mailed May 7, 2009 (6 pages).
U.S. Appl. No. 11/132,677, Notice of Allowance mailed Sep. 23, 2009 (6 pages).
U.S. Appl. No. 11/134,719, Amendment and Response filed Apr. 18, 2012 (8 pages).
U.S. Appl. No. 11/134,719, Final Rejection mailed May 3, 2012 (12 pages).
U.S. Appl. No. 11/134,719, Non-Final Rejection mailed Jan. 19, 2012 (10 pages).
U.S. Appl. No. 11/353,321, Amendment and Response filed Apr. 30, 2013 (22 pages).
U.S. Appl. No. 11/353,321, Amendment and Response filed Aug. 20, 2013, 21 pages.
U.S. Appl. No. 11/353,321, Final Rejection mailed Jan. 31, 2013 (13 pages).
U.S. Appl. No. 11/353,321, Non-Final Rejection mailed May 21, 2013, 15 pages.
U.S. Appl. No. 11/432,276, Amendment and Response filed Jan. 30, 2008 (7 pages).
U.S. Appl. No. 11/432,276, Amendment and Response filed Sep. 14, 2007 (11 pages).
U.S. Appl. No. 11/432,276, Non-Final Rejection mailed Jun. 14, 2007 (14 pages).
U.S. Appl. No. 11/432,276, Non-Final Rejection mailed Oct. 30, 2007 (8 pages).
U.S. Appl. No. 11/432,276, Notice of Allowance mailed Mar. 28, 2008 (4 pages).
U.S. Appl. No. 11/754,856, Amendment After Final filed Jun. 23, 2011 (8 pages).
U.S. Appl. No. 11/754,856, Amendment and Response filed Jan. 10, 2011 (10 pages).
U.S. Appl. No. 11/754,856, Amendment and Response filed Jun. 18, 2010 (10 pages).
U.S. Appl. No. 11/754,856, Amendment and Response filed Dec. 29, 2009 (9 pages).

(56) References Cited

OTHER PUBLICATIONS

U.S. Appl. No. 11/754,856, Final Rejection mailed Mar. 10, 2010 (14 pages).
U.S. Appl. No. 11/754,856, Final Rejection mailed Apr. 8, 2011 (5 pages).
U.S. Appl. No. 11/754,856, Non-Final Rejection mailed Sep. 29, 2009 (13 pages).
U.S. Appl. No. 11/754,856, Non-Final Rejection mailed Oct. 14, 2010 (14 pages).
U.S. Appl. No. 11/754,856, Notice of Allowance mailed Jul. 14, 2011 (7 pages).
U.S. Appl. No. 11/866,041, Advisory Action mailed Dec. 2, 2011 (3 pages).
U.S. Appl. No. 11/866,041, Amendment and Response filed Feb. 8, 2011 (9 pages).
U.S. Appl. No. 11/866,041, Amendment and Response filed Oct. 27, 2011 (9 pages).
U.S. Appl. No. 11/866,041, Final Rejection mailed Aug. 24, 2011 (12 pages).
U.S. Appl. No. 11/866,041, Non-Final Rejection mailed Jun. 14, 2013, 9 pages.
U.S. Appl. No. 11/866,041, Non-Final Rejection mailed Oct. 12, 2010 (17 pages).
U.S. Appl. No. 12/014,081, Amendment and Response filed Jun. 23, 2010 (15 pages).
U.S. Appl. No. 12/014,081, Amendment and Response filed Nov. 18, 2010 (17 pages).
U.S. Appl. No. 12/014,081, Final Rejection mailed Aug. 20, 2010 (23 pages).
U.S. Appl. No. 12/014,081, Non-Final Rejection mailed Mar. 23, 2010 (20 pages).
U.S. Appl. No. 12/014,081, Non-Final Rejection mailed Oct. 11, 2012 (5 pages).
U.S. Appl. No. 12/053,090, Amendment and Response mailed Nov. 14, 2011 (25 pages).
U.S. Appl. No. 12/053,090, Notice of Allowance mailed Sep. 23, 2013, 14 pages.
U.S. Appl. No. 12/135,944, Amendment and Response filed Dec. 1, 2009 (2 pages).
U.S. Appl. No. 12/135,944, Non-Final Rejection mailed Sep. 1, 2009 (4 pages).
U.S. Appl. No. 12/135,944, Notice of Allowance mailed Dec. 24, 2009 (6 pages).
U.S. Appl. No. 12/832,831, Amendment and Response filed Jul. 22, 2013, 12 pages.
U.S. Appl. No. 12/832,831, Amendment and Response filed Dec. 17, 2012 (15 pages).
U.S. Appl. No. 12/832,831, Non-Final Rejection mailed Apr. 22, 2013 (10 pages).
U.S. Appl. No. 12/832,831, Non-Final Rejection mailed Aug. 15, 2012 (13 pages).
U.S. Appl. No. 12/832,831, Notice of Allowance mailed Oct. 3, 2013, 14 pages.
U.S. Appl. No. 13/274,217, Notice of Allowance mailed Jan. 8, 2013 (10 pages).
U.S. Appl. No. 13/367,198, Amendment and Response filed Jul. 9, 2013, 12 pages.
U.S. Appl. No. 13/367,198, Non-Final Rejection mailed Feb. 25, 2013 (13 pages).
*Using Windows Media Rights Manager to Protect and Distribute Digital Rights Media*, Windows Media Technologies (Online): XP002307161; http://msdn.microsoft/msdnmag/issues/01/12/DRM/print.asp, (Dec. 1, 2001).
Utagawa, Mari et al., "Creation of Card Application by IC Card OS 'MULTOS' Which Can Rewrite Application", Interface, vol. 29, No. 3. ISSN: 0387-9569, CQ Publishing Co. Ltd., (Mar. 1, 2003), pp. 46-55.
Vernon, P., "Improved identification schemes based on error-correcting codes," AAECC, 1997, 57-69.
*WDM Audio Design Considerations*, Copyright 2004, intelligraphics.com, Intelligraphics Device Drivers, Printed Apr. 15, 2005.
*WebServUSB Quick Start, ItWorks,*, http://www.webservusb.com, Retrieved from the Internet Jun. 1, 2005 (Copyright 2004), 16 pages.
Yue, Wei T., et al., "The Reward Based Online Shopping Community", Routledge, vol. 10, No. 4, (Oct. 1, 2000), 2 pages.
Zemao, Chen et al., "*A Malicious Code Immune Model Based on Program Encryption*", IEEE—Wireless Communication, Networking and Mobile Computing, WICOM '08, 4th International Conference on Oct. 12-14, 2008, 5 pages.
Zhao, Hua "A New Watermarking Scheme for CAD Engineering Drawings", 9th Intl. Conf. Computer-Aided Industrial Design and Conceptual Design: CAID/CD 2008; Nov. 22-25, 2008.
Ahuja, Gautama. "The Key to Keys," DataQuest (India), 1997, (from DialogClassic WebTM, file 619, Acc. No. 05010091).
Amdur, D. "Metering Online Copyright," Jan. 16, 1996, 2 pages.
Amdur, D. (ed), "Intertrust Challenges IBM Digital Content Metering," Report of Electronic Commerce, Jul. 23, 1996, 3(15), 1-2 and 6-18.
Backman, D. "Smartcards: The Intelligent Way to Security," Network Computing, 1998, 9(9), 168-171.
*Bankard Set to Into Virtual Shopping in Philippines*, Newsbytes News Network, Apr. 16, 1997, (from DialogClassic WebTM file 9, acc. No. 01235815).
*Boxing Up Bytes*, 2 pages.
Chin, T.L., "Reaching Out to Physicians," Health Data Management, Sep. 1998, 6(9).
Clark, T. "Software Secures Digital Content on Web," Interactive Week, 1995, 1 page.
Craig, W. et al. "Digital Licensing," IEEE Internet Computing, Jul./Aug. 2005, 9(4).
Discussion from microsoft.public.access.security, "? How to Prevent copying DB Application to Other Machines," response from Dec. 22, 1998.
Hidgins-Bonafield, C. "Selling Knowledge on the Net," Network Computing, 1995, 102-109.
Kaliski, Privacy Enhancement for Internet email-Part IV: Key Certification and Related Services, RFC 1424, 1993, 1-8.
Kopeikin, R. "Secure Trading on the Net," Telecommunications International Edition, 1996, 30(10), 89-94.
Misra, R.B. et al., "Tamper Detection Using Neuro-Fuzzy Logic," Ninth International Conference on Metering and Tariffs for Energy Supply, Conference Publication 462, May 25-28, 1999, 101-108.
*MS to Upgrade Browser Security*, Cnet News.com, Mar. 20, 1997.
*Network-based Authentication: The Key to Security*, Network Computing, 1991, 98.
*Next Step is Encryption: Data Security may be Bundled with Next's Operating System*, Electronic Engineering Times, 1992, Dialog Classic Web 9tm, file 16, acc No. 02103190.
*Postal Service Announce Plan to Postmarks on Electronic Mail*, San Jose Mercury News, Apr. 19, 1995, DialogClassic Web file 9, acc No. 00618375.
*S-A Unveil Security System*, Multichannel News, 1996, 18(3), 45 + file 9, acc No. 00864754.
Smith, M.G. et al. "A New Set of Rules for Information Commerce," Electronic Commerce, 1995, 34-35.
Stallings, W. Network and Internetwork Security Principles and Practice, 1995, 3 pages.
Stevens, M.G. "How Secure is Your Computer System?," Practical Accountant, 1998, 31(1), 24-32.
*Suppliers Cashing in on the Internet*, Communications Week International, Nov. 14, 1994, 134, 36 Dialog Classic Web file 9, acc No. 00564878.
Tarter, J. "The Superdistribution Model," Soft Trends, 1996, 3(6), 1-6.
*The Key to Keys*, DataQuest, 1997.
*The New Network: Planning and Protecting Intranet Electronic Commerce*, Information Week, 1996, 608, Dialog Classic WebTM file 13, acc No. 00528101.
United States Amendment filed Jul. 30, 2012, in U.S. Appl. No. 13/274,217 (15 pages).
United States Amendment filed Aug. 16, 2012, in U.S. Appl. No. 11/353,321 (24 pages).

(56) References Cited

OTHER PUBLICATIONS

United States Notice of Allowance mailed Nov. 6, 2012, in U.S. Appl. No. 11/018,095 (8 pages).
USPTO Office Action, mailed Mar. 26, 2002, cited in U.S. Appl. No. 09/449,106.
USPTO Office Action, mailed Oct. 22, 2002, cited in U.S. Appl. No. 09/449,106.
Japanese Notice of Rejection mailed Feb. 9, 2010, in Application No. 2001-050480 (12 pages).
Japanese Notice of Allowance mailed May 25, 2010, in Application No. 2004-050480 (6 pages).
Malaysia Substantive Examination mailed Apr. 23, 2008, in Application No. PI20040481 (2 pages).
Malaysia Notice of Allowance mailed Sep. 30, 2011, in Application No. PI20040481 (2 pages).
Malaysia Substantive Examination mailed Oct. 2. 2009, in Application No. PI20051703 (2 pages).
Malaysia Notice of Allowance mailed May 14, 2010, in Application No. PI20051703 (2 pages).
Polish Notice mailed Jan. 23, 2009, in Application No. P365549 (4 pages).
Polish Notice mailed Sep. 9, 2009, in Application No. P365549 (3 pages).
Philippines Office Action mailed Oct. 26, 2007, in Application No. 1-2004-000078 (1 page).
Russian Office Action mailed Jan. 25, 2008, in Application No. 2004105509 (8 pages).
Russian Decision on Grant mailed Jul. 24, 2008, in Application No. 2004105509 (13 pages).
Russian Office Action mailed Mar. 5, 2008, in Application No. 2004103871 (9 pages).
Russian Decision on Grant mailed Jun. 27, 2008, in Application No. 2004103871 (20 pages).
Russian Office Action mailed Apr. 22, 2009, in Application No. 2005112059 (3 pages).
Russian Decision to Grant mailed Jul. 16, 2009, in Application No. 2005112059 (20 pages).
Russian Decision to Grant mailed Mar. 16, 2009, in Application No. 2005112105 (18 pages).
Russian Decision to Grant mailed Aug. 13, 2008, in Application No. 2005120670 (6 pages).
Russian Decision to Grant mailed Oct. 6, 2010, in Application No. 2008101456 (22 pages).
Japanese Notice of Rejection mailed on Feb. 12, 2010, in Application No. 2004-035808 (7 pages).
Japanese Notice of Rejection mailed Jul. 23, 2010, in Application No. 2004-035808 (4 pages).
Japanese Notice of Allowance mailed Nov. 2, 2010, in Application No. 2004-035808 (6 pages).
Japanese Notice of Rejection mailed Dec. 3, 2010, in Application No. 2005-006781 (9 pages).
Japanese Final Rejection mailed on Apr. 22, 2011, in Application No. 2005-006781 (7 pages).
Japanese Written Appeal filed Aug. 22, 2011, in Application No. 2005-006781 (23 pages).
Japanese Notice of Allowance mailed Oct. 7, 2011, in Application No. 2005-006781 (6 pages).
Japanese Notice of Rejection mailed Dec. 10, 2010, in Application No. 2005-124814 (11 pages).
Japanese Notice of Allowance mailed Apr. 26, 2011, in Application No. 2005-124814 (6 pages).
Japanese Notice of Rejection mailed May 20, 2011, in Application No. 2008-521533 (4 pages).
Japanese Notice of Allowance mailed Oct. 14, 2011, in Application No. 2008-521533 (6 pages).
Australian Examination Response filed Aug. 21, 2009, In Australian Application No. 200400461 (26 pgs).
Australian First Report on Patent Action mailed May 22, 2009, in Australian Application No. 200400461 (2 pgs).
Australian Notice of Acceptance mailed Nov. 12, 2009, in Australian Application No. 2004200471 (3 pgs).
Australian Notice of Acceptance mailed Sep. 4, 2009, in Australian Application No. 2004200461 (3 pgs).
Australian Office Action mailed Aug. 27, 2009, in Australian Application No. 2004200471 (2 pgs).
Chinese Noitce on First Office Action mailed Feb. 6, 2009, in Chinese Application No. 200410007610 (11 pgs).
Chinese Notice on First Office Action mailed Feb. 6, 2009, in Chinese Patent Application No. 200410005380.4 (9 pgs).
Chinese Notice on Grant of Patent Right for Invention mailed Jul. 24, 2009, in Chinese Patent Application No. 200410005380.4 (4 pgs).
Chinese Notice on the First Action mailed Nov. 23, 2011, in Chinese Application No. 200910139429.8 (7 pgs).
Chinese Response to First Office Action mailed Feb. 6, 2009, in Chinese Patent Application No. 200410005380.4, filed Jun. 5, 2009 (12 pgs).
*Digital Media Solutions: Secure Streaming.* OrnniWeb, http://www.omniweb.com/dms.html#stream, 3 pgs.
European Communication mailed Feb. 17, 2005, in European Patent Application No. 03013569.3 (4 pgs).
European Communication mailed Feb. 15, 2006, in European Patent Application No. 03013569.3 (7 pgs).
European Communication mailed Jan. 17, 2011, in European Application No. 03013556 (4 pgs).
European Communication mailed Jun. 8, 2006, in European Application No. 04003033.0 (3 pgs).
European Communication mailed Jun. 6, 2007, in European Application No. 03013556 (4 pgs).
European Communication mailed Mar. 18, 2005, in European Application No. 04001954.9 (3 pgs).
European Decision to Refuse a European Patent Application mailed Apr. 4, 2006, in European Application No. 04001954.9 (31 pgs).
European Decision to Refuse European Patent Application mailed Apr. 25, 2007, in European Patent Application No. 03013569.3 (21 pgs).
European Letter in Response to the Summons dated Nov. 22, 2006 to Attend Oral Proceedings, mailed Feb. 22, 2007, in European Patent Application No. 03013569.3 (22 pgs).
European Partial Search Report filed Feb. 20, 2006, in European Application No. 03013556 (5 pgs).
European Reply to Communication filed May 24, 2011, in European Application No. 03013556 (16 pgs).
European Reply to Communication filed Oct. 16, 2007, in European Application No. 03013556 (25 pgs).
European Response to Communication dated Mar. 18, 2005, in European Application No. 04001954.9, filed May 24, 2005 (17 pgs).
European Response to Official Communication dated Feb. 15, 2006, filed Aug. 25, 2006 in European Patent Application No. 03013569.3 (18 pgs).
European Response to Official Communication dated Feb. 17, 2005, filed Jun. 27, 2005 in European Patent Application No. 03013569.3 (27 pgs).
European Response to Summons dated Sep. 23, 2010, in European Application No. 04001954.9. filed Dec. 14, 2010 (14 pgs).
European Response to Summons to Attend Oral Proceedings mailed Oct. 4, 2005, in European Application No. 04001954.9, filed Nov. 17, 2005 (5 pgs).
European Search Report dated Jul. 27, 2004 in European Application No. 04001954.9 (2 pgs).
European Search Report filed Aug. 2, 2004, in European Application No. 03013569.3 (4 pgs).
European Search Report filed Oct. 25, 2006, in European Application No. 03013556 (7 pgs).
European Search Report mailed Sep. 26, 2005, in European Application No. 04003033.0 (4 pgs).
European Summons to Attend Oral Proceedings mailed Oct. 4, 2005, in European Application No. 04001954.9 (30 pgs).
Evans, P. "Drm: Is the Road to Adoption Fraught with Potholes?" Seybold Reporting Analyzing Publishing Technologies, 2001, 1(14), 32. cited by other.
Fowler, T.B. "Technology's Changing Role in Intellectual Property Rights", IT Professional(IEEE), 2002, 4(2), 39-44. cited by other.

(56) References Cited

OTHER PUBLICATIONS

Gable, J. "The Digital Rights Conundrum", Transform Magazine, 2001, 10(11), 27. cited by other.
Griswold, G.N. "A Method for Protecting Copyright on Networks", IMA Intellectual Property Project Proceedings, 1994, 1(1), 169-178. cited by other.
Gunter, C.A., et al. "Models and Languages for Digital Rights", Proceedings of the 34.sup.th Annual Hawaii International Conference on System Sciences, 2001, 1-5. cited by other.
Hanai, Hiroyuki; "Latest Information and Establishment of a Server-Setting Up Free BSD-", Unix User, vol. 11, No. 3, pp. 93-100, etc., Softbank Publishing Co., Ltd., Japan, Mar. 1, 2002. cited by other. [Partial English Translation].
*How Windows Rights Management Works (Illustration)*. posted Mar. 17, 2003, http://directionsmicrosft.com/sample/DOMIS/update/2003/04apr/0403rrmctte_illo.htm, 5 pgs.
Hwang, C. et al., "Protection of Digital Contents on Distributed Multimedia Environment", Proceedings of the IASTED International Conference, Internet and Multimedia Systems and Applications, Nov. 19-23, 2000, Las Vegas, Nevada, USA, pp. 127-132. cited by other.
India First Examination Report mailed Aug. 30, 2011, in India Application No. 167/MUM/2004 (3 pgs).
Japanese Amendment filed Mar. 5, 2009, in Japanese Patent Application No. 2003-183597 (9 pgs).
Japanese Final Rejection mailed on Sep. 21, 2010, in Japanese Patent Application No. 2004-035810 (4 pgs).
Japanese Notice of Allowance mailed May 13, 2011, in Japanese Patent Application No. 2003-183597 (6 pgs).
Japanese Notice of Allowance mailed Oct. 18, 2010, in Japanese Patent Application No. 2004-050478 (6 pgs).
Japanese Notice of Allowance mailed Oct. 30, 2009, in Japanese Patent Application No. 2003-183597 (6 pgs).
Japanese Notice of Rejection mailed Dec. 1, 2009, in Japanese Patent Application No. 2003-183596 (7 pgs).
Japanese Notice of Rejection mailed Dec. 10, 2010, in Japanese Patent Application No. 2003-183596 (8 pgs).
Japanese Notice of Rejection mailed on Jun. 1, 2010, in Japanese Patent Application No. 2004-035810 (5 pgs).
Japanese Notice of Rejection mailed on May 28, 2010, in Japanese Application No. 2004050478 (5 pgs).
Japanese Notice of Rejection mailed on Sep. 17, 2010, in Japanese Application No. 2004-050478 (3 pgs).
Japanese Official Notice of Rejection mailed on Dec. 5, 2008, in Japanese Patent Application No. 2003-183597 (143 pgs).
Japanese Response filed Apr. 22, 2011, in Japanese Patent Application No. 2003-183596 (30 pgs).
Japanese Response filed Mar. 1, 2010, in Japanese Patent Application No. 2003-183596 (18 pgs).
Kahn, R.E. "Deposit, Registration and Recordation in an Electronic Copyright Management System", IMA Intellectual Property Project Proceedings, 1994, 1(1), 111-120. cited by other.
Kington, "Manage digital rights with the OMA", IBM, Jul. 27, 2004, http://www.-106.ibm.com/developer.works/wireless/library/wi-drm.html, 4 pgs.
Korean Amendment filed Jan. 31, 2011, in Korean Patent Application No. 10-20040009030 (20 pgs.).
*License Management is Fundamental, DRM Acts as an Impregnable Defense, the Last Stronghold is a Dedicated-Viewer*. Nikkei Internet Technology, Nikkei Business Publications, Inc., Dec. 2001 issue, pp. 34 to 39, Japan, Nov. 22, 2001.
*Managing digital rights in online publishing*. Information Management & Technology, 2001, 34(4), 168-169. cited by other.
Oda, Hiroharu; "The Basics and Application of Security IC Cards—Passport to an e-business", 1st Ed., pp. 143-144, etc., C.media Co., Ltd., Apr. 27, 2000. cited by other . [Partial English Translation].
Peinado, M. "Digital rights management in a multimedia environment", SMPTE Journal, 2002, 111(3), 159-163. cited by other.

*Realnetworks Announces Helix Drm—The First Major Digital Rights Management Platform for Both Standards-Based and Internet Formats*. http://www.realnetworks.como/company/press/releases/2003/helixdrm.html, 3 pgs.
*Rights Management Comes to the Enterprise: Rights Management Beyond Digital Media*, by Matt Rosoff, posted Mar. 17, 2003 http://directionsonmicrosoft.com/sample/DOMIS/update/2003/04apr/0403rmctte.htm.
Royan, B. Content creation and rights management; experiences of SCRAN(the Scottish Cultural Resources Access Network), Program, 2000, 34(2), 131-142. cited by other.
Russian Official Action mailed Dec. 12, 2007, in Russian Patent Application No. 2004103872 (5 pgs).
Taiwan Notice of Allowance mailed Jul. 28, 2010, in Taiwanese Application No. 9310448 (4 pgs).
United States Advisory Action mailed Dec. 1, 2006, in U.S. Appl. 10/364,627.
United States Advisory Action mailed Dec. 3, 2008, in U.S. Appl. No. 10/185,511 (3 pgs).
United States Advisory Action mailed Dec. 5, 2006, in U.S. Appl. No. 10/185,527 (3 pgs).
United States Advisory Action mailed Feb. 12, 2009, in U.S. Appl. No. 11/108,038 (3 pgs).
United States Advisory Action mailed Jul. 9, 2007, in U.S. Appl. No. 10/373,621 (3 pgs).
United States Advisory Action mailed Jun. 26, 2009, in U.S. Appl. No. 11/107,709.
United States Advisory Action mailed Nov. 10, 2008, in U.S. Appl. No. 10/364,115 (3 pgs).
United States Advisory Action mailed Nov. 28, 2006, in U.S. Appl. No. 10/185,511 (3 pgs).
United States Advisory Action mailed Nov. 9, 2007, in U.S. Appl. No. 10/364,115 (3 pgs).
United States Advisory Office Action mailed Dec. 4, 2006, in U.S. Appl. No. 10/185,278.
United States Amendment After Notice of Allowance to Feb. 10, 2009 action, filed Mar. 16, 2009 in U.S. Appl. No. 10/185,278 (8 pgs).
United States Final Office Action mailed Apr. 16, 2008, in U.S. Appl. No. 11/179,206 (7 pgs).
United States Final Office Action mailed Apr. 18, 2007, in U.S. Appl. No. 10/373,621 (10 pgs).
United States Final Office Action mailed Aug. 20, 2007, in U.S. Appl. No. 10/364,115 (10 pgs).
United States Final Office Action mailed Aug. 21, 2007, in U.S. Appl. No. 10/185,511 (18 pgs).
United States Final Office Action mailed Aug. 22, 2008, in U.S. Appl. No. 10/185,511 (16 pgs).
United States Final Office Action mailed Aug. 24, 2007, in U.S. Appl. No. 10/185,278.
United States Final Office Action mailed Aug. 30, 2007, in U.S. Appl. No. 10/364,627.
United States Final Office Action mailed Feb. 4, 2010, in U.S. Appl. No. 11/108,038.
United States Final Office Action mailed Jul. 12, 2011, in U.S. Appl. No. 12/053,090 (15 pgs).
United States Final Office Action mailed Mar. 16, 2010, in U.S. Appl. No. 11/107,709.
United States Final Office Action mailed Mar. 5, 2009, in U.S. Appl. No. 11/107,709.
United States Final Office Action mailed May 17, 2011, in U.S. Appl. No. 12/835,569 (25 pgs).
United States Final Office Action mailed Nov. 12, 2009, in U.S. Appl. No. 10/185,511 (26 pgs).
United States Final Office Action mailed Nov. 19, 2008, in U.S. Appl. No. 11/108,038.
United States Final Office Action mailed Nov. 19, 2009 in U.S. Appl. No. 11/134,719, 12 pgs.
United States Final Office Action mailed Nov. 24, 2009, in U.S. Appl. No. 10/364,115 (17 pgs).
United States Final Office Action mailed Sep. 1, 2006, in U.S. Appl. No. 10/364,627.
United States Final Office Action mailed Sep. 19, 2006, in U.S. Appl. No. 10/185,278.

(56) References Cited

OTHER PUBLICATIONS

United States Final Office Action mailed Sep. 26, 2006, in U.S. Appl. No. 10/185,527 (16 pgs).
United States Final Office Action mailed Sep. 27, 2006, in U.S. Appl. No. 10/185,511 (15 pgs).
United States Final Office Action mailed Sep. 3, 2008, in U.S. Appl. No. 10/364,115 (13 pgs).
United States Non-Final Office Action mailed Apr. 14, 2008, in U.S. Appl. No. 10/793,997.
United States Non-Final Office Action mailed Aug. 18, 2006, in U.S. Appl. No. 10/373,458.
United States Non-Final Office Action mailed Aug. 18, 2008, in U.S. Appl. No. 11/107,709.
United States Non-Final Office Action mailed Aug. 7, 2008, in U.S. Appl. No. 11/108,038.
United States Non-Final Office Action mailed Aug. 9, 2007, in U.S. Appl. No. 11/179,206 (6 pgs).
United States Non-Final Office Action mailed Dec. 21, 2010, in U.S. Appl. No. 12/835,569 (19 pgs).
United States Non-Final Office Action mailed Feb. 10, 2009, in U.S. Appl. No. 10/364,115 (13 pgs).
United States Non-Final Office Action mailed Feb. 27, 2007, in U.S. Appl. No. 10/185,278.
United States Non-Final Office Action mailed Feb. 28, 2006, in U.S. Appl. No. 10/185,278.
United States Non-Final Office Action mailed Feb. 28, 2006, in U.S. Appl. No. 10/185,527 (18 pgs).
United States Non-Final Office Action mailed Jan. 10, 2008, in U.S. Appl. No. 10/185,278.
United States Non-Final Office Action mailed Jan. 14, 2009 in U.S. Appl. No. 11/134,719, 13 pgs.
United States Non-Final Office Action mailed Jan. 28, 2008, in U.S. Appl. No. 10/185,511 (15 pgs).
United States Non-Final Office Action mailed Jan. 31, 2007, in U.S. Appl. No. 10/373,458.
United States Non-Final Office Action mailed Jan. 8, 2008, in U.S. Appl. No. 10/364,627.
United States Non-Final Office Action mailed Jul. 17, 2008, in U.S. Appl. No. 10/185,278.
United States Non-Final Office Action mailed Jul. 27, 2009, in U.S. Appl. No. 11/108,038.
United States Non-Final Office Action mailed Jun. 6, 2006, in U.S. Appl. No. 10/373,621 (14 pgs).
United States Non-Final Office Action mailed Mar. 16, 2010, in U.S. Appl. No. 11/952,093 (5 pgs).
United States Non-Final Office Action mailed Mar. 30, 2009, in U.S. Appl. No. 10/185,511 (27 pgs).
United States Non-Final Office Action mailed Mar. 6, 2007, in U.S. Appl. No. 10/185,511 (17 pgs).
United States Non-Final Office Action mailed Mar. 7, 2008, in U.S. Appl. No. 10/364,115 (9 pgs).
United States Non-Final Office Action mailed Mar. 8, 2007, in U.S. Appl. No. 10/364,115 (9 pgs).
United States Non-Final Office Action mailed Mar. 9, 2006, in U.S. Appl. No. 10/185,511 (16 pgs).
United States Non-Final Office Action mailed May 11, 2010, in U.S. Appl. No. 10/185,511 (31 pgs).
United States Non-Final Office Action mailed May 15, 2007, in U.S. Appl. No. 10/364,627.
United States Non-Final Office Action mailed May 18, 2007, in U.S. Appl. No. 10/185,527 (15 pgs).
United States Non-Final Office Action mailed May 30, 2006, in U.S. Appl. No. 10/364,627.
United States Non-Final Office Action mailed Nov. 15, 2006, in U.S. Appl. No. 10/644,359.
United States Non-Final Office Action mailed Nov. 2, 2006, in U.S. Appl. No. 10/373,621 (9 pgs).
United States Non-Final Office Action mailed Oct. 1, 2007, in U.S. Appl. No. 10/793,997.
United States Non-Final Office Action mailed Oct. 31, 2008, in U.S. Appl. No. 11/179,206 (8 pgs).
United States Non-Final Office Action mailed Sep. 1, 2010, in U.S. Appl. No. 12/053,090 (14 pgs).
United States Non-Final Office Action mailed Sep. 18, 2008, in U.S. Appl. No. 10/364,627.
United States Non-Final Office Action mailed Sep. 23, 2009, in U.S. Appl. No. 11/107,709.
United States Non-Final Office Action mailed Sep. 7, 2006, in U.S. Appl. No. 10/364,115 (10 pgs).
United States Non-Final Office Action mailed Sep. 3, 2009, in U.S. Appl. No. 11/107,010.
United States Notice of Allowance mailed Dec. 26, 2007, in U.S. Appl. No. 10/373,621 (6 pgs).
United States Notice of Allowance mailed Feb. 10, 2009, in U.S. Appl. No. 10/185,278.
United States Notice of Allowance mailed Jul. 31, 2007, in U.S. Appl. No. 10/373,458.
United States Notice of Allowance mailed Jun. 1, 2007, in U.S. Appl. No. 10/644,359.
United States Notice of Allowance mailed May 11, 2009, in U.S. Appl. No. 10/364,627.
United States Notice of Allowance mailed May 14, 2009, in U.S. Appl. No. 11/179,206 (6 pgs).
United States Notice of Allowance mailed Oct. 29, 2007, in U.S. Appl. No. 10/185,527 (13 pgs).
United States Notice of Allowance mailed Oct. 29, 2008, in U.S. Appl. No. 10/793,997.
United States Notice of Allowance mailed Sep. 24, 2010, in U.S. Appl. No. 10/185,511 (7 pgs).
United States Notice of Allowance mailed Sep. 1, 2010, in U.S. Appl. No. 11/107,709.
United States Response to Apr. 14, 2008 action, filed Jul. 15, 2008 in U.S. Appl. No. 10/793,997 (11 pgs).
United States Response to Apr. 16, 2008 office action, in U.S. Appl. No. 11/179,206, filed Oct. 15, 2008 (14 pgs).
United States Response to Apr. 18, 2007 office action, in U.S. Appl. No. 10/373,621, filed Jun. 18, 2007 (10 pgs).
United States Response to Apr. 18, 2007 office action, in U.S. Appl. No. 10/373,621, filed Sep. 17, 2007 (10 pgs).
United States Response to Aug. 18, 2006 action, filed Nov. 9, 2006 in U.S. Appl. No. 10/373,458 (19 pgs).
United States Response to Aug. 18, 2008 action, filed Nov. 18, 2008 in U.S. Appl. No. 11/107,709 (13 pgs).
United States Response to Aug. 20, 2007 office action, in U.S. Appl. No. 10/364,115, filed Oct. 22, 2007 (8 pgs).
United States Response to Aug. 21, 2007 action, filed Oct. 26, 2007 in U.S. Appl. No. 10/185,511 (15 pgs).
United States Response to Aug. 22, 2006 action, filed Nov. 19, 2008 in U.S. Appl. No. 10/185,511 (18 pgs).
United States Response to Aug. 24, 2007 action, filed Oct. 24, 2007 in U.S. Appl. No. 10/185,278 (8 pgs).
United States Response to Aug. 30, 2007 action, filed Oct. 16, 2007 in U.S. Appl. No. 10/364,627 (14 pgs).
United States Response to Aug. 7, 2008 office action, in U.S. Appl. No. 11/108,038, filed Nov. 6, 2008 (11 pgs).
United States Response to Aug. 9, 2007 office action, in U.S. Appl. No. 11/179,206, filed Jan. 9, 2008 (16 pgs).
United States Response to Dec. 21, 2010 office action, in U.S. Appl. No. 12/835,569, filed Mar. 21, 2011 (19 pgs).
United States Response to Feb. 10, 2009 office action, in U.S. Appl. No. 10/364,115, filed Jul. 7, 2009 (9 pgs).
United States Response to Feb. 27, 2007 action, filed May 25, 2007 in U.S. Appl. No. 10/185,278 (9 pgs).
United States Response to Feb. 28, 2006 action, filed May 3, 2006 in U.S. Appl. No. 10/185,278 (20 pgs).
United States Response to Feb. 4, 2010 office action, in U.S. Appl. No. 11/108,038, filed May 11, 2010 (7 pgs).
United States Response to Jan. 10, 2008 action, filed Apr. 9, 2008 in U.S. Appl. No. 10/185,278 (11 pgs).
United States Response to Jan. 28, 2008 action, filed May 28, 2008 in U.S. Appl. No. 10/185,511 (16 pgs).

(56) References Cited

OTHER PUBLICATIONS

United States Response to Jan. 31, 2007 action, filed Apr. 30, 2007 in U.S. Appl. No. 10/373,458 (19 pgs).
United States Response to Jan. 8, 2008 action, filed May 8, 2008 in U.S. Appl. No. 10/364,627 (21 pgs).
United States Response to Jul. 12, 2011 office action, in U.S. Appl. No. 12/053,090, filed Nov. 14, 2011 (25 pgs).
United States Response to Jul. 17, 2008 action, filed Nov. 14, 2008 in U.S. Appl. No. 10/185,278 (14 pgs).
United States Response to Jul. 27, 2009 office action, in U.S. Appl. No. 11/108,038, filed Nov. 13, 2009 (8 pgs).
United States Response to Jun. 6, 2006 office action, in U.S. Appl. No. 10/373,621, filed Aug. 11, 2006 (16 pgs).
United States Response to Mar. 16, 2009 action, filed Jun. 7, 2010 in U.S. Appl. No. 11/107,709 (13 pgs).
United States Response to Mar. 30, 2009 action, filed Jun. 30, 2009 in U.S. Appl. No. 10/185,511 (18 pgs).
United States Response to Mar. 5, 2009 action, filed Jun. 5, 2009 in U.S. Appl. No. 11/107,709 (13 pgs).
United States Response to Mar. 6, 2007 action, filed Jun. 5, 2007 in U.S. Appl. No. 10/185,511 (14 pgs).
United States Response to Mar. 7, 2008 office action, in U.S. Appl. No. 10/364,115, filed Jun. 9, 2008 (8 pgs).
United States Response to Mar. 8, 2007 office action, in U.S. Appl. No. 10/364,115, filed Jun. 8, 2007 (8 pgs).
United States Response to Mar. 9, 2006 action, filed Jun. 7, 2006 in U.S. Appl. No. 10/185,511 (20 pgs).
United States Response to May 11, 2010 action, filed Jul. 2, 2010 in U.S. Appl. No. 10/185,511 (22 pgs).
United States Response to May 15, 2007 action, filed Aug. 15, 2007 in U.S. Appl. No. 10/364,627 (14 pgs).
United States Response to May 17, 2011 office action, in U.S. Appl. No. 12/835,569, filed Sep. 19, 2011 (18 pgs).
United States Response to May 30, 2006 action, filed Aug. 11, 2006 in U.S. Appl. No. 10/364,627 (22 pgs).
United States Response to Nov. 12, 2009 action, filed Mar. 12, 2010 in U.S. Appl. No. 10/185,511 (19 pgs).
United States Response to Nov. 15, 2006 action, filed Feb. 15, 2007 in U.S. Appl. No. 10/644,359 (10 pgs).
United States Response to Nov. 19, 2008 office action, in U.S. Appl. No. 11/108,038, filed Jan. 23, 2009 (10 pgs).
United States Response to Nov. 19, 2008 office action, in U.S. Appl. No. 11/108,038, filed May 12, 2009 (6 pgs).
United States Response to Nov. 2, 2006 office action, in U.S. Appl. No. 10/373,621, filed Feb. 2, 2007 (9 pgs).
United States Response to Oct. 1, 2007 action, filed Dec. 28, 2007 in U.S. Appl. No. 10/793,997 (8 pgs).
United States Response to Oct. 31, 2008 office action, in U.S. Appl. No. 11/179,206, filed Mar. 31, 2009 (16 pgs).
United States Response to Office Action dated Feb. 28, 2006, filed May 10, 2006 in U.S. Appl. No. 10/185,527 (20 pgs).
United States Response to Office Action dated Jan. 14, 2009, filed Jul. 14, 2009 in U.S. Appl. No. 11/134,719, 11 pgs.
United States Response to Office Action dated May 18, 2007, filed Aug. 20, 2007 in U.S. Appl. No. 10/185,527 (13 pgs).
United States Response to Office Action dated Nov. 19, 2009, filed Jan. 19, 2010 in U.S. Appl. No. 11/134,719, 11 pgs.
United States Response to Office Action dated Sep. 26, 2006, filed Feb. 22, 2007 in U.S. Appl. No. 10/185,527 (24 pgs).
United States Response to Office Action dated Sep. 26, 2006, filed Nov. 14, 2006 in U.S. Appl. No. 10/185,527 (11 pgs).
United States Response to Sep. 1, 2006 action, filed Feb. 28, 2007 in U.S. Appl. No. 10/364,627 (17 pgs).
United States Response to Sep. 1, 2006 action, filed Oct. 27, 2006 in U.S. Appl. No. 10/364,627 (10 pgs).
United States Response to Sep. 1, 2010 office action, in U.S. Appl. No. 12/053,090, filed Dec. 1, 2010 (20 pgs).
United States Response to Sep. 18, 2008 action, filed Mar. 18, 2009 in U.S. Appl. No. 10/364,627 (21 pgs).
United States Response to Sep. 19, 2006 action, filed Jan. 19, 2007 in U.S. Appl. No. 10/185,278 (8 pgs).
United States Response to Sep. 19, 2006 action, filed Nov. 10, 2006 in U.S. Appl. No. 10/185,278 (16 pgs).
United States Response to Sep. 23, 2009 action, filed Dec. 21, 2009 in U.S. Appl. No. 11/107,709 (12 pgs).
United States Response to Sep. 27, 2006 action, filed Jan. 19, 2007 in U.S. Appl. No. 10/185,511 (16 pgs).
United States Response to Sep. 27, 2006 action, filed Nov. 8, 2006 in U.S. Appl. No. 10/185,511 (15 pgs).
United States Response to Sep. 27, 2006 office action, in U.S. Appl. No. 10/364,115, filed Dec. 27, 2006 (4 pgs).
United States Response to Sep. 3, 2008 office action, in U.S. Appl. No. 10/364,115, filed Nov. 3, 2008 (9 pgs).
United States Supplemental Notice of Allowance mailed Oct. 16, 2007, in U.S. Appl. No. 10/373,458.
Valimaki, M. et al., "Digital rights management on open and semi-open networks", WIAPP, 2001, 154-155. cited by other.
Yu, H. "Digital multimedia at home and content rights management", IEEE Proceedings 2002 IEEE 4.sup.th International Workshop on Networked Appliances, 2002, 49-56. cited by other.
Canadian Application 2505295, Office Action mailed Nov. 19, 2013, 4 pages.
India Application 914/DEL/2005, First Examination Report mailed Nov. 26, 2013, 2 pages.
U.S. Appl. No. 10/971,346, Final Office Action mailed Nov. 7, 2013, 22 pages.
U.S. Appl. No. 11/353,321, Final Office Action mailed Dec. 5, 2013, 15 pages.
U.S. Appl. No. 12/053,090, Notice of Allowance mailed Nov. 18, 2013, 9 pages.
U.S. Appl. No. 12/832,831, Notice of Allowance mailed Dec. 6, 2013, 9 pages.
U.S. Appl. No. 13/367,198, Final Office Action mailed Oct. 25, 2013, 15 pages.
U.S. Appl. No. 11/866,041, Notice of Allowance mailed Jan. 10, 2014, 8 pages.
U.S. Appl. No. 11/866,041, Amendment, filed Feb. 21, 2014, 3 pages.
U.S. Appl. No. 12/835,569, Notice of Allowance mailed Feb. 6, 2014, 17 pages.
U.S. Appl. No. 11/108,038, Notice of Allowance mailed Jan. 6, 2014, 19 pages.
U.S. Appl. No. 12/053,090, Amendment, filed Dec. 31, 2013, 4 pages.
U.S. Appl. No. 12/832,831, Amendment, filed Dec. 31, 2013, 4 pages.
U.S. Appl. No. 13/367,198, Letter Restarting Period for Response mailed Feb. 10, 2014, 18 pages.
Canadian Application 2457291, Notice of Allowance mailed Jan. 31, 2014, 2 pages.
European Application 03013556.0, Decision to Refuse a European Patent Application mailed Feb. 10, 2014, 6 pages.
India Application 167/MUM/2004, Hearing Notice mailed Jan. 6, 2014, 1 page.

* cited by examiner

| ELEMENT 703 | DESCRIPTION |
|---|---|
| MinimumDigitalCompressedVideoOutputProtectionLevel 711 | The minimum required level of content protection for digital compressed video outputs. 701<br>By default this value is set to 100. 701 |
| MinimumDigitalUncompressedVideoOutputProtectionLevel 713 | The minimum required level of content protection for digital uncompressed video outputs.<br>By default this value is set to 100. 701 |
| MinimumAnalogVideoOutputProtectionLevel 715 | The minimum required level of content protection for high definition analog video outputs.<br>By default this value is set to 100. |
| MinimumDigitalCompressedAudioOutputProtectionLevel 707 | The minimum required level of content protection required for digital audio outputs. 701<br>By default this value is set to 100. |
| MinimumDigitialUncompressedAudioOutputProtectionLevel 709 | The minimum required level of content protection required for digital audio outputs. 701<br>By default this value is set to 100. |
| ExtendedAnalogVideoProtectionList[].type | Set of extended analog output protection schemes that the content creator has explicitly required for the content. Extended analog protection systems take precedence over the MinimumAnalogVideoOutputProtectionLevel setting. 701<br>By default this list is empty. 701 |
| ExtendedAnalogVideoProtectionList[].configuration | Output protection system specific configuration data.<br>By default this list is empty. 701 |
| ReservedList[] | Reserved for future use. May include a list of GUIDs. |

| ELEMENT | DESCRIPTION |
|---|---|
| CopyCount  801 | Number of copies or copy generations permitted.  Valid values include: 0 – 249: # of copies that can be made from the PC 250-255: Reserved for future use. |
| MinimumCopyProtectionLevel  803 | The minimum level of security that is required for a destination copy protection technology.  By default this value is set to 300. |
| ExclusionList[]  805 | List of specifically DIS-ALLOWED copy / conversion methods.  All exclusions must be declared explicitly.  Each type will be defined with an associated GUID. See table below. |
| InclusionList[]  807 | List of specifically ALLOWED copy / conversion methods.  All inclusions must be declared explicitly.  Each type will be defined with an associated GUID. GUIDs will be allocated through a separate process not covered in this spec. |

FIG. 8

OUTPUT PROTECTION LEVELS

DESCRIPTION OF THE DRAWINGS

The present description will be better understood from the following detailed description read in light of the accompanying drawings, wherein:

FIG. 7 is a table of exemplary playback policies including a minimum OPL setting for each output type represented in the table.

FIG. 8 is a table of exemplary copy policies including a minimum OPL setting for each type of copying operation represented in the table.

Like reference numerals are used to designate like parts in the accompanying drawings.

DETAILED DESCRIPTION

Figure 1:
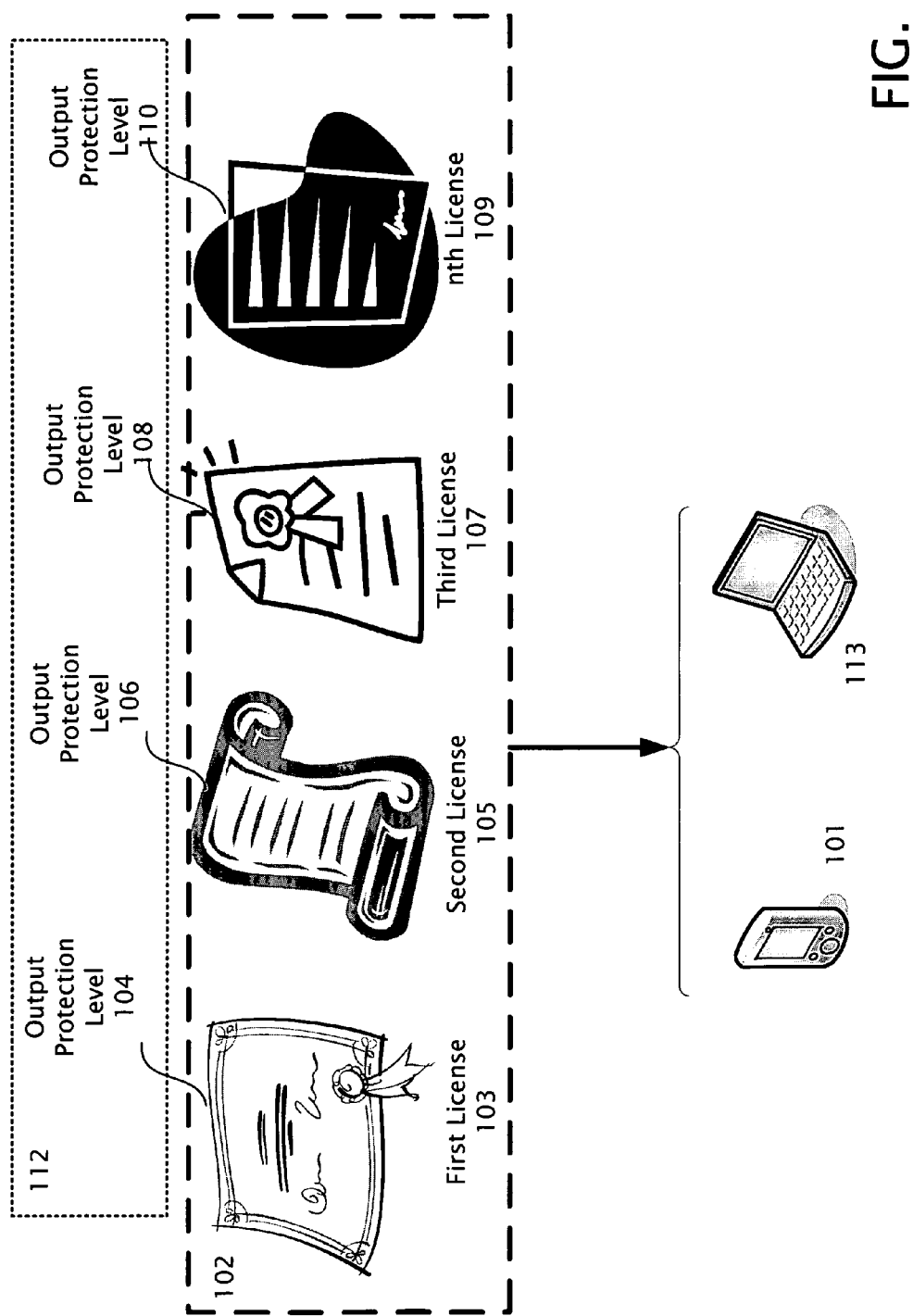
FIG. 1 illustrates a plurality of licenses specifying output protection levels that may be stored on a CE device, including PCs.

The detailed description provided below in connection with the appended drawings is intended as a description of the present examples of the invention and is not intended to represent the only forms in which the present invention may be constructed or utilized. The description sets forth the functions of the invention and the sequence of steps for constructing and operating the invention in connection with the examples illustrated. However, the same or equivalent functions and sequences may be accomplished by different examples of the invention.

Output protection levels ("OPLs") may provide a system by which media content owners can control which output paths their content are allowed to travel to. By setting a permissible OPL in a license, media content may be played over an output path that has a matching, or more secure, OPL. Media content ("content") typically refers to textual, audio, or visual information that may be processed by digital equipment. For example a song is an example of content that may be delivered to a consumer electronic device ("CE device") or PC. The song content is typically protected from being misappropriated by various security measures, processes and or systems. However, once the song is delivered to the CE device or PC it may typically be played over an output path, for example speakers, in any way the user of the consumer electronics device (including PCs) desires.

Playback from the consumer electronics device ("CE device") typically takes place over an output path provided by some sort of device such as CE devices, PCs or the like. Output paths can range from a signal transmitted over a pair of speaker wires, to complex digital signals transmitted over multi-wire cables, and the like. An example of an output path may be a connection to a sound card on a PC. In the sound card example there is typically not an external device wired to the PC, but the path to the sound card may still be considered an output path.

The output path from the consumer electronics device may render the media being played susceptible to unauthorized copying, or distribution. Thus, after protecting the transmittal and delivery of content to a CE device, protection from unauthorized copying may be defeated at the device. Some output paths may be more secure than others. Thus, a media owner may find it desirable to limit play back of their songs to output paths that may provide a given degree of protection against unauthorized access. Output protection levels may provide a level of control over output paths upon which media files are played. Output protection levels may be implemented in a digital rights management ("DRM") system, or in an application program that may be running on a CE device, PC or the like.

In alternative examples described below future extensibility of output protection levels may be provided in a backward compatible fashion so that as new playback technologies are developed, they are accommodated on a system implementing output protection levels. The output protection level ("OPL") mechanism may be applied to various output functions (e.g.—play, copy, etc.). For each output function a set of discrete output types, or protection levels, may be defined.

Although the present invention is described and illustrated herein as being implemented in a consumer electronics ("CE") device system, the system described is provided as an example and not a limitation. CE devices may include pocket PCs, set top boxes, portable media centers, cell phones, music players, PCs, software constructed media players, high fidelity components, and the like. In fact PCs are a common device that may be provided with software to function as a CE device. In addition PCs may be equipped with software applications that can also operate in conjunction with output protection levels. In addition such PCs may be used as docking stations for a user to store content on, and then download some or all of it to another CE device, such as an MP3 player. These CE devices are typically configured to operate in a system that includes the internet, PCs and the like to work in conjunction with the CE device to facilitate license and media content transfer.

A system of rights management is typically provided in a CE device system. As those skilled in the art will appreciate, the present invention is suitable for application in a variety of different types of systems that operate under a license. A typical licensing system is a digital rights management ("DRM") system. The use of output protection levels ("OPLs") may be useful in the management of licensed content for these types of systems.

Licenses typically regulate the use of content. Most current DRM solutions rely on unique identification of user devices, such as CE devices. In such systems each license is typically bound to a unique consumer electronics device (or playback device), so the license stored in one CE device typically can not be transferred or used by another device. The license may be provided with information to specify a desired level of output protection for the particular media being controlled by that license. The licenses are typically stored separately from the content, typically in a dedicated storage area. Those skilled in the art will recognize that OPLs may also function association with copy ("CP") and link protection ("LP") systems that typically do not use licenses, as previously described. Such CP and LP systems may use copy control information that may be protected by a session key. However the session key is typically not bound to the CE device or PC cryptographically.

Licenses may include numerous functions, other than simply giving permission to use an associated file. For example information may be provided in the license to control how the file is played by setting the OPL. OPLs may be used to secure the file provider's content against unauthorized use or copying. OPLs may also be used to tier a given work being licensed. The fee charged for the license may be based upon playing a media file over the output a user desires. High quality playback may be provided at a higher licensing fee. The OPL may be provided in conjunction with other license features as well.

Content may be anything that a provider desires to protect such as music, video, multimedia, pictures and the like. Content is typically regulated to prevent its unauthorized use by providing licenses. Content may be audio, video, textual, encrypted, unencrypted, compressed, uncompressed or otherwise manipulated. In a DRM system the content, (or equivalently media, media files, files, or the like) to be played, can typically be freely transferred. Transfer of encrypted content is typically over unsecured channels such as the internet. In a DRM system the playback of the content is controlled, or allowed, by a license that may be typically stored on a specific CE device. Those skilled in the art will realize that the term "play" as used herein may also be construed to mean consumed, or other equivalent terms that indicate that there are limits placed upon accessing the media file governed by the license.

FIG. 1 illustrates a plurality of licenses specifying output protection levels that may be stored on a CE device, including PCs. The figure illustrates a plurality of licenses 102 including a plurality of assigned output protection levels ("OPLs") 112, that typically includes individually assigned OPLs 104, 106, 108, 110 that may be associated with each license 103, 105, 107, 109 of the plurality of licenses 102. Each license 103, 105, 107,109 may include an assigned output protection level 102, 104, 106, 108 respectively. In a typical implementation not all of the licenses need to be supplied with output protection levels. And, any supplied output protection levels need not be the same. A license typically accompanies a media file (not shown) that has been downloaded to the CE device 101, or to a PC 113. In the past licenses have been typically downloaded with the content, and not separately, although they may be downloaded together. The number of licenses on the CE device 101 can be extremely large, such that a user typically can not keep track of the individual conditions applied to each media file by its associated license. A PC will typically contain even more licenses. Occasionally, more than one license will be associated with a media file.

OPLs specified in the licenses tend to allow licenses to specify acceptable output configurations on the PC or CE device. If the output path corresponds to the OPL provided in the license, the content is typically allowed to be played.

A users experience may be improved if licenses specifying output protection levels can be managed easily so that the specification of acceptable outputs for playback does not tend to interfere with use of the CE device. Output protection levels may contribute to a DRM system that is invisible to the user. Licenses and the output protection levels associated with them may be managed by an application program, or by a system of digital rights management.

Figure 2:
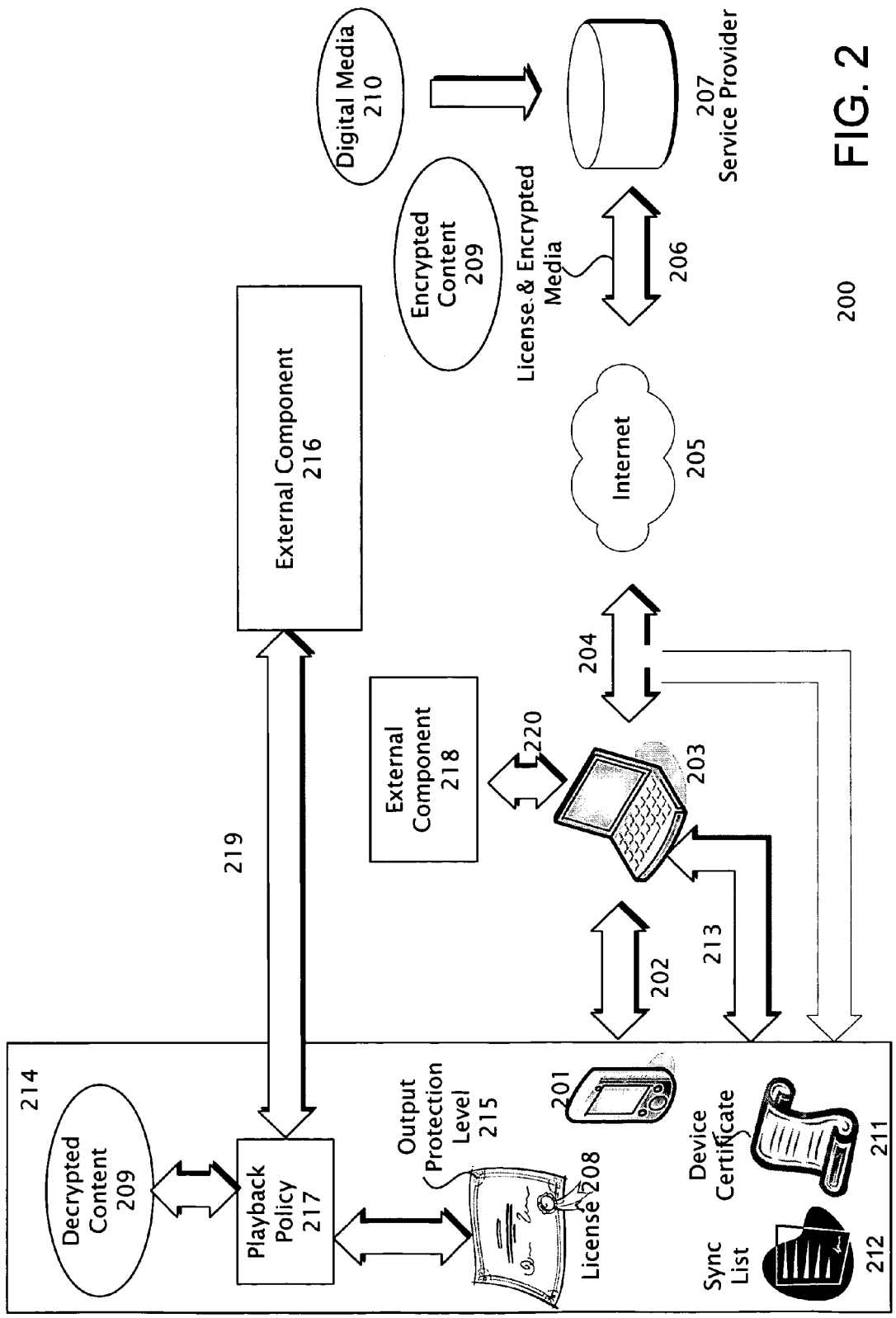
FIG. 2 is a diagram of an example of a digital rights management system including output protection levels.

FIG. 2 is a diagram of an example of a digital rights management system 200 including output protection levels 215. The system 200 typically includes the components shown and various processes that operate in cooperation with the components. Digital rights management (DRM) may provide a system that typically allows defining, incorporating, and enforcing rights to digital media 210. The rights that may be enforced by DRM having OPLs may include the specification of output protection levels 215 to govern output paths 219, 220 that allow playback over external components 216, 218.

DRM system 200 typically provides secure distribution of multimedia content 210 from a service provider 207 coupled 206 to an insecure channel, such as the Internet 205. Content for viewing or playback would typically include music files, picture files, video files, documents, and other protected content; in short anything that a service provider wishes to transmit securely over an unsecured channel. Digital media file 210 is typically encrypted by service provider 207 prior to transmission, and is typically decrypted into an unencrypted media file 209 at its destination.

A personal computer 203 may be used to couple 204 to the internet 205 and transfer content and licenses from the service provider 207 to a consumer electronics device 201 via the path 202 shown. The personal computer and the CE devices may operate utilizing any number of suitable operating systems known to those skilled in the art. The instructions for implementing the functions described in this application may exist as software, hardware (for example instructions burned into an ASIC), or a combination of both. The PC may have a large number of licenses and media files stored on it. The licenses can have output protection levels, unlimited rights, rights to play the file a certain number of times, rights to play the file until a certain date, and the like. Protocols for transferring information to the PC 203, and to the CE device 201 over paths 202 and 204 may be achieved by conventional connections such as Ethernet, USB, infrared, Bluetooth, MTP and the like. These pathways may be useful for transmitting licenses and content, including licenses that have incorporated output protection levels.

In alternative embodiments a consumer electronics device 201 may be coupled 204 to a service provider 207 without using the personal computer 203 as an intermediary. In this example the CE device 201 operates to download media and licenses directly from the internet.

A DRM capable device, such as a CE device 201 or a PC 203 typically includes a number of DRM components. The components 214 are typical of DRM components. A similar set of components may be associated with the PC 203, but are omitted to simplify the figure. Typical DRM components may include one or more licenses 202, having output protection levels 215. The license is read by a conventionally constructed policy engine 217 to determine if a decrypted content file 209 may be played by the component 216 coupled to the CE device 201 via output path 220. A similar output path 219, and external component 218 are supplied for the PC 203. Also shown as part of a typical DRM system is a device certificate 211 that may uniquely identify the CE device 201 to the DRM system 200. Also shown is a synchronization list 212 that may be used to update soon to expire licenses having OPLs.

In a typical application, DRM system 200 protects contents 210 by providing encrypted data files 209. Since files 209 are encrypted, the data itself is protected. Thus, the files 209 may be moved, archived, copied, or distributed without restriction. There is no need to hide files or make them inaccessible, or to put special protection in place when files are transmitted from system to system. However, copying a file and giving it to a friend will not enable that friend to use the file. In order to be able to use an encrypted file, users must obtain a license 208. The addition of OPLs 215 to the license 208 may also allow the protection of the content 210 after it has been decrypted at the CE device. This license 208, that typically includes OPLs, is a way of exercising control over the encrypted file 210 and the unencrypted version 209 of the file. A license 208 is typically granted to a single machine 201, and even if copied, it will not tend to function on other machines.

DRM protected content can be highly valued, and thus the owners of that content have incentive to specify specific paths for the content as it is rendered into an unprotected form, such as during play on an external component 216. For example in a system incorporating OPLs, owners may allow the content to be rendered to a protected output source such as high bandwidth digital content protection ("DTCP"), but not to unprotected outputs such as IEC-60958 (also referred to as "SP/DIF"). Outputs such as SP/DIF would typically allow a very high quality copy of the content to be recorded.

Specific listings of permissible outputs may be specified in a license 208 by listing the actual outputs. However, as new output technologies are invented, licenses that were issued prior to the development of the new output technology would not allow their associated content to flow to them. This can be unacceptable as it may provide a bad user experience, and can increase the demand on content owners to re-issue licenses as new technologies are developed. By utilizing an intermediary of assigning a protection level 215 to the license 208, a bad user experience may be avoided and new technologies may be efficiently accommodated in a license management system.

Output Protection Levels (OPLs) operating in a DRM system 200 (or an application program) typically allow content owners to specify a set of one or more allowable outputs for the particular content being reproduced. Allowable outputs may refer to an external component 218, 216, a signal type being output to the external components 218, 216, or an external component operating to accept a particular signal type. In particular the OPLs 215 included in the license set conditions for playback to certain devices 216 coupled to the CE device 201 (or alternatively to devices 218 coupled to the PC 203). For example, a music file license may contain a "right to play" but not a "right to burn to CD", and it might enable these rights for the period between Oct. 1, 2005 and Nov. 1, 2005. It is also possible that there will be multiple licenses for a file. As long as one of those licenses grants the needed right, the user will be able to access and use their data. Access may refer to cryptographically decoding a file, gaining access to a file by pass word, and the like so that the consumer electronics device can use, view, play and otherwise use the content of the file.

The OPL 215 is typically read from the license 208 utilizing conventional methods known to those skilled in the art. Within the DRM system the output protection level is checked against the type of external component 216 present to determine if decrypted content 209 may be passed to the external component 216. Decrypted content 209 is typically the resulting media file that the DRM system has decrypted for playback from the encrypted content file 209. PC 203 is similarly equipped with the DRM capabilities of the previously described CE device 201 that is coupled to an external component 218 that may be similar in characteristics to external component 216. Checking may be accomplished constructing by conventional techniques, a playback policy 217 to operate within the DRM system.

Such a DRM system 200 incorporating OPLs can enforce usage rules and protect the multimedia content 210 from being used illegally, or in unintended ways. Usage rules can include output protection levels 215, expiration dates, the number of times a user can play an audio or video file, and the number of times a user can copy an audio or video file and the like. An example of a Digital Rights Management system that may be capable of utilizing OPLs is described in U.S. patent application Ser. No. 09/290,363, filed Apr. 12, 1999, U.S. patent applications Ser. Nos. 10/185,527, 10/185,278, and 10/185,511, each filed on Jun. 28, 2002 which are hereby incorporated by reference in its entirety.

Figure 3:
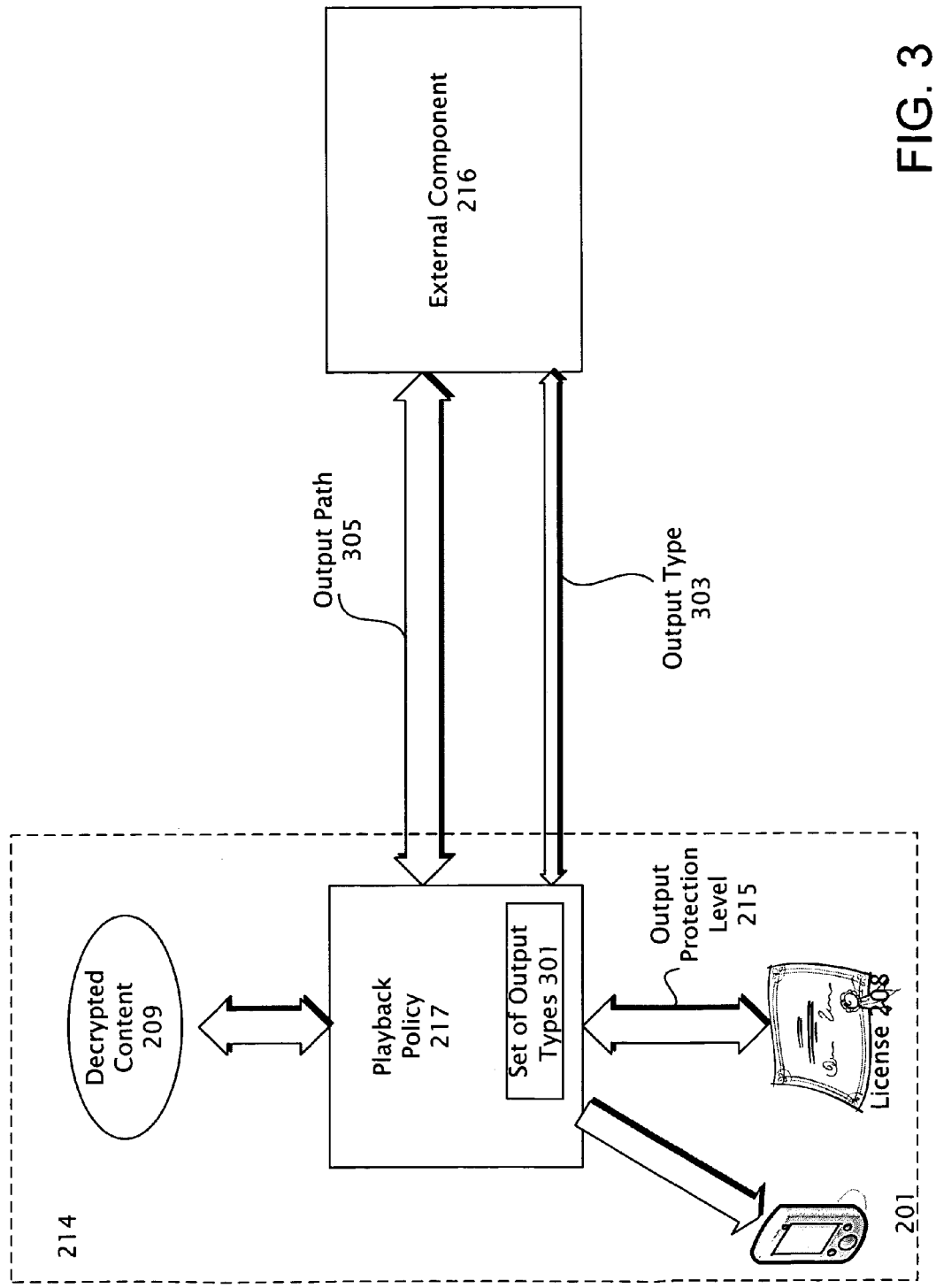
FIG. 3 is a block diagram showing the implementation of playback policy utilizing output protection levels.

FIG. 3 is a block diagram showing the implementation of playback policy 217 utilizing output protection levels 215. The DRM components 214 are shown residing on a CE device 201. The policy engine 217 including a set of output types 301 typically resides on the CE device 201. Decrypted content 209 and license 208 including the specified OPL 215 are coupled to the playback policy 217. The external component 216 is coupled to the policy engine 217 through an output path 305, and by a path supplying the output type 303. In alternative examples the output type may be communicated via the output path 305. The DRM system including output protection levels typically defines a set of discrete output types ("OTs") 301 that may be categorized to fall under a system of OPLs. Playback policy 217 determines, utilizing conventional methods, if the output type 303 of the external component 216 falls under an output protection level 215, that will allow the decrypted content 209 to be played on the external component 216. If play back is permissible according to the conditions supplied by the license with the OPL then the decrypted content 209 is passed to the external component over the output path 305, provided. If the Output path falls outside of the desired security, then the decrypted content 209 is not allowed to pass to the external component 216.

An output type 303 may be provided to the CE device 201, by the external component 216. Output types may be specified by a numerical level or other suitable identifier. A content provider may specify an acceptable output type via a numerical OPL, and the DRM system would typically allow play on an output having been identified to the CE device as having an OPL corresponding to the OT. The sets of discrete output types may categorize whether the content is analog or digital, compressed or decompressed, audio or video and the like.

For each output type ("OT"), the content owner can set a "minimum bar" required for a configuration, or system implementation, to meet in order for the content to be played on the particular system or configuration. For example, a content owner could specify "level 300" for Digital Uncompressed Video. That level requires that the application output the content in that format when high-bandwidth digital content protection ("HDCP") is available on the output. If the application cannot specify HDCP on the output, it is not allowed to render the content.

One typical feature of OPLs is that as new output protection technologies come into existence, they can be fitted appropriately into the OPLs, and existing licenses can take advantage of the new technology. For example, using the scenario above, suppose a new technology, FOO is invented to protect Digital Uncompressed Video. If it is comparable to HDCP in security and functionality, it may be placed into the "level 300" bucket, and any licenses which have Digital Uncompressed Video set to 300 can then be rendered using the output protection FOO.

Figure 4:
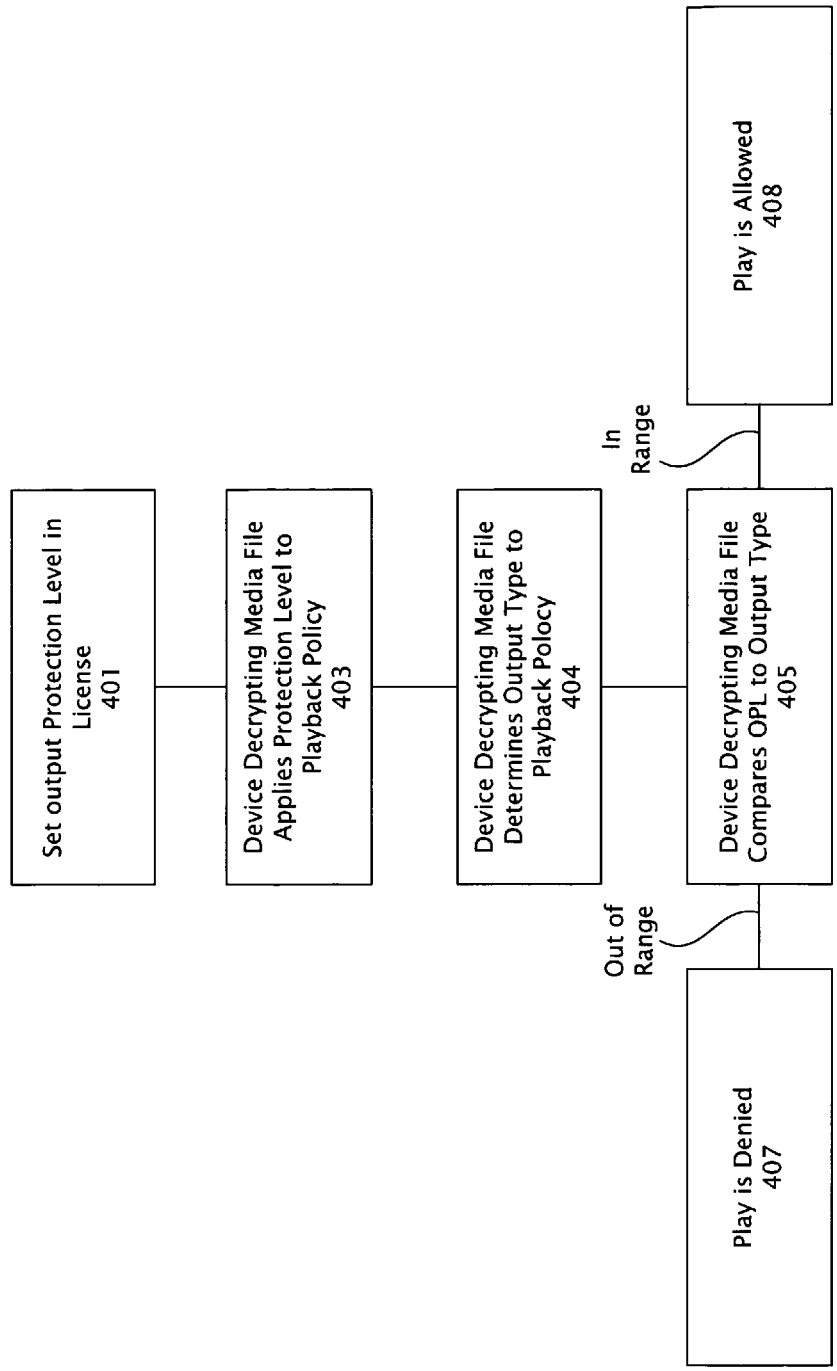
FIG. 4 is a flow diagram showing the use of output protection levels.

FIG. 4 is a flow diagram showing the use of output protection levels. At block 401 an OPL is set in a license. At block 403 the CE device, or PC, processing the media file corresponding to the license determines the playback policy for the content. At block 404 The CE device or PC determines the output type of the output device, and determines its OPL. At block 405 The OPL of the license is compared to the OPL of the output device. If the OPL of the output device is out of the acceptable range specified by the license, play is denied at block 407. Returning to block 405, if the OPL of the output device is in the acceptable range specified by the license, play is allowed at block 408.

Content inputted to a system may have a variety of forms and also a variety of output configurations that may be specified for playback. Typically the outputs for playing back media have been controlled by the content provider through hardware specifications, providing that a given playback standard will be supported by a particular hardware configuration. When providing a PC with media playback capabilities, OEMs may provide any number of outputs on the PC that may be connected to a variety of peripherals in playback. For example a PC may supply an input to a stereo receiver, much as a CD player, tape deck or the like would. A permissive licensing system would allow media content to flow to a wide variety of outputs, and some content providers may be reluctant to supply content to these systems. At the other extreme a very restrictive system may not allow many types of content to play, causing a bad user experience when downloaded content may not be played. A more flexible system may be provided with OPLs specified in a system that allow a variety of content to be played so that license holder's needs may be satisfied, as well as those of a user.

A system having explicit lists of permissions for a particular media file may tend to be cumbersome. For example such a system might provide a list of songs in an application such as a media player where some would be silent and others would play tending to cause confusion to a user. OPLs tend to group media into categories that will work on a given system configuration, without mixing in the media files that would not play into the list. By defining a set of levels corresponding to security levels as is done in a system supplying output protection levels system operation may be improved. In addition, outputs may be analog, digital, encrypted, unencrypted, compressed or uncompressed that each may have a set of gradations in playback assigned to them. Contractual or digitally represented rules for content playback may be mapped using OPLs to a given set of outputs using a set of rules. Such a system of OPLs may also tend to make diagnosis of why content will not play easier to determine. For example a utility program may be provided that communicates the reasons for denying playback, even possibly indicating what hardware might be required to allow playback.

In an alternative embodiment of a system having OPLs a media file having higher protection levels than available in the system may allow for a degraded, or down-sampled, version of the media file to be played.

Typically in an OPL playback scheme content is first sorted into audio content or video content. Each category can include analog and digital. Digital may further be divided into two categories of compressed digital and uncompressed digital. Thus content may be sorted into a number of categories or silos. Within each of these silos output protection levels are assigned. In an example of OPLs numeric levels or their equivalents are assigned to protection levels that may be later divided to create new protection levels as the need may arise. OPLs for copying in an example may be simply unsorted, so that a common set of OPLS is specified for copying media. Typically copy levels correspond to a playback level in an exemplary system, even though the actual protection scheme used in the copy differs from that of the original media file.

Figure 5:
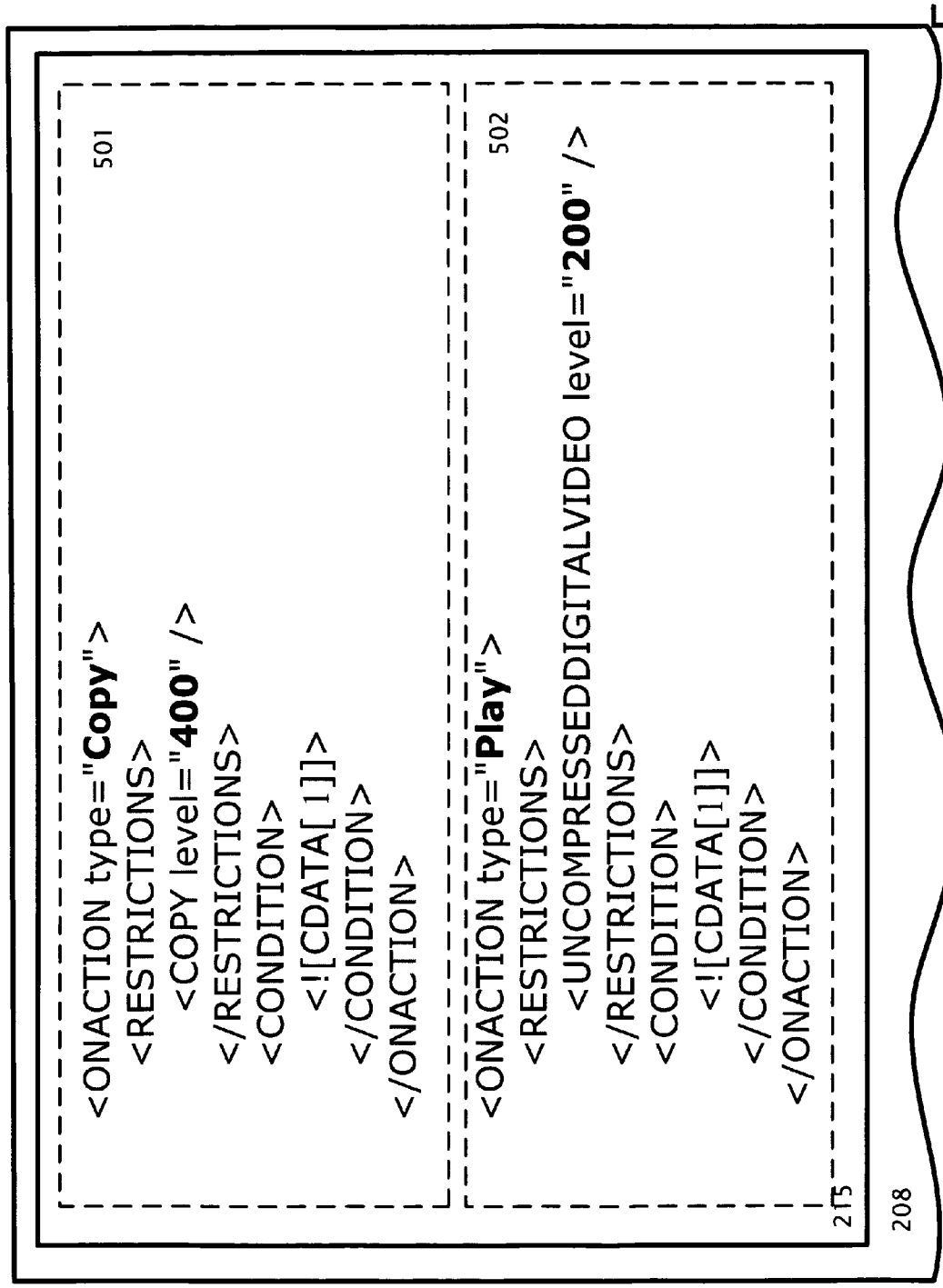
FIG. 5 depicts a section of a license specifying output protection levels.

FIG. 5 depicts a section of a license 208 specifying output protection levels 215. OPLs may be specified in XML format, binary format or the like. As shown there are two areas 501, 502 in the OPL section 215 of the license 208, one that specifies playback protection levels 502, and another that specifies copy protection levels 501. Alternative examples may include a section specifying down-sampling for playback, and an inclusion/exclusion section for allowing copying or playback at a given level, but excluding or allowing a particular technology that would typically be available/not available at that level. Typically upgrades in a license such as the one illustrated are obtained by securing a new license. New licenses may be obtained when a user has an existing license to play media, and then later decides to obtain a license that allows copies to be made. Such a system of license updates may be updated utilizing a system of license synchronization as described in U.S. patent application Ser. No. 10/971,346, filed Oct. 22, 2004 which is hereby incorporated by reference in its entirety. Those skilled in the art will understand that other equivalent methods may be used to update licenses, and that the method described here is but one example that may be used in conjunction with some implementations of OPLs.

For Macrovision™ outputs two bits are typically provided to prevent unauthorized copying. Macrovision™ provisions may be added to a section of the license as well.

To maintain forward compatibility as new playback technologies are developed the list of hardware that is compatible with a PC may be updated. For example if a new playback technology is developed, a PC interface card to couple to the new playback technology would provide a signal to the PC that allows the new playback technology to be assigned to a predetermined level in the PC. A license does not point to a given technology with OPLs, instead the license points to a level, or moniker, that represents a collection of objects that may change over time. Content can be played at a higher security level than specified in the license with OPLs. In a scheme that simply assigns a license to a group based on security levels, content would typically not be able to be played on systems having higher security levels, but are not a member of the group. Thus higher security systems, may be utilized to play lower security content, by chaining groups as is done with OPLs. In an exemplary system a service provider is not allowed to provide a license to a PC that does not understand levels. Such a backstop mechanism might allow a more restrictive license to be issued to the PC that does not understand OPLs. Typically the DRM system is configured to understand levels, and the application program playing the media would both need to understand OPLs and communicate this to the server so that media files may be downloaded. In further alternative embodiments media files may be downloaded if the DRM system present understands OPLs, but may not be played on applications that do not understand OPLs. In the present examples application programs enforce the rules for utilizing OPLs, under DRM guided compliance rules. In further embodiments either infrastructure or applications may enforce the rules.

Figure 6:
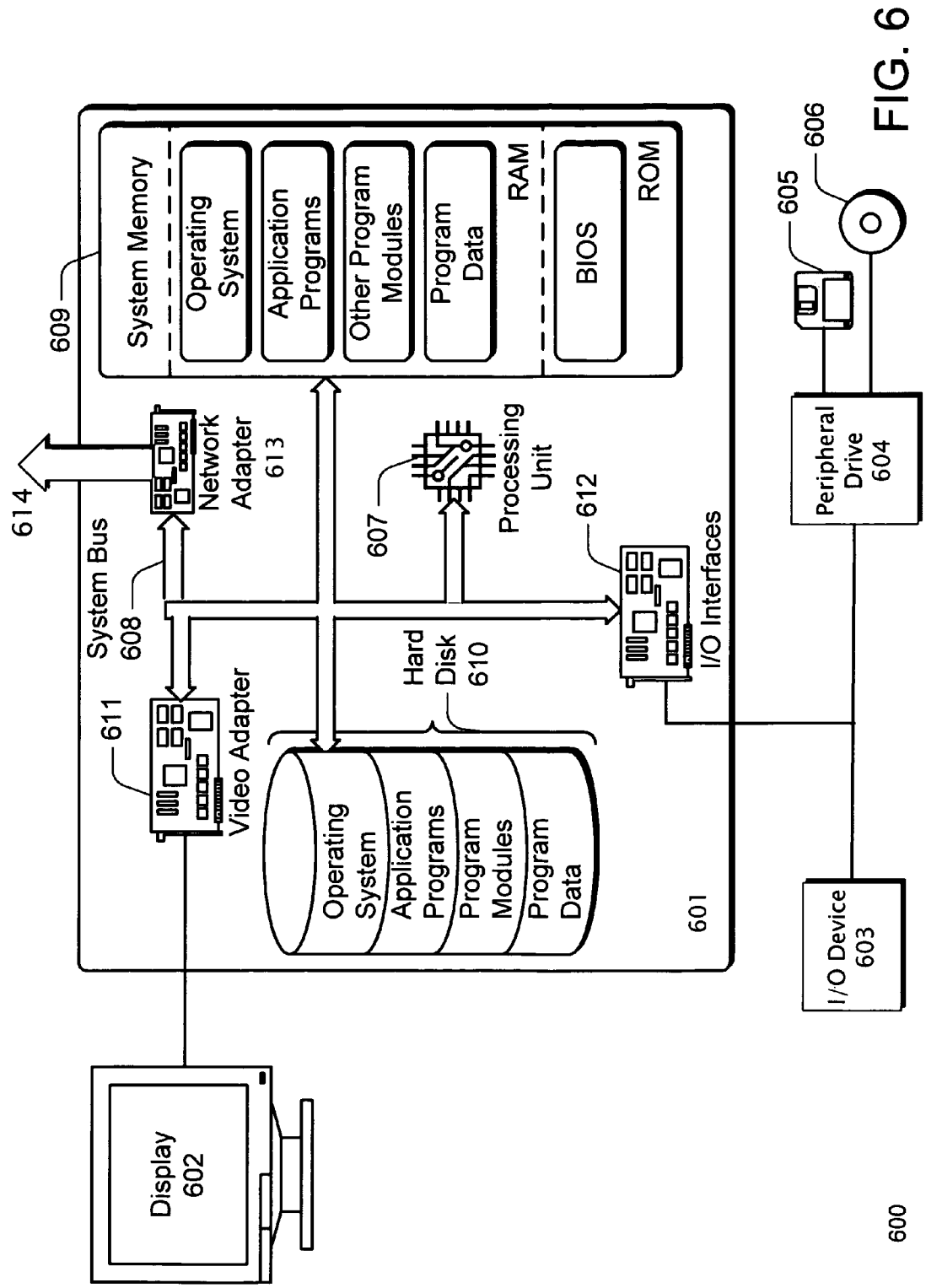
FIG. 6 illustrates an exemplary computing environment in which the OPLs described in this application, may be implemented.

FIG. 6 illustrates an exemplary computing environment 600 in which the OPLs described in this application, may be implemented. Exemplary computing environment 600 is only one example of a computing system and is not intended to limit the examples described in this application to this particular computing environment.

The computing environment 600 can be implemented with numerous other general purpose or special purpose computing system configurations. Examples of well known computing systems, may include, but are not limited to, personal computers, hand-held or laptop devices, microprocessor-based systems, multiprocessor systems, set top boxes, programmable consumer electronics, gaming consoles, Consumer electronics, cellular telephones, PDAs, and the like.

The computer 600 includes a general-purpose computing system in the form of a computing device 601. The components of computing device 601 can include one or more processors (including CPUs, GPUs, microprocessors and the like) 607, a system memory 609, and a system bus 608 that couples the various system components. Processor 607 processes various computer executable instructions to control the operation of computing device 601 and to communicate with other electronic and computing devices (not shown). The system bus 608 represents any number of several types of bus structures, including a memory bus or memory controller, a peripheral bus, an accelerated graphics port, and a processor or local bus using any of a variety of bus architectures.

The system memory 609 includes computer-readable media in the form of volatile memory, such as random access memory (RAM), and/or non-volatile memory, such as read only memory (ROM). A basic input/output system (BIOS) is stored in ROM. RAM typically contains data and/or program modules that are immediately accessible to and/or presently operated on by one or more of the processors 607.

Mass storage devices 604 may be coupled to the computing device 601 or incorporated into the computing device by coupling to the buss. Such mass storage devices 604 may include a magnetic disk drive which reads from and writes to a removable, non volatile magnetic disk (e.g., a "floppy disk") 605, or an optical disk drive that reads from and/or writes to a removable, non-volatile optical disk such as a CD ROM or the like 606. Computer readable media 605, 606 typically embody computer readable instructions, data structures, program modules and the like supplied on floppy disks, CDs, portable memory sticks and the like.

Any number of program modules can be stored on the hard disk 610, Mass storage device 604, ROM and/or RAM 609, including by way of example, an operating system, one or more application programs, other program modules, and program data. Each of such operating system, application programs, other program modules and program data (or some combination thereof) may include an embodiment of the systems and methods described herein.

A display device 602 can be connected to the system bus 608 via an interface, such as a video adapter 611. A user can interface with computing device 602 via any number of different input devices 603 such as a keyboard, pointing device, joystick, game pad, serial port, and/or the like. These and other input devices are connected to the processors 607 via input/output interfaces 612 that are coupled to the system bus 608, but may be connected by other interface and bus structures, such as a parallel port, game port, and/or a universal serial bus (USB).

Computing device 600 can operate in a networked environment using connections to one or more remote computers through one or more local area networks (LANs), wide area networks (WANs) and the like. The computing device 601 is connected to a network 614 via a network adapter 613 or alternatively by a modem, DSL, ISDN interface or the like.

Those skilled in the art will realize that storage devices utilized to store program instructions can be distributed across a network. For example a remote computer may store a tool such as the adaptive instrumentation runtime monitoring and analysis software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

FIG. 7 is a table of exemplary playback policies 700 including a minimum OPL setting 701 for each output type 703 represented in the table. The play policies include default output protection policies for various media files that may be downloaded to an exemplary device. Also included in the table are provisions for extended analog video protection lists, and a reserved list 705 for future expansion. In addition in this exemplary system an "AllowPlay" right may be granted in a license so that the associated content may be played back on a local or remotely coupled PC which is in turn coupled to any rendering device, such as speakers and or displays.

The exemplary system also provides for the following divisions, or classifications, of media types and provides OPLs for each media division. The levels defined here are not intended to be exhaustive. It is anticipated that other levels (600, 700, and so on) may be added corresponding to appropriate media types in alternative examples, and in future expansions.

Digital compressed audio 707 output protection levels may include five levels for digital audio output protection: unprotected, obfuscated, encrypted low protection level, encrypted media protection level, and encrypted high protection level. The definition of these levels may be fixed in the application program. Unprotected level 100 is not supported for playback OPLs for digital compressed audio output. OPL 200 is typically representative of protection compatible with obfuscated digital compressed audio output. Level 300 is typically representative of protection compatible with encrypted digital compressed audio output technologies with a low protection level. Level 400 is typically representative of protection compatible with encrypted digital compressed audio output technologies with a medium protection level. Level 500 is typically representative of protection compatible with encrypted digital audio output technologies with a high protection level.

Digital uncompressed audio output 709 protection levels may support five levels for digital audio output protection: unprotected, obfuscated, encrypted low protection level, encrypted media protection level, and encrypted high protection level. In the exemplary embodiment level 100 is not supported for playback protection levels. Level 200 is typically representative of protection compatible with obfuscated digital uncompressed audio output. Level 300 is typically representative of protection compatible with encrypted digital uncompressed audio output technologies with a low protection level. Level 400 is typically representative of protection compatible with encrypted digital uncompressed audio output technologies with a medium protection level. Level 500 is typically representative of protection compatible with encrypted digital uncompressed audio output technologies with a high protection level.

Digital compressed video output 711 protection levels may support five levels for digital compressed video output protection: unprotected, obfuscated, encrypted low protection level, encrypted media protection level, and encrypted high protection level.

Unprotected level 100 is not supported for playback protection levels in this exemplary embodiment. Level 200 is typically representative of protection compatible with obfuscated digital compressed video output. Level 300 represents encrypted digital compressed video output technologies with a low protection level. Level 300 represents is not applicable at this time. Level 400 is typically representative of protection compatible with encrypted digital compressed video output technologies with a medium protection level. Level 500 is typically representative of protection compatible with encrypted digital compressed video output technologies with a high protection level.

Digital uncompressed video output 713 protection levels may support five levels of protection: unprotected, obfuscated, encrypted low protection level, encrypted media protection level, and encrypted high protection level. Output protection level 100 is typically not supported for playback protection levels in this embodiment. Level 200 is typically representative of protection compatible with obfuscated analog digital uncompressed video output. Level 300 is typically representative of protection compatible with encrypted digital uncompressed video output technologies with a low protection level. Level 400 is typically representative of protection compatible with encrypted digital uncompressed video output technologies with a medium protection level. Level 500 is typically representative of protection compatible with encrypted digital uncompressed video output technologies with a high protection level.

Analog video output 715 protection levels may typically support two levels for analog video output protection: unprotected and obfuscated. OPL 100 is not supported for playback protection levels. Level 200 represents obfuscated analog video output. In order to accommodate output protection technologies that must be explicitly signaled due to licensing restrictions extended analog video extended output protection may be provided.

FIG. 8 is a table of exemplary copy policies 800 including a minimum OPL setting for each type of copying operation represented in the table. In the example provided a policy is provided for copy privileges based on a count 801. Also provided is a minimum copy protection level setting 803. In this policy there have been specific allowances made to provide for the inclusion 807 and exclusion 805 lists previously described. In the present example five levels for copy protection may be supported: unprotected, obfuscated, encrypted low security level, encrypted media security level, and encrypted high security level. Level 100 is typically representative of protection compatible with an unprotected copy. Level 200 is typically representative of protection compatible with an obfuscated copy. Level 300 is typically representative of protection compatible with an encrypted low protection level copy. Level 400 is typically representative of protection compatible with an encrypted medium protection level copy. Level 500 is typically representative of protection compatible with an encrypted high protection level.

The invention claimed is:

1. A system of controlling playback of a digital media file in a device, the system comprising:
   a processor; and
   a memory communicatively coupled to the processor, the memory having computer-executable instructions that when executed by the processor, perform a method of controlling playback of the digital media file in the device, the method comprising:
      reading, at the device, a license, stored on the device, the license specifying an output protection level that identifies an output type from among a plurality of discrete output types, the identified output type being defined for a playback output function and comprising a first numerical value that is a minimum bar configured to control the playback output function of the digital media file over an output path of the device;
      determining, at the device, a media type of the digital media file, wherein the media type of the digital media file comprises a second numerical value;
      comparing, at the device, whether the second numerical value of the media type of the digital media file exceeds the first numerical value that is the minimum bar configured to control the playback of the digital media file over the output path of the device; and
      when the second numerical value of the media type of the digital media file exceeds the identified output type comprising the first numerical value, playing back, at the device, the digital media file over the output path.

2. The system of controlling playback of the digital media file of claim 1, further comprising a policy engine for applying the specified output protection level to control the playback of the digital media over the output path.

3. The system of controlling playback of the digital media file of claim 1, further comprising an external component coupled to the output path of the device.

4. The system of controlling playback of the digital media file of claim 3, in which the external component is a video display.

5. The system of controlling playback of the digital media file of claim 3, in which the external component is a speaker.

6. The system of controlling playback of the digital media file of claim 3, in which the output path is digital uncompressed video.

7. The system of controlling playback of the digital media file of claim 3, in which the output path is digital compressed video.

8. The system of controlling playback of the digital media file of claim 2, wherein the first numerical value is an even numerical value.

9. The system of controlling playback of the digital media file of claim 1, in which the license is rendered in extensible markup language XML.

10. The system of controlling playback of the digital media file of claim 1, in which the license is rendered in binary.

11. A computer-implemented method of controlling playback of a media file in a device, executed by a processor, the computer-implemented method comprising:
   receiving, at the device, a license from a service provider for controlling playback of the media file, wherein the license specifies a first output protection level associated with a first predetermined media type from one of a plurality of output configurations having comparable security and functionality, the first predetermined media type comprising a first numerical value that is a minimum bar configured to control the output function of the media file;
   determining, at the device, a media type of the media file, the media type of the media file comprising a second numerical value;
   determining, at the device, whether the second numerical value of the media type of the media file matches or exceeds the first numerical value of the first predetermined media type specified by the license; and
   when the second numerical value of the media type of the media file matches or exceeds the first numerical value of the first predetermined media type specified by the license, using the first output protection level to determine, at the device, that the media file should be output to an output path according to the output configuration associated with the first predetermined media type and specified by the output protection level in the license; and outputting, at the device, the media file over the output path.

12. The computer-implemented method of controlling playback of a media file in the device of claim 11 wherein the predetermined media type is one of the following: digital compressed audio, digital uncompressed audio, digital compressed video, and digital uncompressed video.

13. The computer-implemented method of controlling playback of a media file in the device of claim 12 wherein the license has a second security level associated with a second predetermined media type and the method further comprises:

when the second numerical value of the media type of media file does not match or exceed the first numerical value of the predetermined media type in the license, determining, at the device, whether the second numerical value of the media type of the media file matches or exceeds a numerical value of the second predetermined media type in the license; and when the second numerical value of the media type of the media file matches or exceeds the third numerical value of the second predetermined media type in the license, using the associated second security level to determine, at the device, whether to output the media file over the output path.

14. A computer-readable storage device including instructions that, when executed by a processor, perform a method of controlling playback of a media file in a device, the method comprising:

receiving, at the device, a license from a service provider for controlling playback of the media file, wherein the license specifies a first output protection level associated with a first predetermined media type from one of a plurality of output configurations having comparable security and functionality, the first predetermined media type comprising a first numerical value that is a minimum bar configured to control the output function of the media file;

determining, at the device, a media type of the media file, the media type of the media file comprising a second numerical value;

determining, at the device, whether the second numerical value of the media type of the media file matches or exceeds the first numerical value of the first predetermined media type specified by the license; and when the second numerical value of the media type of the media file matches or exceeds the first numerical value of the first predetermined media type specified by the license, using the first output protection level to determine, at the device, that the media file should be output to an output path according to the output configuration associated with the first predetermined media type and specified by the output protection level in the license; and outputting the media file over the output path.

15. The computer-readable storage device of claim 14 wherein the predetermined media type is one of the following: digital compressed audio, digital uncompressed audio, digital compressed video, and digital uncompressed video.

16. The computer-readable storage device of claim 15 wherein the license has a second security level associated with a second predetermined media type and the method further comprises:

when the second numerical value of the media type of the media file does not match or exceed the first numerical value of the predetermined media type in the license, determining, at the device, whether the second numerical value of the media type of the media file matches or exceeds a third numerical value of the second predetermined media type in the license; and when the second numerical value of the media type of the media file matches or exceeds the third numerical value of the second predetermined media type in the license, using the associated second security level to determine, at the device, whether to output the media file over the output path.

* * * * *